US010532673B2

(12) United States Patent
Kemp et al.

(10) Patent No.: US 10,532,673 B2
(45) Date of Patent: Jan. 14, 2020

(54) VEHICLE SEAT SUSPENSION MECHANISM

(71) Applicant: Cobra Seats Technology Ltd, Shropshire (GB)

(72) Inventors: Nicholas Kemp, London (GB); Mark Dunsford, Shrewsbury (GB)

(73) Assignee: COBRA SEAT TECHNOLOGY LTD., Shropshire (GB)

(*) Notice: Subject to any disclaimer, the term of this patent is extended or adjusted under 35 U.S.C. 154(b) by 0 days.

(21) Appl. No.: 15/754,189

(22) PCT Filed: Aug. 22, 2016

(86) PCT No.: PCT/GB2016/052603
§ 371 (c)(1),
(2) Date: Feb. 21, 2018

(87) PCT Pub. No.: WO2017/032997
PCT Pub. Date: Mar. 2, 2017

(65) Prior Publication Data
US 2018/0251053 A1  Sep. 6, 2018

(30) Foreign Application Priority Data

Aug. 21, 2015 (GB) .................................. 1514951.1

(51) Int. Cl.
B60N 2/00 (2006.01)
B60N 2/52 (2006.01)
(Continued)

(52) U.S. Cl.
CPC ............. B60N 2/522 (2013.01); B60N 2/502 (2013.01); B60N 2/505 (2013.01); B60N 2/507 (2013.01);
(Continued)

(58) Field of Classification Search
CPC ........ F16M 11/18; F16M 11/38; B60N 2/505; B60N 2/1615; B60N 2/508; B60N 2/507
(Continued)

(56) References Cited

U.S. PATENT DOCUMENTS 3,369,824 A   2/1968 Bunch
3,685,780 A   8/1972 Stannebein
(Continued)

FOREIGN PATENT DOCUMENTS

DE  3227858 A1  1/1984
FR  2453749 A1  11/1980
WO  9212892 A1  8/1992

OTHER PUBLICATIONS

Notification of Transmittal (Form PCT/ISA/220), International Search Report (Form PCT/ISA/210), and Written Opinion Form PCT/ISA/237) for International Patent Application No. PCT/GB2016/052603 dated Nov. 16, 2016, 9 pages.
(Continued)

Primary Examiner — Steven M Marsh
(74) Attorney, Agent, or Firm — Withrow & Terranova, P.L.L.C.; Vincent K. Gustafson

(57) ABSTRACT

There is described a vehicle seat suspension mechanism, comprising a vehicle mount, a seat support linked to the vehicle mount by a suspension arrangement which allows the seat support to fall with respect to the vehicle mount under load and a shock strut arranged to resist the seat support falling with respect to the vehicle mount during a compression stroke. A control link is arranged to be driven about a control link pivot by the fall of the seat support. The control link is pivotally coupled to a first end of the shock strut to guide the first end with respect to a second end of the shock strut in a manner which causes a motion ratio of the suspension mechanism to increase during progression of the compression stroke. The ride will feel softer for smaller
(Continued)

impacts and better damped later for larger impacts. The mechanism is arranged underneath a seat of a vehicle to provide additional comfort for the rider.

20 Claims, 43 Drawing Sheets

(51) Int. Cl.
*B60N 2/50* (2006.01)
*B60N 2/54* (2006.01)
*B63B 29/04* (2006.01)

(52) U.S. Cl.
CPC .............. *B60N 2/508* (2013.01); *B60N 2/525* (2013.01); *B60N 2/527* (2013.01); *B60N 2/54* (2013.01); *B60N 2/544* (2013.01); *B63B 2029/043* (2013.01)

(58) Field of Classification Search
USPC .................... 248/157, 419, 420, 421, 423
See application file for complete search history.

(56) References Cited

U.S. PATENT DOCUMENTS

| | | | |
|---|---|---|---|
| 3,743,230 | A | 7/1973 | Freedman |
| 4,265,329 | A | 5/1981 | de Cortanze |
| 4,714,227 | A | 12/1987 | Holm et al. |
| 5,463,972 | A | 11/1995 | Gezari et al. |
| 5,735,509 | A | 4/1998 | Gryp et al. |
| 5,810,125 | A | 9/1998 | Gezari |
| 5,833,255 | A | 11/1998 | Sarder et al. |
| 6,203,042 | B1 | 3/2001 | Wilcox |
| 6,237,889 | B1 | 5/2001 | Bischoff |
| 6,241,209 | B1 | 6/2001 | von Mayenburg et al. |
| 6,722,461 | B2 | 4/2004 | Gogo |
| 7,008,015 | B2 | 3/2006 | Bischoff |
| 7,293,830 | B2 | 11/2007 | Marotta et al. |
| 7,413,158 | B1 | 8/2008 | Burer |
| 7,506,932 | B2 | 3/2009 | Bostrom et al. |
| 7,547,030 | B2 | 6/2009 | Toyoda et al. |
| 8,118,287 | B2 | 2/2012 | Schordine |
| 8,197,004 | B2 | 6/2012 | Wahls et al. |
| 8,955,832 | B1 | 2/2015 | Bartel |
| 9,580,115 | B2 * | 2/2017 | Haller .................... B60N 2/501 |
| 2001/0005003 | A1 * | 6/2001 | Koga ..................... B60N 2/067 248/421 |
| 2002/0144850 | A1 | 10/2002 | Gogo |
| 2004/0154524 | A1 | 8/2004 | Fedders |
| 2004/0159763 | A1 | 8/2004 | Mullinix et al. |
| 2005/0280302 | A1 * | 12/2005 | Ropp ..................... B60N 2/508 297/344.17 |
| 2011/0290978 | A1 * | 12/2011 | Keen ..................... B60N 2/501 248/421 |
| 2013/0206949 | A1 * | 8/2013 | Archambault ......... B60N 2/508 248/421 |
| 2013/0270410 | A1 * | 10/2013 | Boyarski ................ A01D 67/04 248/421 |

OTHER PUBLICATIONS

Search Report under Section 17(5) for United Kingdom Patent Application No. GB1514951.1 dated Feb. 1, 2016, 3 pages.
Stidd SAS Seating Catalog. Product catalog [online]. Stidd SAS, 2015. [retrieved on Feb. 20, 2018]. Retrieved from the Internet: <URL: https://stidd.com/wp-content/uploads/2015/04/Stidd-SAS-Seating-Catalog-2015-03-31-1-12.pdf>.
SHOXS Shock Mitigation Technology. Product listing [online]. Coast Dynamics Group Ltd. [retrieved on Feb. 20, 2018]. Retrieved from the Internet: <URL: http://shoxs.com/products>.
Shockwave Marine Suspension Seating—product categories. Product listing [online]. Professional Components Ltd. [retrieved on Feb. 20, 2018]. Retrieved from the Internet: <URL:http://shockwaveseats.com/>.
ScotSeat S2J Low Backrest Jocket Seat. Product specification [online]. ScotSeat Group [retrieved on Feb. 20, 2018]. Retrieved from the Internet: <URL:http://scotseats.co.uk/scotseat-kpm-marine/our-products/s2j-low-backrest-jockey-seat>.
Shark Jockey. Product specification [online]. Shark Seats. [retrieved on Feb. 20, 2018]. Retrieved from the Internet: <URL:https://sharkpro.org/?product=test>.
Shark Jockey technical drawings. Product drawings [online]. Shark Seats. [retrieved on Feb. 20, 2018]. Retrieved from the Internet: <URL: https://sharkpro.org/?page_id=604>.
Ullman Dynamics home page. [online]. Ullman Dynamics. [retrieved on Feb. 20, 2018]. Retrieved from the Internet: <URL: http://ullmandynamics.com/>.
CoastalPro Voyager product information. Product specification [online]. CoastalPro Ltd. [retrieved on Feb. 20, 2018]. Retrieved from the Internet: <URL: http://www.coastalpro.co.uk/cp20xr.html>.
CoastalPro OEM Mechanisms. Product specification [online]. CoastalPro Ltd. [retrieved on Feb. 20, 2018]. Retrieved from the Internet: <URL: http://www.coastalpro.co.uk/mech.html>.
Sea Sure Shock Mitigation. Product description [online]. retrieved on Feb. 20, 2018]. Sea Sure Ltd. [retrieved on Feb. 20, 2018]. Retrieved from the Internet: <URL: https://www.sea-sure.co.uk/categories/shock-mitigation/shock-mitigation>.
X-Craft Suspension Seats. Product listing [online]. X-Craft Seats. [retrieved on Feb. 20, 2018]. Retrieved from the Internet: <URL: https://www.xcraftseats.com>.
RideFox home page. [online]. [retrieved on Feb. 20, 2018]. FOX Factory, Inc. [retrieved on Feb. 20, 2018]. Retrieved from the Internet: <URL: http://www.ridefox.com>.
Fox Suspension Seat Product Description. Product listing [online]. BungKing. [retrieved on Feb. 21, 2018]. Retrieved from the Internet: <URL: http://www.bungking.com/fox-suspension-seat/>.
Examination Report under Section 18(3) for United Kingdom Patent Application No. GB1804534.4, dated Apr. 23, 2018, 3 pages.

* cited by examiner

| Control link | X (mm) | Y (mm) | Z (mm) |
|---|---|---|---|
| A | 50 | 35 | 55 |
| B | 40 | 47 | 65 |
| C | 45 | 40 | 65 |
| D | 50 | 32 | 65 |
| E | 37 | 37 | 70 |

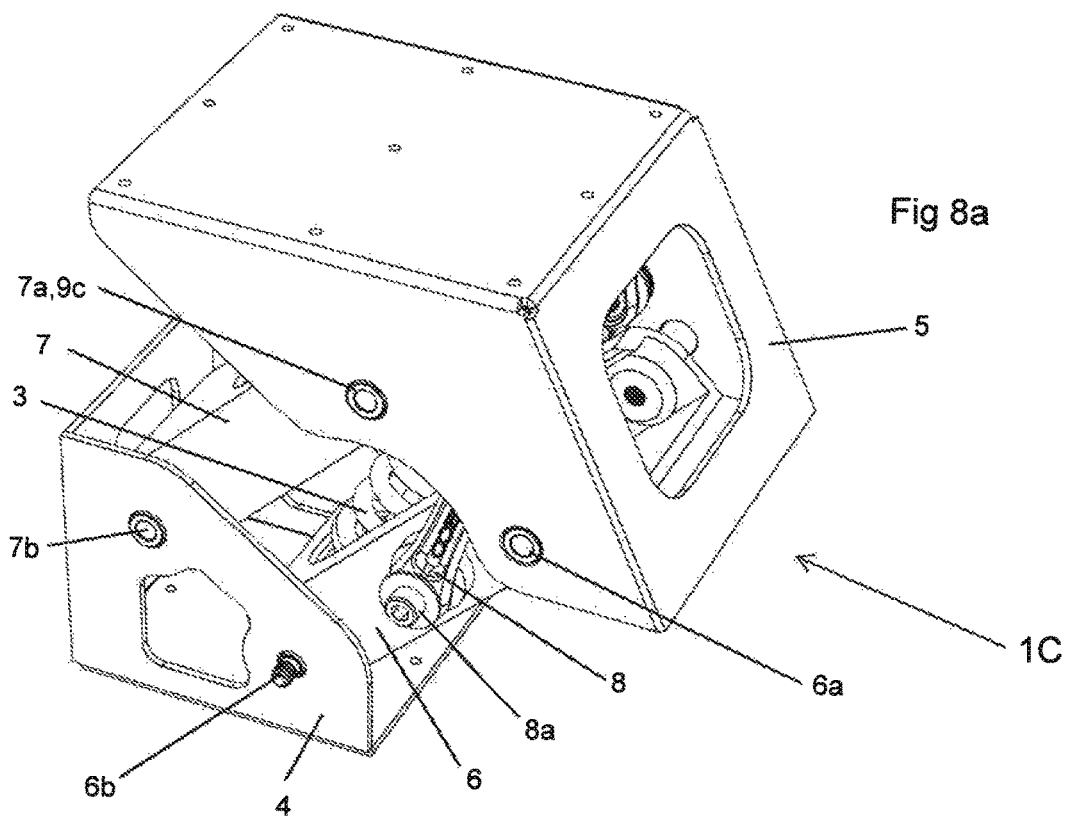
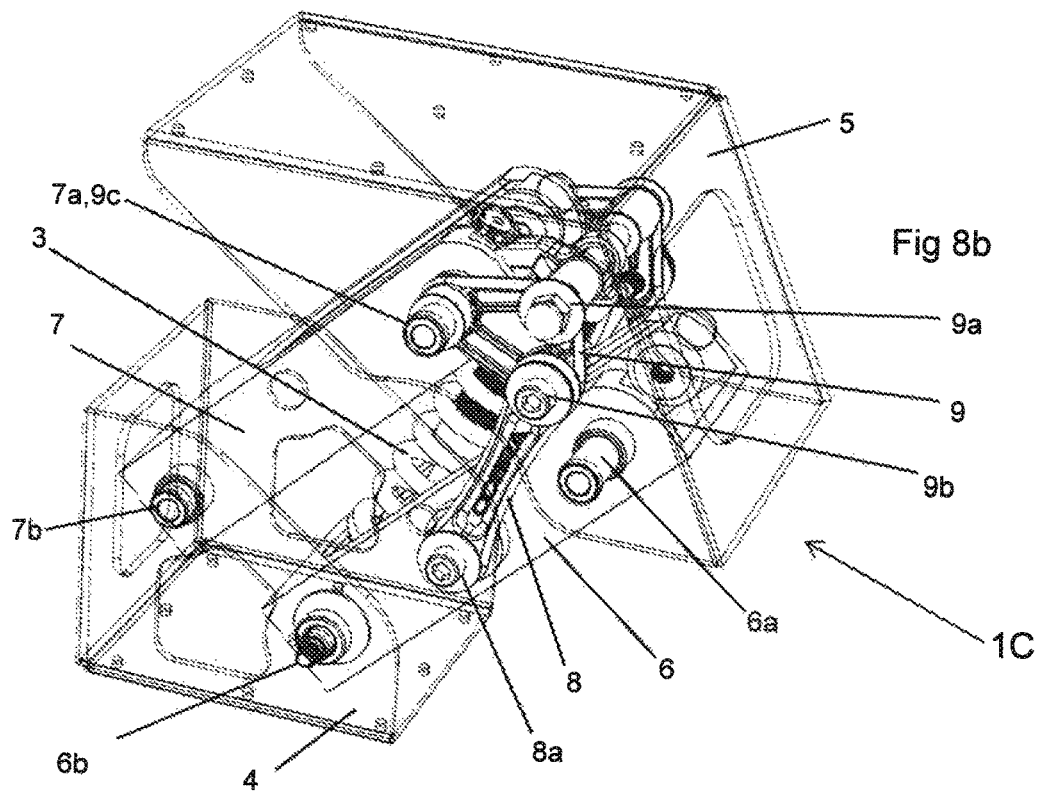

1D

1D

1E

1E

1E

1E

1E

1E

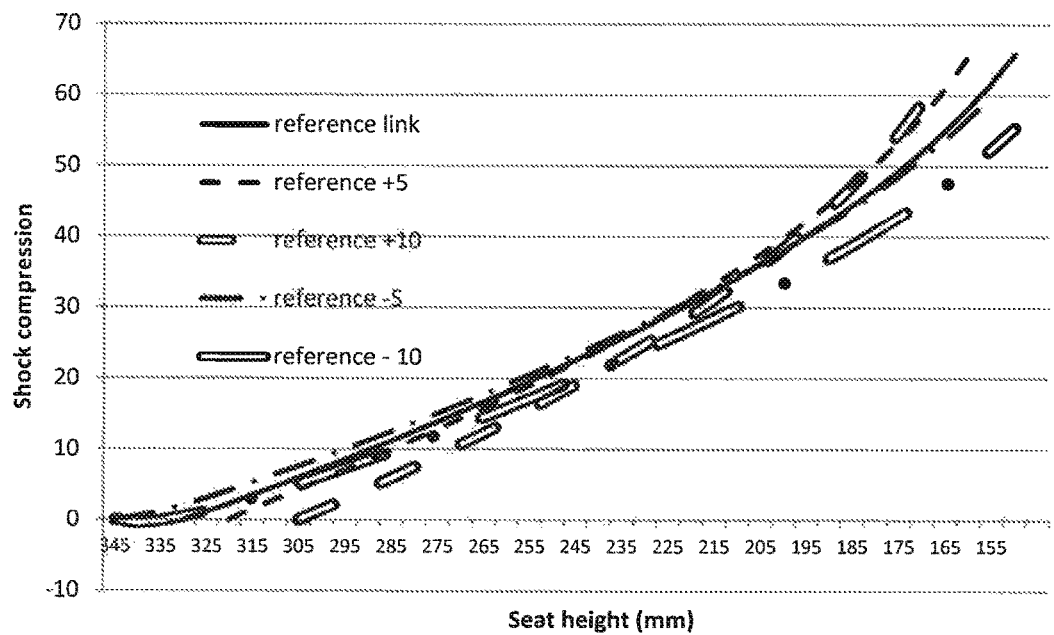
Fig 24
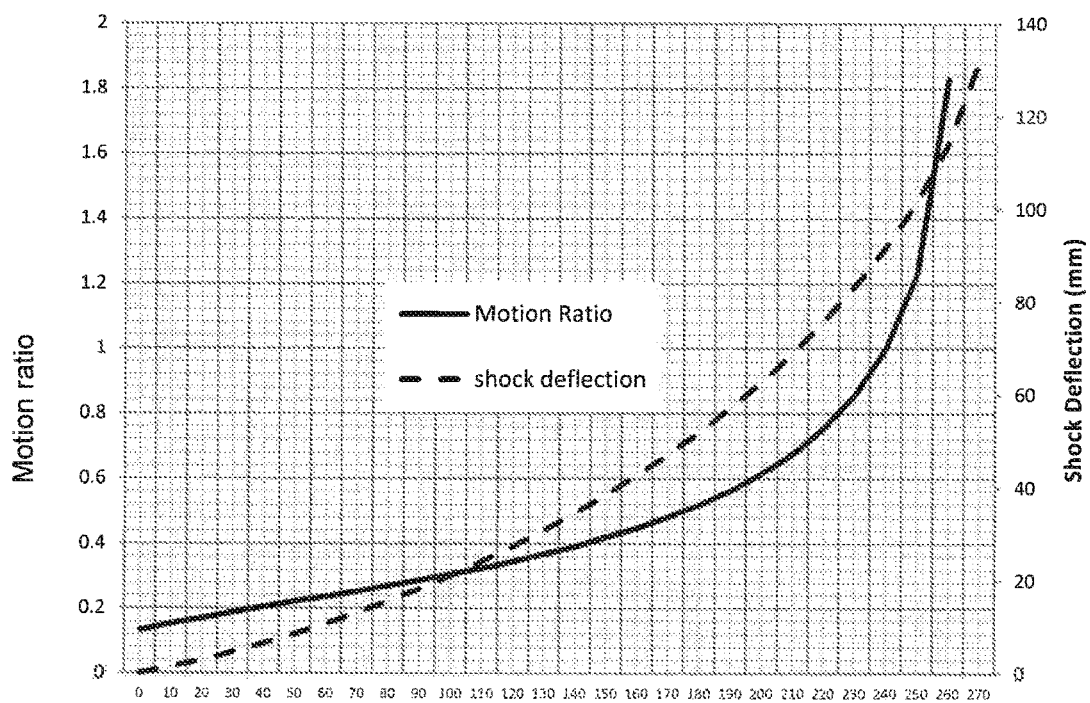
Fig 25    Seat deflection from rest (mm)

VEHICLE SEAT SUSPENSION MECHANISM

CROSS-REFERENCE TO RELATED APPLICATIONS

This application is a 35 U.S.C. § 371 national phase filing of International Application No. PCT/GB2016/052603 filed on Aug. 22, 2016, and claims the benefit of United Kingdom Patent Application No. 1514951.1 filed on Aug. 21, 2015. The entire disclosures of the foregoing applications are hereby incorporated by reference herein, in their respective entireties.

FIELD

The present invention relates to a vehicle seat suspension mechanism, for use, for example, with marine vehicles, though there are also many other applications. In particular, the invention relates to a vehicle seat suspension mechanism in which the motion of a shock strut has been modified through guiding its movement during the fall of the seat so as to increase the motion ratio of the mechanism during the progression of a compression stroke.

BACKGROUND

Suspension seating is used in vehicles, such as boats, to protect the riders from vibrations and impacts, especially to the spine. Studies have shown that not only the large impacts (e.g., when a boat hits large waves) can cause problems with the lower back, but also repeated low level impacts (vibrations, e.g., from chop) can have a cumulative effect on the riders, particularly regular users. Constructing a suspension mechanism that adequately protects against both forms of impact is highly problematic, since the shock absorber needs to be both soft enough at the top end to absorb small impacts whilst being stiff enough at the lower end to cope with large impacts.

A coil spring shock absorber provides a linear spring rate response and when used in the traditional manner, the position of the pivots results in a falling motion ratio, i.e. the ratio of shock strut deflection to seat deflection will become smaller as the compression stroke progresses. The rider may experience too much movement of the seat during the larger impacts and insufficient movement during the smaller impacts. The mechanism is also likely to be over-damped for the smaller impacts (and feel overly firm) and under-damped for the larger impacts. If a soft (less stiff) spring suitable for the small impacts is used, when the mechanism is subject to a large impact the spring will compress completely before the whole impact has been absorbed, maximum compression will suddenly be reached and the rider will then experience the rest of the unabsorbed impact ("bottoming out"). If on the other hand a stiffer spring is used that can absorb the energy of large impacts, it will be too stiff to absorb the small impacts adequately, imparting repeated blows to the rider which can have a cumulative effect.

A gas spring is a better option since it provides a non-linear spring rate response: initially having a low spring rate which then increases significantly towards the end of the stroke as the gas is compressed in a cylinder, i.e. a progressive spring rate. However, damping provided by the shock absorber is a function of the shock velocity. Just as the spring forces are reaching significant values to cope with the larger impacts, the shock velocity of a standard gas shock will be decreasing to a point where the damping effect is no longer felt. Unless the damping is also increased through the stroke, for example, through some modification of the shock absorber, a shock absorbing seat mechanism that provides appropriate damping for the smaller impacts at the top of the stroke will be under damped for the high spring forces experienced at the bottom of the stroke, resulting in the seat acting to eject the rider.

A typical prior art suspension arrangement utilises a parallelogram linkage arrangement. This will comprise a vehicle mount (a base) that can be bolted or otherwise secured to a floor or plinth of a vehicle, a seat support for the seat of the rider, and two links, an upper and lower link respectively, which pivotally connect the seat support to the vehicle mount. The upper and lower links are typically of the same length so that they can maintain a parallel relationship as the seat falls, keeping the seat (and the rider on the seat) in the same orientation during the suspension movement. Different manufacturers have developed different setups for the parallelogram linkage, for example that of the S2 Helmsman seat of ScotSeat KPM Marine www.scotseatkpm-marine.co.uk and that of the CoastalPro Voyager seat www-.coastalpro.co.uk. Some also use other forms of suspension arrangement to link the seat support to the vehicle mount.

For the parallelogram linkage arrangements, a shock strut will typically be mounted between the vehicle mount and the seat support to absorb the shock from impacts. In general the shock strut will be arranged between the vehicle mount and seat support so that it extends approximately at right angles (between, say, 60 to 120°) to the upper and lower links. The ends of the shock strut are generally fixed with respect to the suspension seat mechanism by pivots on the seat support and vehicle mount (one end may include an adjustment mechanism to set the initial inclination of the shock strut for the weight of the rider).

During an impact, the seat support will fall with respect to the vehicle mount, following a radial path about the vehicle mount pivots for the upper and lower links. This reduces the distance between the ends of the shock strut, compressing the shock strut. During an initial part of the compression stroke, the shock strut may be inclined by, say, between 45 and 60° to the floor, and then during later parts of the compression stroke, the shock strut may become more upright as the seat continues to fall (and rotate around the vehicle mount pivots), such that it generally follows a path where it can act tangentially to resist the rotational movement of the seat support fall.

The shock strut can also be inclined in different ways, for example, substantially vertical or more inclined with the links, so long as it is subject to compression during the movement to provide a restoring force to the seat support.

While such seat suspension mechanisms using parallelogram linkages have proved popular in marine environments for a number of years now, there is significant room to improve the ride offered by them to improve comfort and reduce the cumulative effects of repeated low amplitude impacts.

Various attempts have been made to address this issue of providing a more desired spring response and damping throughout the stroke so as protect the rider against the full range of potential impacts; however they are extremely complex and expensive. Seat suspension systems are known that rely on modified shock absorbers using multiple bypass arrangements to try to optimise the ride characteristics. It is also known to provide computer controlled magneto rheological fluid systems, but the expense and complexity of such systems clearly limits their use, for example to military applications.

The solutions which have been presented so far generally reside in ways to modify how the fluids pass through the shock absorber rather than identifying new ways to utilise conventional shock struts in such mechanisms.

Accordingly, there remains a great need for a suspension system that provides adequate shock absorption and damping across a range of impacts to improve comfort and minimise the harm inflicted on riders, particularly for regular users, that is further suitable for use across a range of applications, such as (but not exclusively) in the marine environment, and that is not prohibitively expensive.

It is known to provide wheel suspension systems for the rear swing arms of motorbikes which utilise a link mechanism to guide the position of one end of the shock strut during a compression stroke in order to modify the response of the shock strut. One example is illustrated in U.S. Pat. No. 6,722,461. While the rider may appreciate the improved ride offered by the suspension system, there is no additional suspension provided between a seat support and a vehicle mount for the seat.

SUMMARY

According to one aspect, the present invention provides a vehicle seat suspension mechanism, comprising: a vehicle mount; a seat support linked to the vehicle mount by a suspension arrangement which allows the seat support to fall with respect to the vehicle mount under load; a shock strut arranged to resist the seat support falling with respect to the vehicle mount during a compression stroke; a control link arranged to be driven about a control link pivot by the fall of the seat support, the control link being pivotally coupled to a first end of the shock strut to guide the first end with respect to a second end of the shock strut in a manner which causes a motion ratio of the suspension mechanism to increase during progression of the compression stroke.

The control link and shock strut may be part of a rising ratio link assembly which is positioned within or at least partially within the suspension arrangement linking the seat support to the vehicle mount.

The rising ratio link assembly may be a unit which is separate from the suspension arrangement and driven by the fall of the seat support or it may be part of the suspension arrangement and receive drive from parts of the suspension arrangement or from relative movement of the seat support to the vehicle mount.

The vehicle seat suspension mechanism may be positioned underneath a seat (in most cases directly underneath) and mounted to an upper surface of a vehicle to link the seat to the rest of the vehicle. Accordingly the seat support may be configured for positioning underneath a seat, e.g., it may be profiled to provide a platform on an upper end of the suspension arrangement to mount the seat on, and the vehicle mount may be configured to be mounted to an upper surface of a vehicle, e.g., it may provide a second platform on the lower end of the suspension arrangement which may include holes or other formations for receiving bolts and/or other types of fasteners to fix the suspension arrangement (and thereby the seat mounted thereon) to a mounting surface on the vehicle.

The first end of the shock strut may be guided by the control link along a path, in particular an arcuate path about the control link pivot (which may or may not be moving with respect to the vehicle mount depending on where it is located within the vehicle seat suspension mechanism). The path may lessen a rate of compression in the shock strut with respect to seat fall during an initial stage of the compression stroke and it may enhance a rate of compression in the shock strut with respect to seat fall during a final stage of the compression stroke. In this way it can shift a peak in a damping effect provided by the shock strut further along the compression stroke. The path may also reduce a rate of increase of spring force exerted by the shock strut with respect to the fall of the seat support during an initial stage of the compression stroke and it may enhance a rate of increase of spring force exerted by the shock strut with respect to the fall of the seat support during a final stage of the compression stroke when compared with conventional mechanisms. In this way it can save some of the spring force provided by the shock strut in reserve for later on in the compression stroke. Preferably the vehicle seat suspension mechanism is configured to be suitable for use in a marine environment, for example high-speed boats such as speedboats. However, it may also be used in a variety of other vehicles that may be subject to similar small and large impacts, for example, 4WD vehicles, pick-up trucks, off-road vehicles, etc., as well as vehicles that may subject the rider to extended durations of low level impacts, such as trains, lorries, coaches, etc. The rate of increase in motion ratio may be chosen for the type of vehicle and its use.

In marine environments, the shape of the hull (e.g., the V-shape of the hull) will provide the main suspension to the vehicle. In land based environments, the wheel or track suspension will provide the main suspension to the vehicle, controlling the way the vehicle drives over the land. The seat suspension mechanism of the present invention may be in addition to these existing vehicle suspension systems and is not intended to replace them, but instead provide additional comfort to the rider.

The motion ratio is defined as:

$$\text{Motion ratio} = \frac{\text{shock strut deflection}}{\text{seat deflection}}$$

where: —shock strut deflection is the change in length of the shock strut between its first and second ends; and seat deflection is the change in height of the seat support relative to the vehicle mount.

It has been found that the motion ratio can be modified to increase through the stroke by utilising the fall of the seat support with respect to the vehicle mount to drive a control link to guide the first end of the shock strut relative to its opposite, second end during the stroke.

Preferably the motion ratio at the start of the compression stroke is less than 1.0. More preferably it is less than 0.6 and most preferably it is less than 0.5. Preferably the motion ratio remains below this level for at least the first third of the compression stroke, more preferably the first half of the compression stroke.

Having a low motion ratio at the start of the stroke will provide a higher mechanical gearing between the seat movement and the shock strut deflection, which helps to overcome internal friction within the shock strut, which when combined with the low shock velocities that result from the mechanical gearing make the system feel smoother and more responsive. It also means that more of the shock strut deflection is available for later on in the stroke. Having a high motion ratio further along the stroke will mean that the relative shock velocity will be higher later on, increasing the damping effect provided by the shock strut when the larger spring forces are exerted.

Preferably the first end of the shock strut is guided with respect to the second end of the shock strut in a manner which causes the motion ratio of the seat suspension mechanism to increase during progression of the compression stroke for at least the final half of the compression stroke, more preferably the final two thirds of the compression stroke, and most preferably for the whole of the compression stroke.

The motion ratio may increase by more than 30% and preferably more than 50% during the final half of the compression stroke. Preferably it increases by more than 66%, more preferably by more than 75%, yet more preferably by more than 85%, and in some arrangements by more than 100%.

The motion ratio may increase steadily during the compression stroke. A rate of increase of the motion ratio during the final third of the compression stroke may be more than twice that during the initial third of the compression stroke.

The level of motion ratio increase may be chosen for the particular application. For example, it may be more than three times, for example, for high speed, flat water situations. Where irregular, large impacts are anticipated, a motion ratio increase of more than four times, for example, up to five times or more, may be appropriate. On vehicles such as goods or heavy vehicles, a more gentle increase in motion ratio may be appropriate, for example, an increase of two or three times. Some applications can be envisaged however in which a very gentle rise in motion ratio throughout the stroke may be appropriate, for example in calm water environments where very large shock values are not expected. A high spring rate spring could be used and a very soft suspension with lots of travel achieved.

Preferably the motion ratio is such that the damping force provided by the shock strut in the seat suspension mechanism, during a full stroke movement, reaches a peak value when the seat deflection is greater than 50% of a total seat deflection. In other words, the damping force is greatest later on in the compression stroke for the larger impacts. Preferably the peak value is observed at seat deflections of greater than 55% of the total seat deflection, more preferably greater than 60% of the total seat deflection, and yet more preferably greater than 65% of the total seat deflection. In this way, the damping force provided by the shock strut more closely follows the larger spring forces being exerted on the seat support during the larger impacts.

Overview of Further Embodiments

Further optional features of the present invention will now be discussed in more detail.

The suspension arrangement preferably comprises a set of links which together couple the seat support to the vehicle mount to guide and stabilise the fall of the seat support, the links being connected to the seat support and/or the vehicle mount by pivots.

In particularly preferred embodiments, the suspension arrangement comprises: a first link connecting the seat support to the vehicle mount by pivots at each end thereof; and a second link connecting the seat support to the vehicle mount by pivots at each end thereof. The first and second links may be arranged one above the other and the first link may remain parallel (±5°) to the second link during the compression stroke. In this way, the suspension arrangement may provide a parallelogram linkage for the seat suspension mechanism, allowing the seat support to fall with respect to the vehicle mount while maintaining the orientation of the seat support. A parallelogram linkage also has advantages in terms of resisting torsional forces.

The shock strut may be arranged to bridge across, between the first and second links, extending from around a lower end of a lower link towards an upper end of an upper link. It may extend at an angle of up to 45° more inclined than a longitudinal direction of the lower link.

The first end of the shock strut preferably begins the compression stroke in a region located on a first link side of the second link (for example, the side of the second link facing away from a line through the pivots to the seat support and the vehicle mount towards the first link, usually starting from a location in a quadrant spaced away from the second end of the shock strut). During the compression stroke, the first end of the shock strut may be guided to a quadrant located on the opposite side of the second link, the quadrant extending from the other side of the line through the pivots of the second link to the seat support and the vehicle mount.

However, other suspension systems may be usable in the types of environment envisaged for the present invention. The main consideration here is that it is the fall of the seat support with respect to the vehicle mount which provides drive for the control link, which in turn guides the first end of the shock strut relative to its opposite, second end during the stroke.

For example, the suspension arrangement may comprise a scissor linkage rather than a parallelogram linkage as described above. A scissor linkage may be more appropriate for a vehicle like a truck or bus, for example, where the rider will be subjected to a less bumpy ride. Alternatively it may comprise any other mechanical arrangement that permits a vertical motion for the seat support. For example, it may comprise linear bushes sliding on vertical guides.

The seat support may be a mount for a seat to be mounted to, or may be an integral base of the seat itself. In one embodiment it comprises a side mount, preferably two side mounts, one to be mounted on each side of the seat towards the bottom of the seat so as to support the seat.

The vehicle mount and seat support may be regarded as platforms linked by the suspension arrangement. In general they will maintain a substantially parallel configuration (±15°) with respect to each other during the compression stroke.

The drive for the control link may be provided by rotation of a link connecting the seat support to the vehicle mount. In this way, fall of the seat support provides angular movement which is then coupled by parts of the mechanism to drive and rotate the control link about the control link pivot.

The drive for the control link may be provided by the fall of the seat support, through a drive link coupled to the seat support or vehicle mount and by using the relative movement of the seat support to the vehicle mount, as the seat support falls through an arcuate path, to drive the control link about the control link pivot. This might be the case with a parallelogram linkage.

Alternatively, the seat support may be linked to the vehicle mount so that it falls vertically with substantially no forwards/rearwards movement. In such arrangements, the drive for the control link may be provided by the fall of the seat support through a drive link coupled to the seat support or vehicle mount and by using the relative vertical movement of the seat support to the vehicle mount, as the seat support falls through a vertical path, to drive the control link about the control link pivot. This might be the case with a scissor linkage.

This drive arising from the fall of the seat support may be transmitted directly or indirectly to the control link.

In the case of a parallelogram linkage, preferably the drive is transmitted by a drive link coupled to a first link.

The drive arising from the fall of the seat support may push the control link about the control link pivot during a compression stroke.

Angular movement of the seat support about a vehicle mount pivot in one direction may cause angular movement in the control link about the control link pivot in an opposite direction.

The drive may be taken off in a way that increases the angular velocity of the control link with respect to the seat deflection (i.e. displacement of the seat support) during progression of the stroke. This increase might involve gearing.

For example, this gearing of the drive for the control link may be provided by movement in the mechanism causing the spacing between the control link pivot and one end of a drive link (the end furthest from the control link which receives thrust from the seat mechanism as the seat support falls) to become progressively smaller during the compression stroke. The movement may generate torque in the control link about the control link pivot. This is because the drive link remains a constant length, whereas the control link pivot and the end of the drive link furthest from the control link move progressively closer together (the drive link provides one side of a triangle, the control link pivot to the control link end of the drive link provides another, and the control link pivot to the far end of the drive link makes up the third side of the triangle). This spacing between the control link pivot and the end of the drive link furthest from the control link may become progressively smaller in a non-linear manner. It may also be combined with a change in the relative inclination of a drive link with respect to the control link through the stroke, such that a given amount of rotational movement arising from the fall of the seat support creates progressively larger rotational movements of the control link about the control link pivot.

For example, the drive link may be coupled to the first link to receive drive therefrom and coupled to the control link to drive the control link about the control link pivot. The drive link may be pivotally coupled to the first link by a pivot. It may be pivotally coupled to the control link by a drive link pivot. Through these pivots, the included angle of the drive link with respect to the first link may become progressively larger during the compression stroke. The included angle between the drive link and a radial line joining the drive link pivot to the control link pivot may become progressively smaller.

Thus in a parallelogram linkage where drive is provided by a drive link pivotally coupled to the first link, the movement of the mechanism will cause the drive link/first link pivot and the control link pivot to move towards each other as the seat support falls and the first and second links come together. The fixed length of the drive link by comparison produces causes thrust that generates torque in the control link, urging the first end of the shock strut around the control link pivot (preferably through a crank-like arrangement of an axle and a pair of control link pivots arranged either side of the shock strut, as will be described below).

The geometry of the control link and/or drive link may be chosen so as to increase the rate of the shock deflection with increasing seat deflection. For example, by choosing the angular start point and finish point for the stroke of the control link, i.e., the positions where the first end of the shock strut is guided from and to by the control link during a full compression stroke, then taking into account the fall of the other end of the shock strut during the fall of the seat support, it is possible to use the geometry of the control link and its rotational motion as it is driven about its control link pivot to increase the rate of shock strut deflection with respect to the increasing seat deflection.

The angular start point of the control link can be set by configuring a drive link so that it couples the drive (from the rotational movement arising from the fall of the seat support) to the control link from a predetermined angular position. This may be through setting a length of the drive link and/or through positioning its pivots with respect to the control link. It may also be set through configuring the geometry of the control link.

The angular finish point of the control link can be set by configuring a drive link so that the control link arrives at a furthest angular position corresponding to a maximum permissible shock strut deflection for the seat suspension mechanism when the seat support reaches its lowest position. This may be through setting a length of the drive link and/or positioning its pivots with respect to the control link. It may also be through selecting the geometry of the control link, for example, the radial distance between the control link pivot and a shock strut pivot, the relative positioning of the drive link pivot or through using some other mechanism which is able to transfer the drive from the rotational movement arising from the fall of the seat support to the control link.

Other links or drive parts may also be used to couple the rotational movement arising from the fall of the seat to the control link, and the configuring of these can be used to set the angular start point and/or angular finish point. In one embodiment the drive link may comprise a linkage including a joint. The drive is preferably coupled to the control link by means of a pivot connection, but other coupling arrangements are also envisaged.

As mentioned, preferably, the suspension mechanism comprises first and second links that connect the seat support to the vehicle mount through pivots at each end. The first and second links may be arranged one above the other. The first link may remain parallel (±5°) to the second link during the compression stroke. Thus, the links can be considered as forming a parallelogram linkage arrangement.

Preferably, a majority of the shock strut is located within a parallelogram envelope defined by extremities of the first and second links (e.g. when viewed side on). In some arrangements, it may be possible to locate more than 70% of the shock strut within the parallelogram envelope, more preferably more than 85%, and most preferably more than 90%. The shock strut may remain substantially or wholly within the parallelogram envelope for the whole of the compression stroke. In this way, there is significantly less chance of an injury resulting from parts of the rider or the rider's clothing becoming caught within the seat suspension mechanism. The first and/or second links may comprise a substantially box-section to help enclose the moving parts of the mechanism and to provide lateral rigidity for the seat suspension mechanism.

Preferably the shock strut is broadly aligned with the first and second links, for example, a longitudinal axis of the shock strut may be within ±60° of the longitudinal direction of the first and second links, more preferably within ±45°, throughout the extent of the compression stroke.

The drive link may be in the form of a push link. It may extend from a pivot positioned on the first link, the pivot being located between the first link pivots to the vehicle mount and the seat support.

Preferably, an angle between the shock strut pivot and the drive link pivot from the control link pivot is an acute angle of less than 70°, more preferably less than 60° and most preferably less than 50°.

The control link pivot is preferably located towards one end of the suspension arrangement. Preferably it is located at one end of a link. For seat suspension mechanisms with greater amounts of seat deflection, the control link pivot may be located at the vehicle mount end; for mechanisms with smaller amounts of seat deflection, the control link pivot may be located at the seat support end.

The described pivots may comprise holes and axle portions.

In one embodiment the control link pivot shares a pivot axle with the second link's pivot to the vehicle mount or the seat support. This can help to simplify the connections to the vehicle mount or seat support and reduce the number of parts required.

In one embodiment the second end of the shock strut is pivotally connected to the first link or has a pivot which shares a pivot axle with the first link's pivot to the vehicle mount or to the seat support.

In one embodiment the first link comprises a box-shaped lower link and the second link comprises a box-shaped upper link, the drive link comprises a push link which is pivotally connected to a pivot on the first link, the control link shares a pivot axle with the second link's pivot to the seat support, the second end of the shock strut shares a pivot axle with the first link's pivot to the vehicle mount, and wherein the seat support and the box-shaped links provide an enclosure for the shock strut and the control link. Such an arrangement can provide a particularly compact and enclosed mechanism that is well suited for mounting on plinths (e.g. storage boxes) on a floor of a speedboat.

However, while the provision of a common pivot is preferred, other embodiments are envisaged where the control link pivot is positioned away from the other pivots, for example, along the second link or on a lug associated with the second link, or on the vehicle mount or seat support at a location which is spaced from the other vehicle mount or seat support pivots. Similarly, the second end of the shock strut may be pivotally connected to other parts of the suspension arrangement spaced from the other vehicle mount or seat support pivots.

For all suspension arrangements, the control link may be configured to guide the first end of the shock strut along a path that extends, at least initially, away from a starting position of a second, opposite end of the shock strut, the path following a curved path, for example, an arc about the control link pivot, and through this guided movement of the first end of the shock strut relative to the second end, the control link causes the motion ratio of the suspension mechanism to increase during the progression of the compression stroke.

The control link may be arranged to pass through a transition where the first end of the shock strut is guided along an arcuate path away from the second end of the shock strut by smaller relative amounts to a point where the first end of the shock strut starts to be guided towards the second end of the shock strut by increasing amounts. That transition may occur after a halfway point of the compression stroke, for example, during a final two thirds of the compression stroke. More specifically, the transition may occur as the shock strut pivot is guided around an opposite side of the control link pivot to the second end of the shock strut. Put another way, the transition may occur when a line extending from the control link pivot to the shock strut pivot becomes parallel with a longitudinal axis of the shock strut.

The control link may be any shape to perform its function. Drive is provided by the fall of the seat support with respect to the vehicle mount, and this drive is converted into torque which rotates the control link to guide the first end of the shock strut about the control link pivot. The first end of the shock strut is preferably guided by an axle passing through a pivot connection of the shock strut, the axle extending to a pivot connection in the control link; and more preferably to a pair of pivot connections provided in control links arranged on opposite sides of the shock strut. The first end of the shock strut may be guided in an arc by the axle and the pair of control links about their respective control link pivots. The axle and pair of control links may together form a crank which guides the first end of the shock strut, the crank rotating about the respective control link pivots. The first end of the shock strut may be guided from a first quadrant on one side of a link connecting the vehicle mount to the seat mount along a curved path to a second quadrant on the other side of the link.

Preferably the control link has a generally triangular or wedge shape, with an apex corresponding to the location of a control link pivot. The other corners may define the location of a drive link pivot and/or a shock strut pivot. It may comprise a plate with formations for pivots, in particular the control link pivot, a drive link pivot and a shock strut pivot, with the plate transmitting tensile forces in the plane of the plate (the plate may include recesses and holes for weight-saving). However, arrangements are envisaged where the drive is coupled to the control link in other ways.

The location of where drive is input to the control link is preferably spaced from the shock strut pivot. It is preferably at a location behind the shock strut pivot in the direction of rotation during the compression stroke, such that the material of the control link is under compression during the compression stroke.

The compression stroke of the shock strut can essentially be seen as having three stages. The first stage is the shock strut compressing under the weight of a person sitting on the seat (called "seat sag"). During this stage the shock strut typically compresses by between 25% to 33% of the total compression stroke. The second stage is the part of the stroke that absorbs vibrations under "everyday use", for example, low amplitude impacts like chop or small bumps, which are often seen as high frequency impacts. The third stage is the last part of the stroke that absorbs large shocks, e.g., from large impacts, which are a much lower frequency.

Preferably, the control link is arranged to cause an increasing rate of change in the motion ratio during a final third of the compression stroke, e.g. during the above described "third stage". Most preferably, the control link is configured to guide the first end of the shock strut along an arc path towards the second end of the shock strut during the final third of the compression stroke, e.g. during the above described "third stage". Depending on the specific arrangement of the seat suspension mechanism (i.e. in embodiments where the control link is positioned towards the vehicle mount end of the suspension arrangement) that second end of the shock strut may also be falling with the seat support to different extents and preferably the control link and associated componentry is configured to take account of this movement.

The way the motion ratio changes through the compression stroke can be altered by changing the shape and relative dimensions of the control link. Thus, the mechanism can be tuned according to the desired motion ratio for a particular environment. For example, in a boat for high speed river and lake use, there will be a significant amount of "surface chop" (small waves that give high frequency vibration) and the occasional big wake. In this situation the shape of the control link can be set such that the top of the stroke is relatively soft to absorb the small vibrations. If however the same boat is to be used at sea, the frequency of the impact will likely go down, but the amplitude will increase. To absorb these midrange vibrations it is preferable to have a gradual increase in motion ratio over the stroke, and sacrifice some of the low amplitude, high frequency performance.

The shape of the hull of a boat can also affect how the motion ratio response is chosen. For example, flatter bottomed boats that have good shallow water performance will exhibit more pronounced high speed wave impact.

In a most preferred embodiment the control link is generally triangular shaped, and the lengths of the sides of the triangle are chosen to provide the desired motion ratio characteristics.

In one embodiment two drive links and two control links are provided, one drive link driving one of the control links, and the other drive link driving the other control link. These may be located on opposite sides of the mechanism with the shock strut located between them. This may provide improved motion stability.

The seat suspension mechanism can be supplied as a kit of parts comprising two or more configurations of control links, each configuration being advantageous for a different use scenario, for example, flat water, inshore, offshore, racing, touring, leisure, boats type, rider weight, etc. The installer can then decide which of the control links is best suited for the expected conditions and use, and fit the selected control link and associated componentry.

In one embodiment the geometry of the control link is adjustable. This is desirable since relatively small changes in dimensions can have a significant effect on mechanism performance. One to two degrees of adjustment can be achieved using caged pivots and slideways to alter the shape of a triangular control link. The relative positions of pivot holes in the control link can be adjusted by turning a bolt to drive the pivot in the required direction.

The size of the drive link can also have an effect on the motion ratio. The effective length of the drive link could be made adjustable through having adjustable pivots or through providing a length adjustment mechanism. Preferably the drive link is an elongate component, and the length can be chosen so as to provide the desired motion ratio characteristics.

In some preferred embodiments the shock strut is a conventional gas shock absorber relying on an air/gas spring. However, the shock strut may alternatively comprise a mechanical spring and a fluid shock absorber, i.e. a coilover shock absorber. For marine applications in particular, the coil spring may be more desirable to mitigate any problems in the event of a spring failure, and preferably the coil is made of titanium to prevent corrosion. Although titanium is costly, a coilover shock absorber with a titanium spring may still be cheaper than an air shock absorber, while still producing a plush, expensive-feeling suspension response.

According to another aspect, there is provided a vehicle seat suspension mechanism, comprising a vehicle mount, a seat support linked to the vehicle mount by a suspension arrangement which allows the seat to fall with respect to the vehicle mount under load; a shock strut arranged to be compressed and resist the seat support falling with respect to the vehicle mount during a compression stroke, and wherein one end of the shock strut is guided along a path during the compression stroke that reduces the amount of gearing between the fall of the seat support and the compression in the shock strut to cause a motion ratio of the suspension mechanism to increase during progression of the compression stroke.

All the previously discussed optional features apply equally to this aspect. Thus, preferably the shock strut comprises a spring having a linear spring rate response. For example, the shock strut may be a conventional coilover shock strut. Preferably it comprises a titanium based coil, making it particularly suitable for marine environments. Alternatively, it may comprise a gas shock strut. The suspension arrangement may comprise a parallelogram, scissor or other linkage arrangement as described above. It may comprise a control link to guide one end of the shock strut that is driven by the fall of the seat support, for example, as described above.

A significant advantage of the seat suspension mechanism is that the damping response provided by the shock strut is well matched to the shock compression, because the relative velocity of the shock strut is caused to increase through the compression stroke. Thus the rider experiences more damping during the bigger impacts when higher spring forces are exerted against the seat support.

Viewed from yet another aspect there is provided a vehicle seat suspension mechanism, comprising a vehicle mount, a seat support linked to the vehicle mount by a suspension arrangement which allows the seat to fall with respect to the vehicle mount under load; a shock strut arranged to be compressed and resist the seat support falling with respect to the vehicle mount during a compression stroke, and wherein one end of the shock strut is guided by a control link along a path during the compression stroke, and wherein the control link causes a damping force provided by the shock strut during a full stroke movement to reach a peak value when the seat deflection is greater than 50% of a total seat deflection.

There is also provided a method of adjusting a damping response of a shock strut used to resist a fall of a seat support with respect to a vehicle mount in a vehicle seat suspension mechanism, the method comprising pivotally coupling a first end of a shock strut to a control link, the control link being mounted to be driven about a control link pivot by the fall of the seat support, and guiding the first end with respect to the second end of the shock strut in a manner which causes a motion ratio of the suspension mechanism to increase during progression of a compression stroke. The first end of the shock strut may be guided along a path during the compression stroke which causes a damping force provided by the shock strut during a full stroke movement to reach a peak value when the seat deflection is greater than 50% of a total seat deflection.

Again, all the previously discussed optional features apply equally to this aspect. For example, preferably the control link causes a motion ratio of the suspension mechanism to increase during progression of the compression stroke. Also, the suspension arrangement may comprise a parallelogram, scissor or other linkage arrangement as described above. The shock strut may comprise a coil spring or a gas spring.

For all aspects, where the suspension arrangement comprises a parallelogram linkage, the seat may "fall" backwards, opposite to the direction of travel. In other embodiments the seat may be configured to "fall" forwards towards the direction of travel. This can be done by turning the mechanism through 180 degrees.

In some embodiments the seat support is maintained parallel to the vehicle mount during the compression stroke of the shock strut, in other words it "falls" in a parallel fashion. This is achieved by having first and second links of the same length that remain parallel during the motion of the stroke. The top of the seat support and the bottom of the vehicle mount thus remain parallel throughout the stroke.

Alternatively the top of the seat support can be arranged at the start of the compression stroke to be at an angle with respect to a line parallel to the bottom of the vehicle mount, and thus due to the parallel motion the seat support will remain at this angle during the compression stroke, i.e. a "fixed tilt". Preferably this fixed tilt is such that the top of the seat support is angled backwards to the direction of travel, by up to 6 degrees with respect to a line parallel to the bottom of the vehicle mount, more preferably about 3 degrees (typically seat bases are angled back at up to 3 degrees before taking into account additional rotation). A seat cushion on the seat support may be configured to take up some or all of any inclination present in the seat support.

In some embodiments a forwards or backwards tilt is introduced to the seat during the stroke, i.e. a "varying tilt". This may be achieved by utilising link arms of differing length and/or arranging them in a non-parallel fashion. As the stroke progresses the seat support will gradually tilt more and more until a maximum tilt is achieved, in other words the seat "falls" in a non-parallel fashion. The tilt is preferably measured as an angle between the top of the seat support and a line parallel to the bottom of the vehicle mount (ignoring any "fixed tilt"). The tilt preferably varies from zero (at the start of the stroke) to up to 15 degrees when the shock strut is at maximum compression. Larger amounts of tilt than this may cause a user to feel unwell.

Tilting the seat back during a compression stroke has the advantage that it helps to maintain a constant eye line, allowing instruments and the direction of travel to stay in the centre of the driver's view. Furthermore, tilting back when subject to a large deceleration that has both a horizontal and vertical component (such as a boat hitting wave, where the boat is both forced upwards and the forward speed is suddenly reduced) allows the body to recline backwards, channelling the forces towards the seat base. In other words the user is pushed into their seat. In contrast, if the seat remains parallel and does not tilt, the horizontal element of deceleration causes the upper torso to be pushed out of the seat.

The choice of whether to provide for seat tilt, and if so the amount, may depend on the expected user of the seat. For example, children are less susceptible to angular acceleration than adults and thus are less likely to feel unwell due to a large varying seat tilt. It can therefore be envisaged that a seat tilt that varies from zero up to more than 15 degrees, e.g. up to 20 degrees could be used in a seat aimed at children to make use of the "cushioning effect" of the through-stroke tilting (rotation).

The suspension mechanism may be a "low profile" or compact mechanism that can be mounted on top of a structure e.g. a pedestal, or a centre console. It may be provided together with a pedestal or centre console as a retrofit aftermarket accessory. This enables the space underneath the mechanism e.g. within the pedestal or console, to be used for storage. On high-speed boats space is at a premium and so this can offer considerable advantages. This type of mechanism is referred to herein as an "inverted low profile mechanism", since the control link is in an inverted position to that of the free-standing embodiments described below. The seat utilised with such an embodiment may be either a "sit-on" seat (where the rider's feet contact the deck, essentially a "standing seat", i.e. a jockey seat) or a "sit-in" seat (where the rider sits in a chair and the stabilising effect of the feet is not required).

Alternatively the suspension mechanism may be a "freestanding" mechanism that can be installed straight onto the deck of a boat without needing extra plinths or structures. The seat utilised in such an embodiment is preferably a "sit-on" seat (if it was a "sit-in" seat then extra foot support structures would be required). Again the seat suspension mechanism may be supplied factory-fitted to a vehicle or as a retrofit aftermarket accessory.

The seat suspension mechanism may be fitted to all the seats on a speedboat or vehicle. The present invention also extends to a vehicle comprising the seat suspension mechanism for one or more of the seats. Preferably the vehicle is a marine vehicle, such as a speedboat; however, it could also be a land-based or amphibious vehicle, for example, a rally vehicle, an off-road vehicle, a lorry, a truck, a tank, a tractor or other farm machinery, a coach, a bus, a tram, a train, a hovercraft, snow-mobile, motorbike, etc., in fact any vehicle where one or more riders may benefit from the additional comfort provided by the seat suspension mechanism. It may also be useful in aircraft, such as, planes, helicopters, transport planes, etc., as well as in simulators.

In another aspect, the invention provides a vehicle seat mounted on a vehicle seat suspension mechanism, the vehicle seat suspension mechanism comprising a rising ratio link assembly configured to cause a motion ratio of the suspension mechanism to increase during progression of a compression stroke.

The rising ratio link assembly may comprise a control link and a shock strut as previously described. The suspension mechanism may include a seat support and a vehicle mount, wherein the rising ratio link assembly is positioned within or at least partially within a suspension arrangement linking the seat support to the vehicle mount.

Viewed from a further aspect the present invention provides a rising ratio link assembly which comprises two or more control links, two or more drive links, a shock strut and a plurality of pivot connections coupling the links and shock strut together, wherein a first control link and a first drive link pair is arranged on one side of the shock strut and a second control link and a second drive link is arranged on an opposite side, each control link being arranged to be driven simultaneously about its control link pivot by the first and second drive links respectively, the control links being coupled together by an axle which also provides a pivot connection with a first end of the shock strut to guide it with respect to a second end of the shock strut during a compression stroke. The rising ratio link assembly may further include a bracket for mounting to a seat support or a vehicle mount the first and second control links via the pair of control link pivots. The bracket may maintain a spaced relationship for the control links on opposed sides of the shock strut. A further bracket or set of brackets may be provided for mounting to the other of the seat support or vehicle mount the second end of the shock strut and/or driven ends of the drive links. The rising ratio link mechanism may be sized and adapted for fitting between a seat and a surface of the vehicle to which the seat is to be mounted. The rising ratio link assembly may comprise any of the preferred features mention herein. It may be configured for mounting within or partially within a suspension arrangement for a vehicle seat suspension mechanism. It may be provided as a complete package comprising the suspension arrangement, a vehicle mount and a seat support. It may be provided complete with a seat for one or more riders.

BRIEF DESCRIPTION OF THE FIGURES

Preferred embodiments of the present invention will now be described by way of example only and with reference to the accompany drawings, in which:

FIG. 8a illustrates a seat suspension mechanism according to a third embodiment of the invention;

FIG. 8b is a further view of the seat suspension mechanism according to the third embodiment of the invention in which some elements are shown as being transparent such that internal parts can be seen;

FIGS. 10a to 10f are side views of the fourth embodiment in which some elements are shown as being transparent such that internal parts can be seen, wherein FIG. 10a illustrates the seat suspension mechanism at full height, with the subsequent Figures showing it in gradually compressed positions, with FIG. 10f illustrating maximum compression;

FIGS. 15a to 15f are side views of the fifth embodiment in which some elements are shown as being transparent such that internal parts can be seen, wherein FIG. 15a illustrates the seat suspension mechanism at full height, with the subsequent Figures showing it in gradually compressed positions, with FIG. 15f illustrating maximum compression;

FIGS. 19a to 19f are side views of the sixth embodiment in which some elements are shown as being transparent such that internal parts can be seen, wherein FIG. 19a illustrates the seat suspension mechanism at full height, with the subsequent figures showing it in gradually compressed positions, with FIG. 19f illustrating maximum compression;

FIG. 24 is a graph showing shock compression v. seat height during a compression stroke of the seat suspension mechanism of the first embodiment for three different length push links;

FIG. 25 is a graph showing both motion ratio and shock deflection v. seat deflection from rest during a compression stroke of the seat suspension mechanism of the fifth embodiment shown in FIGS. 13a to 15f;

FIG. 31 is a view of the seventh embodiment in the direction of line A of FIG. 30a;

FIGS. 33a to 33i are side views of the seventh embodiment with the right scissor omitted such that internal parts can be seen, wherein FIG. 33a illustrates the seat suspension mechanism at full height, with the subsequent Figures showing it in gradually compressed positions, with FIG. 33i illustrating maximum compression;

FIGS. 34a to 34e are perspective views of the seventh embodiment with various parts omitted such that internal parts can be seen, wherein FIG. 34a illustrates the seat suspension mechanism at full height, with the subsequent Figures showing it in gradually compressed positions, with FIG. 34e illustrating maximum compression;

DETAILED DESCRIPTION OF EMBODIMENTS

Figure 1:
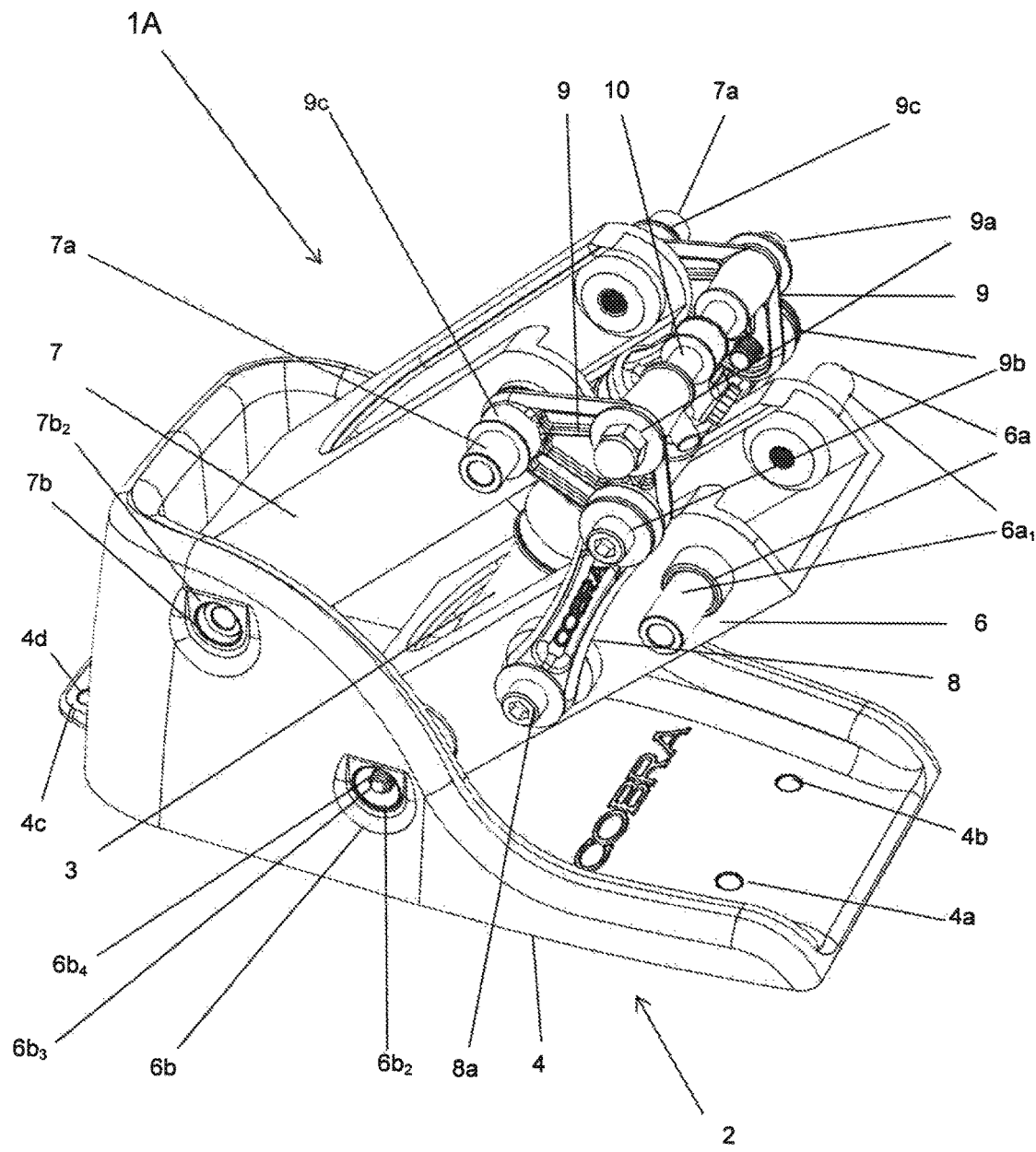
FIG. 1 is a perspective view of a seat suspension mechanism according to a first embodiment of the invention, with the seat support removed.

For ease of understanding, it should be noted that parts in the different embodiments that have the same function are given the same reference numerals, even if they look different. For example, the drive link is numbered 8 in each embodiment even though it takes a different shape in some of the embodiments. The only difference in the numbering is that the vehicle seat suspension mechanism is given a different alphabetical suffix in the different embodiments, e.g. the first embodiment is numbered 1A, the second embodiment 1B, the third embodiment 1C etc.

A first embodiment of a vehicle seat suspension mechanism 1A according to a first embodiment of the invention is illustrated in FIG. 1. In this Figure, the seat support 5 is not shown so that the mechanism can be more clearly seen. The seat suspension mechanism 1A including the seat support 5 is shown in exploded view in FIG. 2, and in perspective view in FIG. 3.

The suspension mechanism 1A comprises a suspension linkage 2 for a seat and a shock strut 3 arranged for compression during movement of the suspension linkage 2.

The suspension linkage 2 comprises a vehicle mount 4 for attachment to a pedestal on a vehicle such as a speedboat, and a seat support 5 (not shown in FIG. 1 but visible in FIGS. 2 to 4) upon which a seat can be mounted, or, in some cases, integrally formed. The vehicle mount 4 and seat support 5 illustrated in FIGS. 1 to 4 can be composite mouldings. For example, particularly for marine applications, they may be polyurethane foam cored resin transfer mouldings or compression moulded sheet moulding compound (SMC) using either a fibreglass or carbon fibre reinforcement. Alternatively they may be castings using a lightweight alloy. For non-marine applications they could be made in any number of ways, for example from sheet metal, cast metal, machined metal, composite, compression moulded long fibre thermoset, plastic injection moulding, die casting.

In this embodiment, the vehicle mount 4 includes two holes 4a and 4b and an attachment flange 4c having two holes 4d and 4e, by which the vehicle mount can be attached to a pedestal on the vehicle. A cushion (not shown), for example of polyurethane foam, may be adhered to the top of the seat support 5, with a cover over the top (also not shown).

The suspension linkage 2 further comprises a first link 6, a second link 7, two drive links 8 and two control links 9. One drive link 8 and one control link 9 is located on one side of the shock strut 3, and the other drive link 8 and control link 9 on the opposite side of the shock strut 3. (Other embodiments may include only one drive link 8 and one control link 9).

The first and second links 6, 7 each connect the seat support 5 to the vehicle mount 4 by pivots at each end thereof, forming a parallelogram linkage suspension arrangement. Each of these links may be a bonded or fused assembly, made for example from a high performance alloy such as 6082 T6 aluminium bonded together using a single part, metal loaded epoxy resin. An advantage of a single part adhesive is that alignment and jigging can be carried out without the time pressure encountered with other methods of fixing. Once everything is set up, the jigged assembly can then be baked to cure the epoxy. Other benefits include being able to selectively hard anodise areas such as bushing seats to provide a hard bearing surface where required, without the associated cost penalty of needing to anodise the whole assembly. Or, they may be formed by moulding, machining from solid, forging, casting etc., as a single component, fabricated (welded), powder metallurgy pressed or folded out of sheet metal. For non-marine applications sheet metal may be desirable as being an effective but inexpensive solution for high volume production. Hot forged aluminium is also a possibility.

The control link 9 and shock strut 3 may be considered as part of a rising ratio link assembly 14 which is positioned partially within the parallelogram suspension arrangement linking the seat support 5 to the vehicle mount 4. The term "rising ratio link assembly" is used because, as described later below, the control link 9 guides the end of the shock strut 3 so as to increase the motion ratio through a stroke of the suspension mechanism 1A.

The axle portions (described below) extending from the links 6, 7 can be tubular extruded profiles. By specifically being tubular, the axles can be pushed in from the outside of the mechanism during assembly to facilitate assembly.

Each first link 6 is connected to the seat support 5 at pivot 6a and to the vehicle mount at pivot 6b. Each pivot 6a comprises an axle portion $6a_1$ extending outwardly from a side of the first link 6, and a hole $6a_2$ in the seat support into which the axle portion is rotationally fitted.

Each pivot 6b comprises an axle portion $6b_1$ extending outwardly from a side of the first link 6, and a corresponding hole $6b_2$ in each side of the vehicle mount 4 into which the axle portion is rotationally fitted. The first link can rotate about these axles relative to the vehicle mount 4, and the main load of the seat is taken by these axles.

In addition, in this embodiment, there is a hole $6b_4$ in the middle of each axle portion $6b_1$ and a shaft $6b_3$ extends across the vehicle mount 4, through holes $6b_4/6b_2$ on one side and holes $6b_4/6b_2$ on the other side. Pivotally mounted on this shaft between the holes $6b_4/6b_2$ on one side and holes $6b_4/6b_2$ on the other side is, in this embodiment, a second end $3b$ of the shock strut 3. The shock strut 3 has an eyelet $3b'$ at its second end $3b$ through which the shaft is rotationally inserted. In this way, the load of the shock strut 3 is initially taken by the shaft $6b_3$, and is then transferred to the axle portions $6b_1$.

Each second link 7 is connected to the seat support 5 at pivot $7a$ and to the vehicle mount at pivot $7b$. Each pivot $7a$ comprises an axle portion $7a_1$ extending outwardly from a side of the second link 7, and a hole $7a_2$ in the seat support into which the axle portion is rotationally fitted. Each pivot $7b$ comprises an axle portion $7b_1$ extending outwardly from a side of the second link 7, and a corresponding hole $7b_2$ in the side of the vehicle mount 4 into which the axle portion $7b_1$ is rotationally fitted.

The described axle portions are preferably standard extruded profiles.

Figure 7:
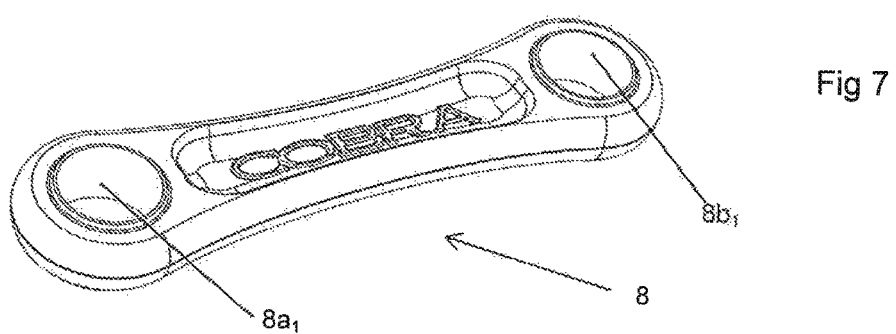
FIG. 7 illustrates a drive link used in the first, second and third embodiments of the invention.
Figure 9A:
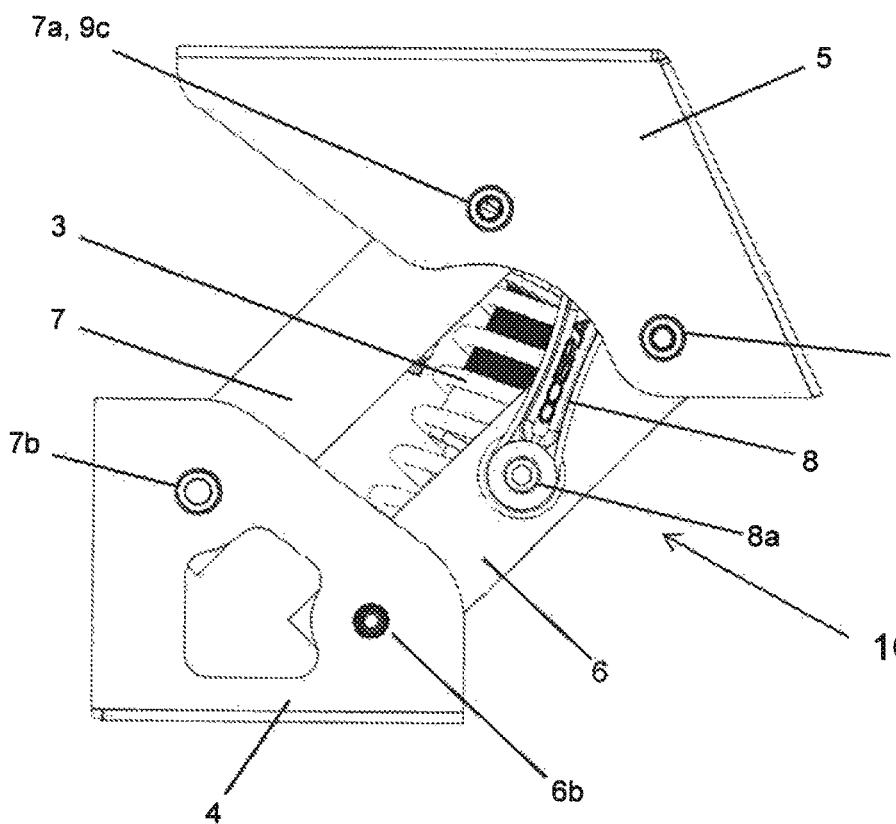
FIG. 9a is a side view of the third embodiment.
Figure 9B:
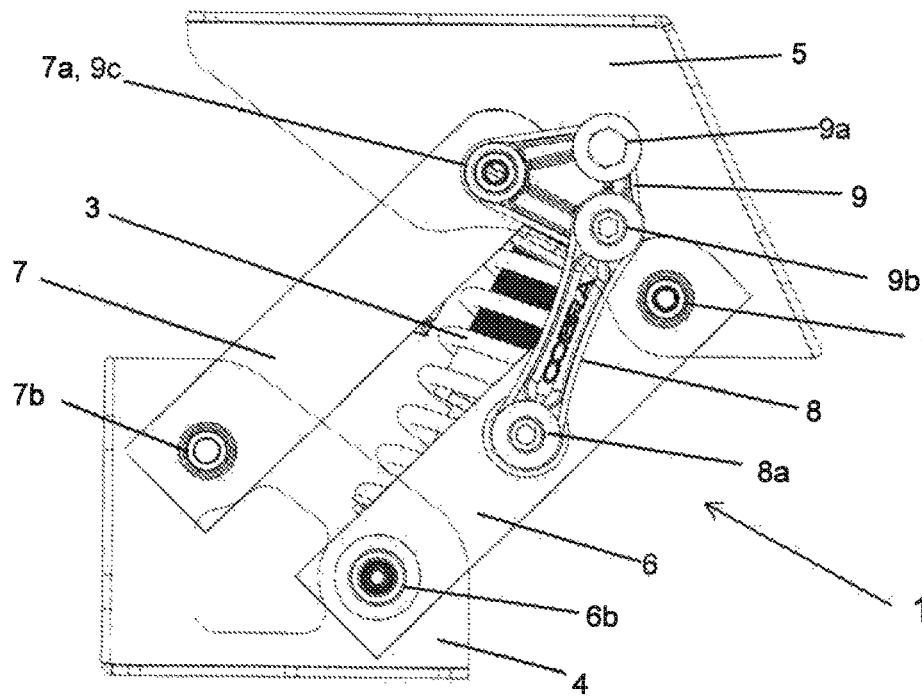
FIG. 9b is a further side view of the third embodiment in which some elements are shown as being transparent such that internal parts can be seen.

Each drive link 8 is an elongate component having two holes $8a_1$ and $8b_1$, as can be seen in FIG. 7. It may be made, for example, from investment cast 316 stainless steel or a moulded composite, and the holes may be sleeved with polymeric bushes. It could alternatively be powder metallurgy sintered, laser profiled, machined, die cast, injection moulded etc. It is pivotally coupled at one end to the first link 6 at pivot $8a$ and at the other end to the control link 9 at drive link pivot $9b$. Each pivot $8a$ comprises the hole $8a_1$ in the drive link 8 and axle portion $8a_2$ extending outwardly from a side of the first link 6 onto which the hole $8a_1$ is rotationally fitted such that the drive link 8 can pivot with respect to the first link 6. The drive link pivot $9b$ is described further below.

Figure 5:
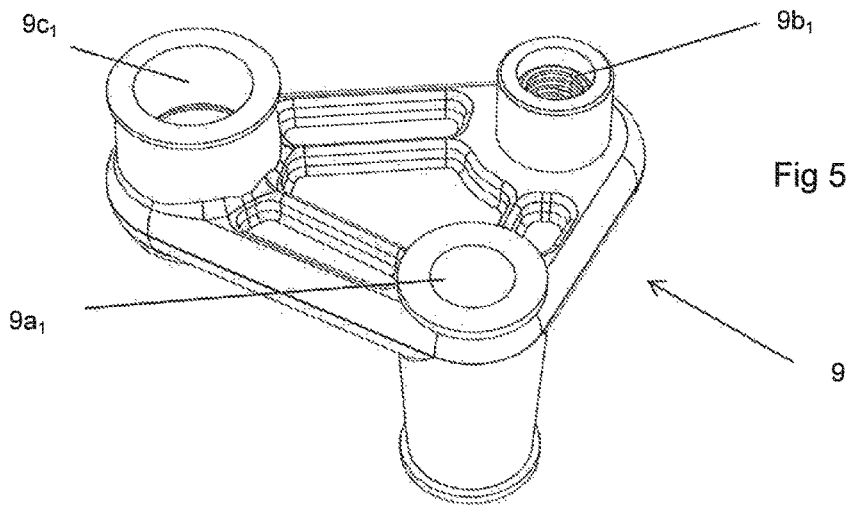
FIG. 5 illustrates an example of a control link used in the first and subsequent embodiments of the invention.

Each control link 9 is a triangular shaped part having three attachment points for forming pivots: hole $9a_1$ for forming shock strut pivot $9a$, axle portion $9b_1$ for forming drive link pivot $9b$ and hole $9c_1$ for forming control link pivot $9c$, as can be seen in FIG. 5. It may be made from investment cast 316 stainless steel as this has advantages in terms of production volumes and initial tooling costs, or a moulded composite, with bushed bearings and helicoiled threads so that it is suitable for a marine environment. However it may also be made from CNC machined metal, hot forged aluminium, composite, die cast, blanked and drawn sheet metal, powder metallurgy, metal injection moulded or grade 5 titanium.

Figure 2:
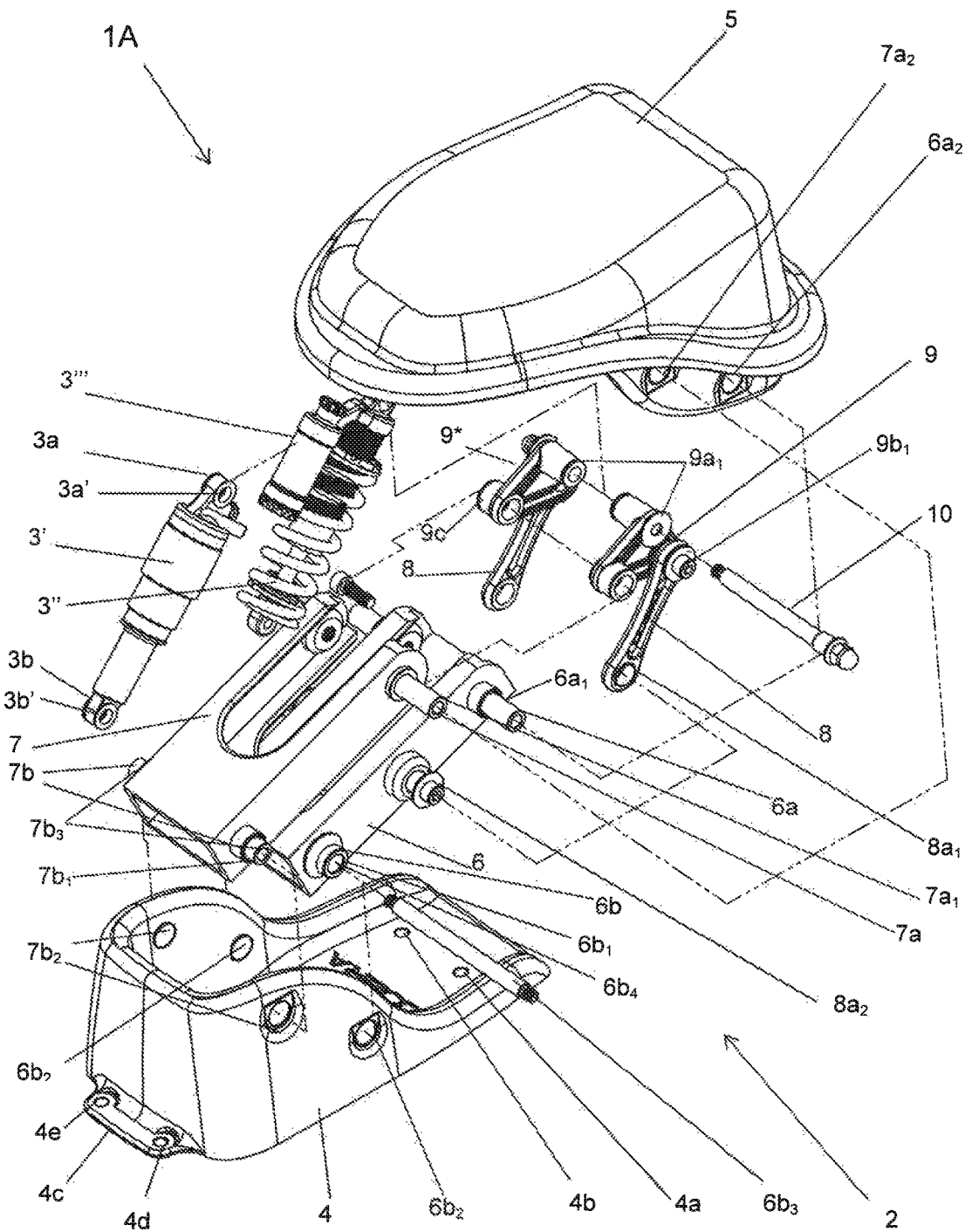
FIG. 2 is an exploded view of the seat suspension mechanism of the first embodiment (showing in addition the shock strut of a second embodiment)
Figure 3:
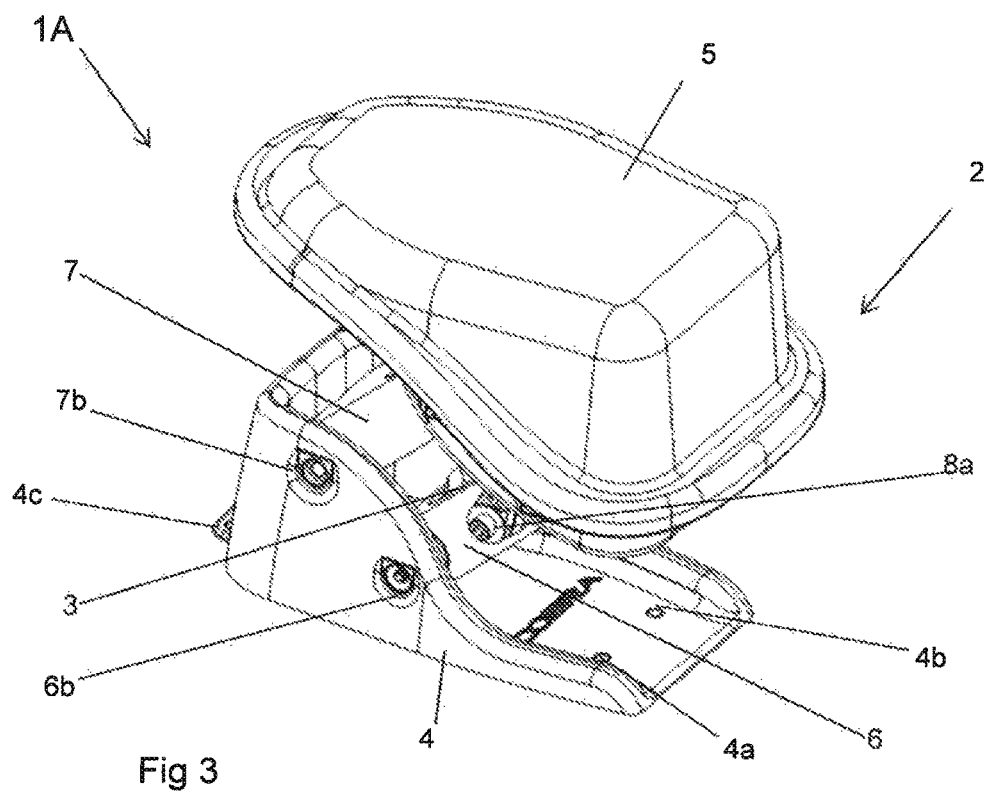
FIG. 3 is a perspective view of the first embodiment.

Whilst both control links 9 are of the same shape with three attachment points for forming pivots, and perform the same function, it can be seen from FIG. 2 that one is essentially a mirror image of the other. This is a practical necessity in this particular embodiment as the control links 9 are located on opposite sides of the mechanism. The control link 9 shown in FIG. 5 is in fact the control link 9 on the far side of the mechanism of FIGS. 1 and 2, marked in FIG. 2 as 9*.

Each control link 9 is pivotally connected to a first end $3a$ of the shock strut 3 at shock strut pivot $9a$. Each shock strut pivot $9a$ comprises the hole $9a_1$ in the control link, an eyelet $3a'$ in the shock strut 3 at its first end $3a$ and an axle 10. The axle 10 extends through the hole $9a_1$ in each of the control links, and the eyelet $3a'$ (which is positioned between the holes $9a_1$) so that the control link 9 can rotate about this axle 10.

Each control link 9 is pivotally connected to a corresponding drive link 8 at drive link pivot $9b$. Each drive link pivot $9b$ comprises the axle portion $9b_1$ on the control link onto which the drive link is rotationally mounted via hole $8b_1$ in the drive link. Thus, the drive link 8 can drive the control link 9 in rotational motion via drive link pivot $9b$.

There is also a hole in the middle of the axle portion $9b_1$ with an internal screw thread, allowing a bolt to be attached once the drive link is mounted so as to prevent the drive link from falling off. In a non-marine environment a circlip could be used instead of a bolt, and the hole in the axle portion $9b_1$ could be omitted. However stainless steel circlips can suffer from stress corrosion cracking in a marine environment.

Each control link 9 is pivotally connected to the second link 7 and seat support 5 at control link pivot $9c$. Each control link pivot $9c$ comprises a hole $9c_1$ in the control link, a hole $7a_2$ in the seat mount and an axle portion $7a_1$ extending outwardly from a side of the second link 7 which is rotationally fitted into holes $9c_1$ and $7a_2$. Thus in this embodiment the control link pivot $9c$ and the pivot $7a$, at which the second link 7 is pivotally connected to the seat support 5, are the same pivot so the control link 9, second link 7 and seat mount 5 can pivot with respect to each other.

Regarding the shock strut 3, this is pivotally attached at a second end to vehicle mount 4 at pivot $6b$ as discussed above and at its other, first, end to control link 9 at shock strut pivot $9a$ adjacent the seat support 5 (shown in FIG. 2, not shown in FIG. 1). The shock strut 3 is thus arranged so that it is compressed during a compression stroke of the suspension linkage 2. In the embodiment of FIG. 1, the shock strut 3 is an air sprung shock absorber, as are well known in the art. In the exploded view of FIG. 2 both this air sprung shock absorber (labelled as 3') and an alternative shock absorber, a coilover shock absorber (labelled as 3") as used in the second embodiment of the invention, are shown. To be clear, only one of these shock absorber alternatives is used in the mechanism of the invention. The air sprung shock absorber comprises one or more chambers in which the air is compressed by a piston during a compression stroke. The spring force of the shock absorber increases non-linearly, with an exponentially increasing spring rate, as the piston travels further into the unit, raising the pressure within the chamber. The coilover shock absorber is discussed below in relation to the second embodiment of the invention. The spring force is provided by a helical spring which maintains a constant increase in spring force (i.e. spring rate is constant) during compression of the unit.

Figure 4:
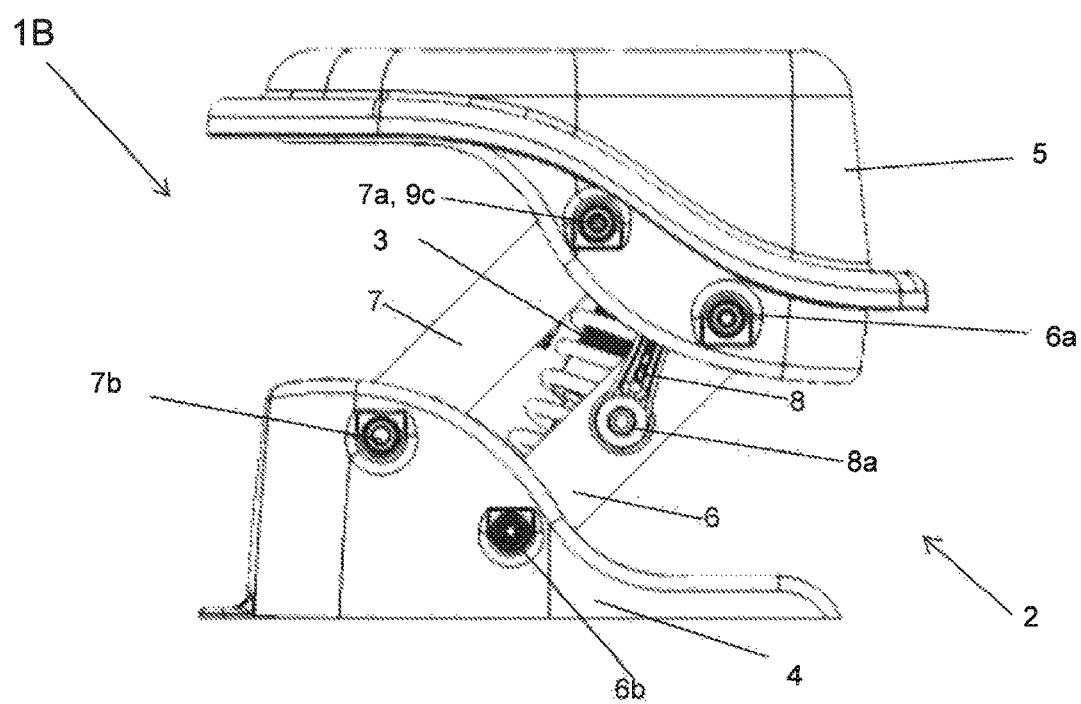
FIG. 4 is a side view of a second embodiment of a seat suspension mechanism.

A side view of a second embodiment of the invention is shown in FIG. 4. This vehicle seat mechanism 1B is identical to that of the first embodiment, except that the shock strut 3 comprises a coilover shock absorber as opposed to an air sprung shock absorber. This coilover shock absorber is also shown in FIG. 2 (labelled 3") as discussed above. It is of a standard format as known in the art, comprising a telescopic fluid (e.g. oil) damper surrounded by a coil spring. The coil spring may be made of titanium to prevent corrosion in the marine environment. In FIG. 2, an additional cylinder 3''' is shown which is an optional additional part of the coilover shock absorber for adjusting the damping and for the avoidance of cavitation in the damping fluid during repeated compression and rebound strokes.

A third embodiment of the invention is illustrated in FIGS. 8a-b, 9a-b and 10a-10f. The vehicle seat suspension mechanism 10 of the third embodiment is shown in perspective view in FIG. 8a. The mechanism is substantially identical to that of the second embodiment (and thus also the first embodiment other than the type of shock strut), except for the vehicle mount 4 and seat support 5. Rather than being made of fibreglass as in the first and second embodiments, the vehicle mount 4 and seat support 5 are made of sheet metal, for example, mild steel or stainless steel which has preferably been laser cut.

The operation of the vehicle seat suspension mechanism of embodiments one to four will now be described with reference to FIGS. 10a to 10f and the graphs of FIGS. 20 and 21.

FIGS. 10a to 10f are side views of a fourth embodiment of the invention and are illustrative of how the mechanism operates during a compression stroke of the shock strut. The vehicle seat suspension mechanism 1D of the fourth embodiment is identical to that of the third embodiment except that the shock strut 3 is an air sprung shock absorber as opposed to a coilover shock absorber. This mechanism 1D is also substantially identical to that of the first embodiment, except for the vehicle mount 4 and seat support 5. Due to these similarities between the embodiments, FIGS. 10a to 10f can essentially be seen as illustrative of the operation of all of embodiments one to four.

Figure 10A:
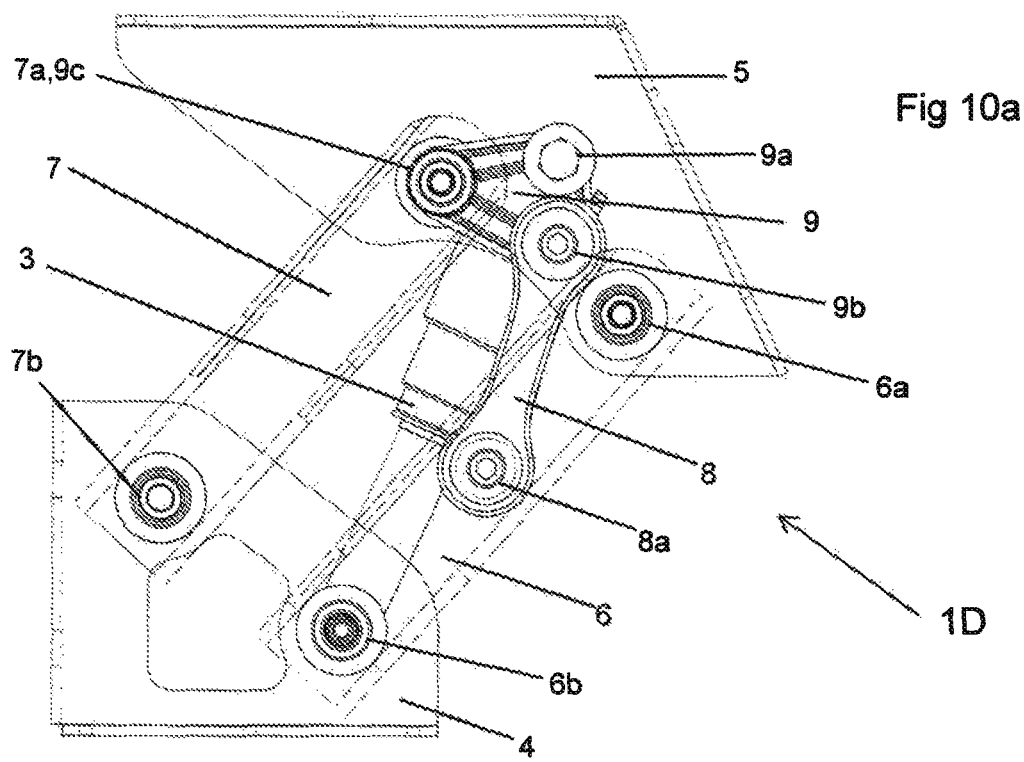
Figure 10B:
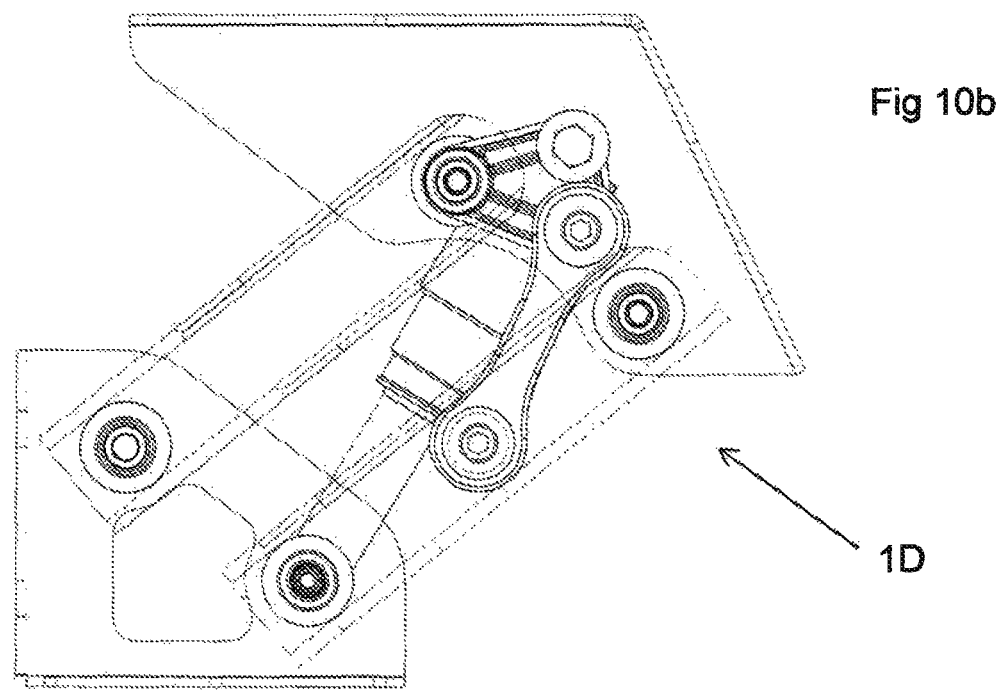
Figure 10C:
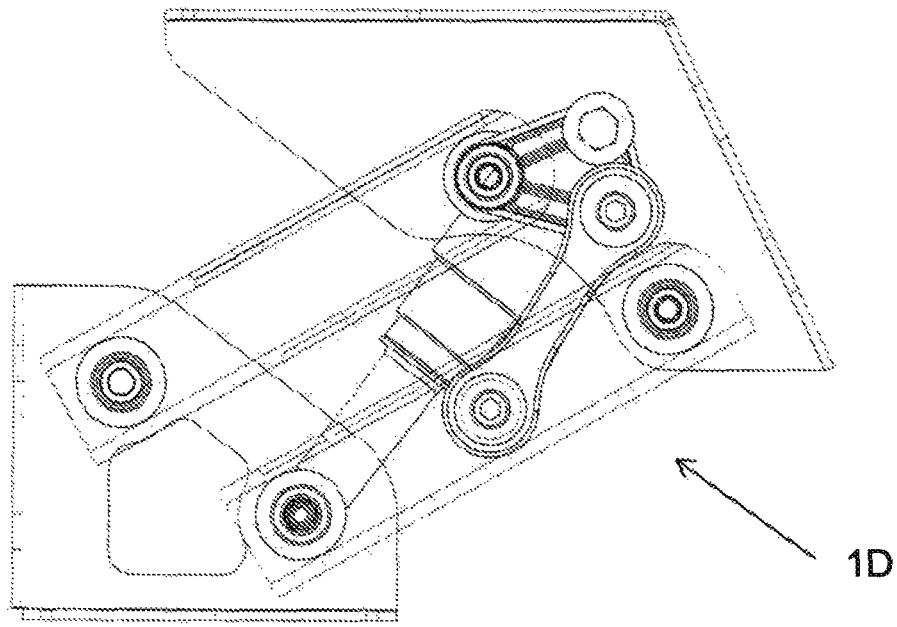
Figure 10D:
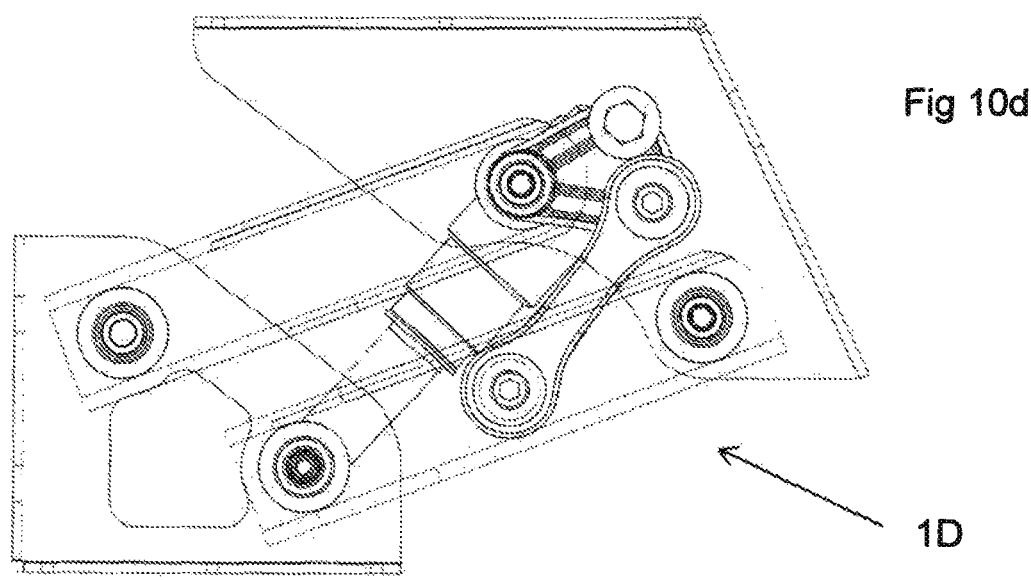
Figure 10E:
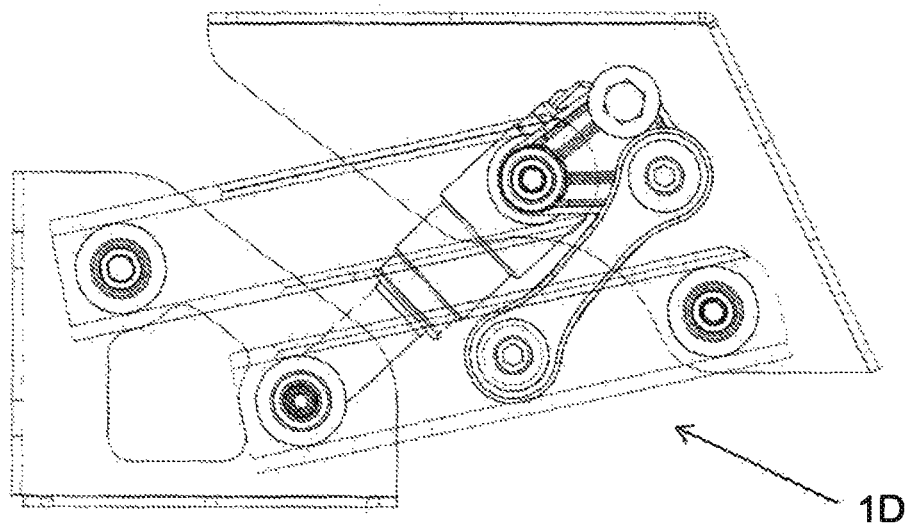

FIG. 10a illustrates the vehicle seat suspension mechanism 1D at full height, in other words the vertical distance between the bottom of the vehicle mount 4 and the top of the seat support 5 is at a maximum. The shock strut 3 is essentially fully extended in this position, being only slightly (negligibly) compressed from the effect of the weight of the mechanism and seat.

Figure 10F:
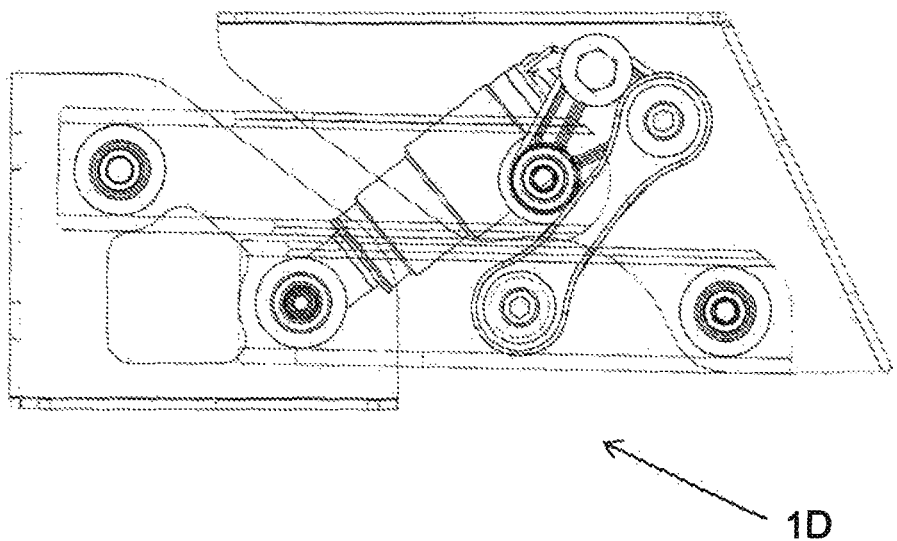

The subsequent Figures show it in gradually compressed positions, with FIG. 10f illustrating maximum compression.

When a person sits on a seat attached to the seat support 5, the force will cause the shock strut 3 to compress by approximately 25%. This is called "seat sag" and is shown by the compression of the shock strut 3 from the position shown in FIG. 10a, through that of FIG. 10b to FIG. 10c. When a vehicle, for example a boat on which the mechanism is mounted is subjected to vertical force from waves, the seat will move down relative to the boat and the shock strut 3 will compress. In the case of small waves, the shock strut 3 will compress only partially, e.g. from the position of FIG. 10c, through to that of FIG. 10d or 10e. In the case of larger waves or impacts, the shock strut 3 may compress essentially completely, for example, towards the position shown in FIG. 10f. In this position in FIG. 10f, the first and second links 6,7 are nearly touching each other, the shock strut 3 has used up all of its travel and the lower extremities of the seat support 4 are approaching the same height as the base of the vehicle mount 5. Thus, the seat can essentially move no further.

During this motion the seat moves downwards in an arcuate fashion, maintained in a parallel relationship to the vehicle mount 4 and guided by the first and second links 6, 7 that form a parallelogram linkage. In this embodiment the seat may be arranged to "fall" backwards, opposite to the direction of travel (which is to the left of the page), which may have benefits e.g. in terms of allowing the occupant to maintain a view of the horizon. In other situations it may be preferred for the seat to "fall" forwards, moving the occupant towards the vehicle controls. Crucially, however, the motion is also guided by the control link 9. As discussed above, the drive link 8 is pivotally coupled to the first link 6 and thus is driven by the motion of the first link 6 during the compression stroke. The drive link 8 in turn drives the rotational motion of the control link 9 about the control link pivot 9c. This motion of the control link 9 guides the motion of the first end 3a of the shock strut 3 through the compression stroke, thereby influencing the motion ratio of the suspension mechanism. The motion ratio is defined as:

$$\text{Motion ratio} = \frac{\text{shock strut deflection}}{\text{seat deflection}}$$

where: —shock strut deflection is the change in length of the shock strut between its first and second ends; and seat deflection is the change in height of the seat support relative to the vehicle mount.

As can be seen, during a compression stroke, the control link 9 guides the first end 3a of the shock strut 3 along a path initially extending away from the second end 3b of the shock strut 3 opposite to the first end 3a, this path following an arc about the control link pivot 9c. In this way the control link 9 guides the movement of the first end 3a of the shock strut 3 relative to the second end 3b, so as to control the amount of shock deflection at a given seat height. Whilst the shock strut deflection is always guided so as to increase through the stroke, the rate of change of shock deflection is different to that of a conventional suspension mechanism where the ends of the shock strut 3 are fixed relative to the movements of the mechanism, as will be explained further below.

In prior art mechanisms that have no control link, the compression of the shock strut, and thus the motion ratio, results entirely from the force to which the seat is subjected: i.e. as a greater force is applied, the seat moves further around its arcuate path and the shock strut compresses as a direct result. The radial fall of the seat and the fixed positions of the ends of the shock strut within the mechanism usually means that the motion ratio decreases steadily or remains constant, for example, in the case of a vertically orientated shock strut at the back of the seat assembly.

In contrast, in the invention the first end 3a of the shock strut 3 is always guided so as to reduce the rate of change of shock compression with respect to seat deflection initially and to gradually increase this later on in the stroke compared to its prior art counterpart, in other words increasing the motion ratio during the course of the stroke. In this way the motion ratio is increased in a controlled way producing a different ride characteristic compared to the prior art.

Figure 20:
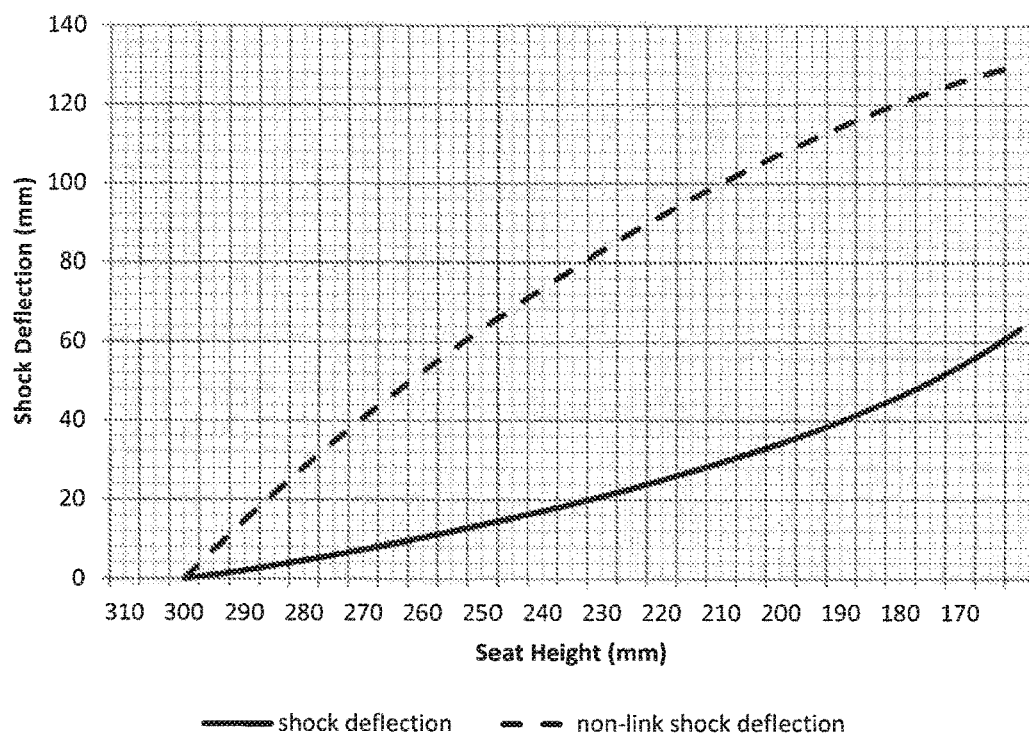
FIG. 20 is a graph showing shock deflection v. seat height during a compression stroke of the seat suspension mechanism of the first embodiment of the invention compared to a similar suspension mechanism having a conventionally mounted shock strut attached at fixed pivot points.
Figure 21:
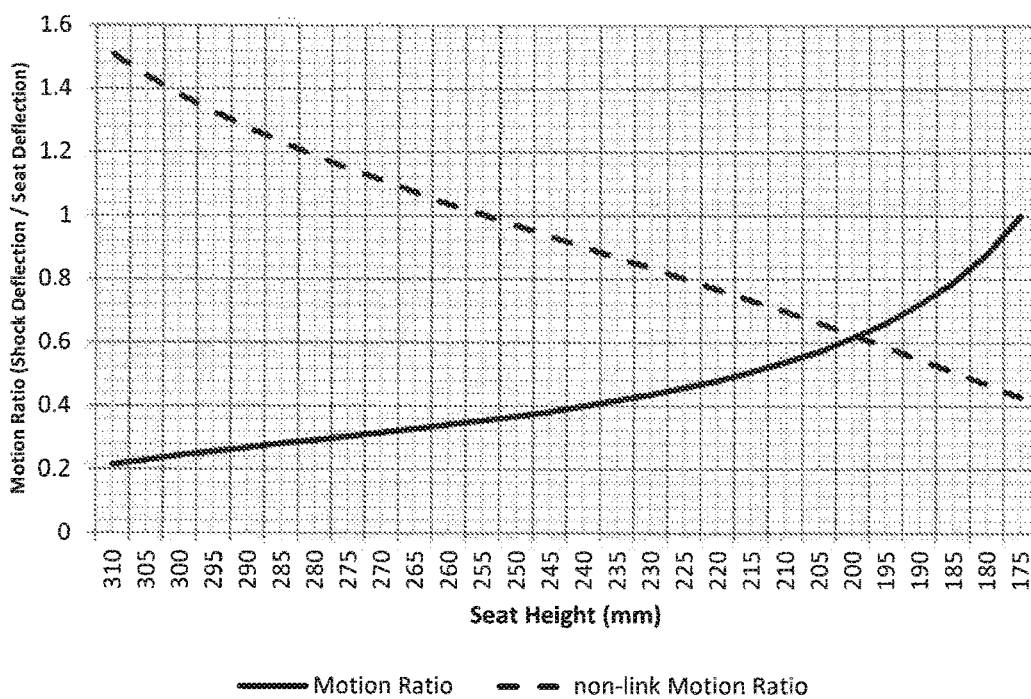
FIG. 21 is a graph showing the motion ratio v. seat height during a compression stroke of the seat suspension mechanisms used in FIG. 20.

FIGS. 20 and 21 illustrate the shock deflection v. seat height and motion ratio v. seat height respectively for the mechanism of FIGS. 10a-10f (using control link geometry A of FIG. 22—inv 50/35/55), and for an equivalent mechanism without the control link of the invention (i.e. one in which the first end of the shock strut is attached to a fixed pivot rather than one which is guided by the movement of a control link).

As can be seen from FIGS. 20 and 21, in a mechanism without a control link, the rate of change of shock deflection relative to seat deflection (i.e. the motion ratio) is initially (i.e. at the start of the compression stroke) at a maximum and then gradually reduces. In contrast, in the mechanism of FIGS. 10a-10f, it can be seen that the rate of change of shock deflection relative to seat deflection is initially (i.e. at the start of the compression stroke) at a minimum, followed by a gradual increase that increases more sharply towards the end of the stroke.

By way of further explanation, when a vehicle on which the suspension mechanism is mounted is subject to an impact (e.g. when a boat hits a wave or a land vehicle hits uneven terrain), the seat will be subject to a force, forcing the seat downwards in an arcuate fashion and compressing the shock strut. However, instead of the shock strut being compressed as a direct result of the seat displacement as in the prior art, in the invention the control link guides the first end 3a of the shock strut 3 so as to reduce, at the beginning of the stroke, the amount by which the shock would normally compress for a given change in seat deflection. In other words, the motion ratio is reduced. This essentially "conserves" some of the total amount of compression available which can then be used later in the stroke. As the compression stroke progresses, the control link guides the first end 3a of the shock strut so as to gradually increase the amount by which it compresses for a given change in seat deflection, i.e. to gradually increase the motion ratio. This increase becomes much sharper towards the end of the stroke, essentially utilising the compression that was "conserved" from the start of the stroke. A key benefit which arises from this is the improved comfort and safety resulting from the graduation of the deceleration forces that the seat delivers to the rider.

Figure 6:
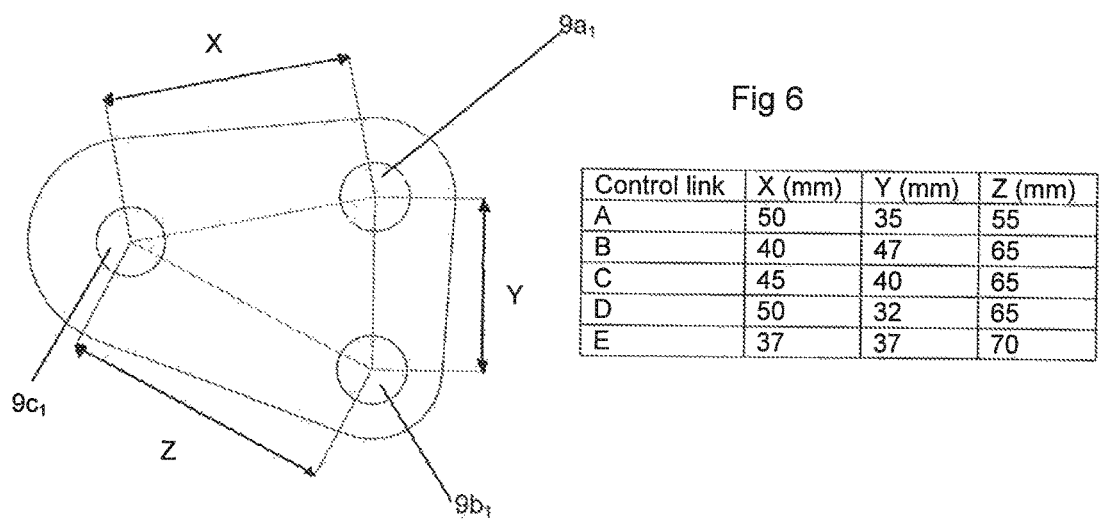
FIG. 6 is a schematic view of a suspension linkage with a table giving the preferred dimensions of preferred embodiments A-E of the control link.

Different embodiments of the control link 9 can have different dimensions. FIG. 6 schematically illustrates a control link showing dimensions X, Y and Z, where X is the distance between hole $9c_1$ and $9a_1$, Y is the distance between $9a_1$ and $9b_1$, and Z is the distance between $9b_1$ and $9c_1$. The table gives the value of these dimensions for each of five different embodiments of control link, A-E. The dimensions are dependent on many factors including the desired motion ratio, the position of the link pivots, the separation of the links, the length of the drive link and the where it receives thrust; however preferably the distances between the pivots are generally between 20-100 mm.

Figure 22:
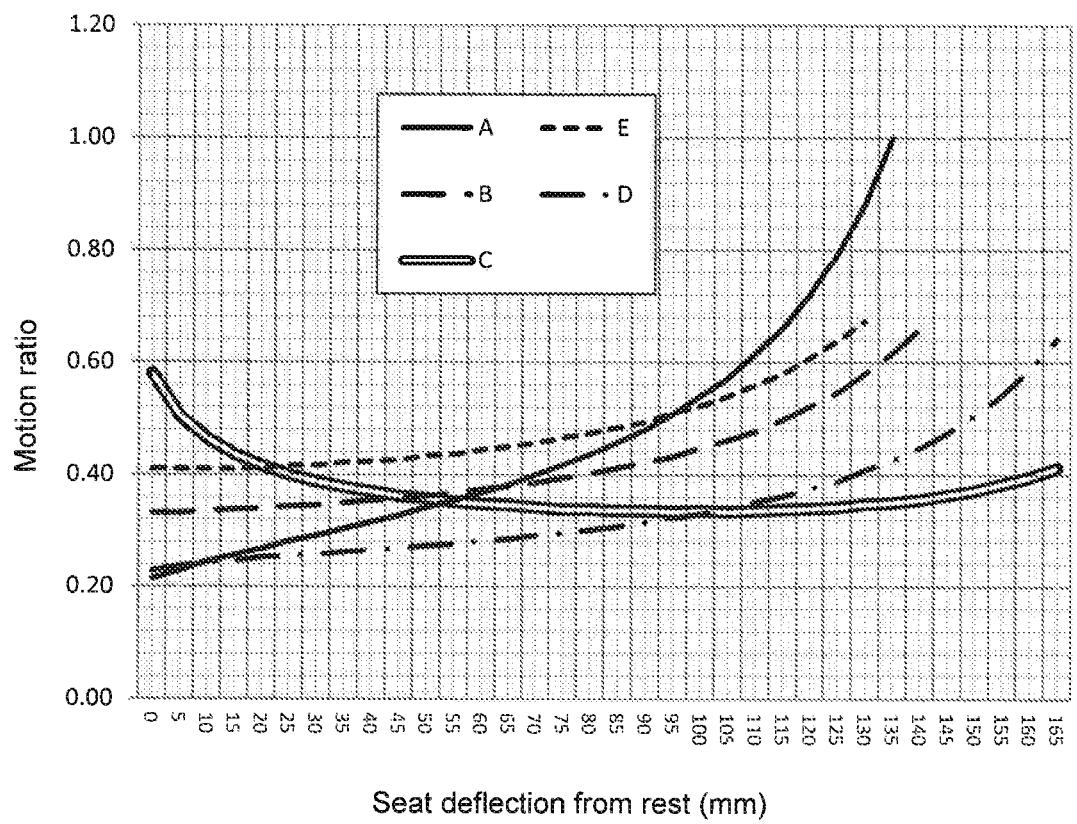
FIG. 22 is a graph showing motion ratio v. seat deflection during a compression stroke of the seat suspension mechanism of the first embodiment for the five different control links described in FIG. 6.

Different control link geometries provide different motion ratios during the compression stroke of the shock strut. A graph showing motion ratio v. seat deflection for each of the different control link geometries, when utilised in the mechanism of FIG. 1 is shown in FIG. 22.

Control link geometry A provides a very progressive set up. At the start of the stroke the motion ratio is 0.2, rising to 1.0 at the end (bottom) of the stroke. The first ⅔ of the stroke is reasonably linear, with the final ⅓ ramping up significantly.

Control link geometry B has a high initial value for motion ratio, meaning that the mechanical advantage between the seat movement and the shock compression is lower than with other control link geometries. This allows air spring shock absorbers to be used without the gas pressure required being excessively high. As air sprung shock struts already have a progressive spring rate, the level of motion ratio progression at the end of the stroke is kept low.

Control link geometry C is a "less progressive" geometry providing a less progressive motion ratio. At the start of the stroke the motion ratio is 0.33, doubling to approximately 0.66 at the end of the stroke. This mechanism is most suited to less extreme conditions where large impacts are infrequent.

Control link geometry D is a standard set up with less stroke left in reserve for the big impacts, meaning there is more shock stroke to use in the rest of the range. Reduction in shock compression for any given seat deflection takes the available travel for normal deflections from 145 mm to 170 mm, i.e. an increase of 15% or more, allowing further downwards travel than with the other illustrated control links.

Figure 11A:
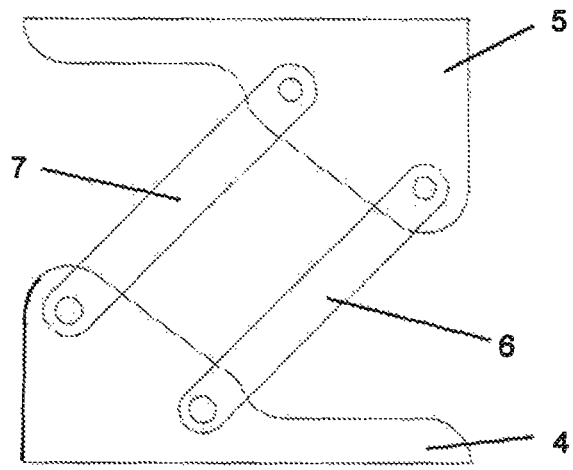
FIGS. 11a to 11c illustrate a seat suspension mechanism with first and second links having the same length, in three gradually more compressed positions as the mechanism moves through a compression stroke.
Figure 11B:
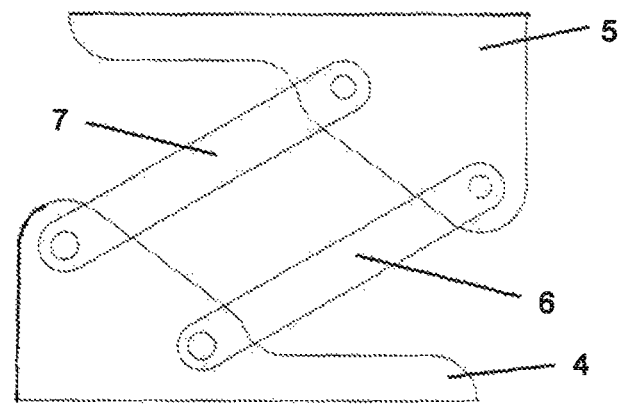
Figure 11C:
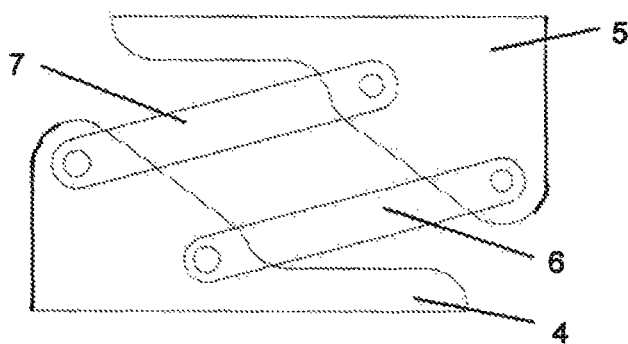

FIGS. 11a to 11c are a schematic illustration of a suspension mechanism according to the invention in which the seat support is maintained parallel to the vehicle mount during the compression stroke of the shock strut, in other words it "falls" in a parallel fashion. This is achieved by having link arms 6, 7 of the same length that remain parallel during the motion of the stroke. As can be seen in each of FIGS. 11a, 11b and 11c (in which only the seat support, vehicle mount and link arms are shown for ease of understanding), the top of the seat support 5 and the bottom of the vehicle mount 4 remain parallel throughout the stroke. This is representative generally of all the illustrated embodiments of the invention.

Figure 12A:
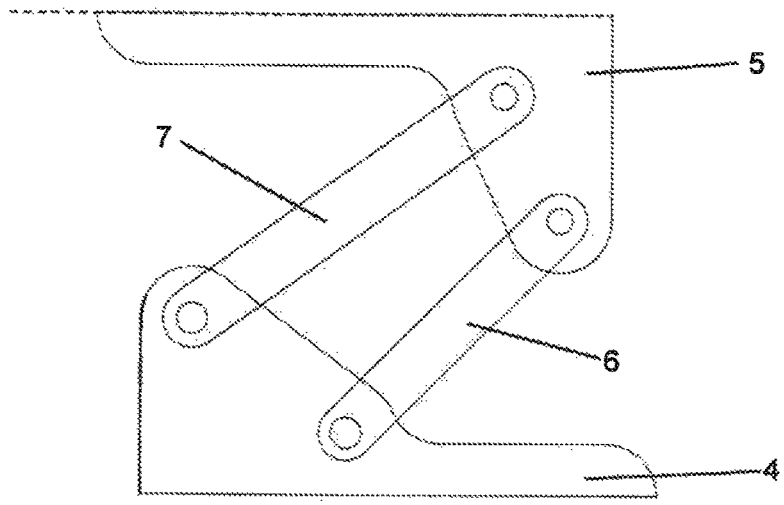
FIGS. 12a to 12c illustrate a seat suspension mechanism with first and second links having the different lengths, in three gradually more compressed positions as the mechanism moves through a compression stroke.
Figure 12B:
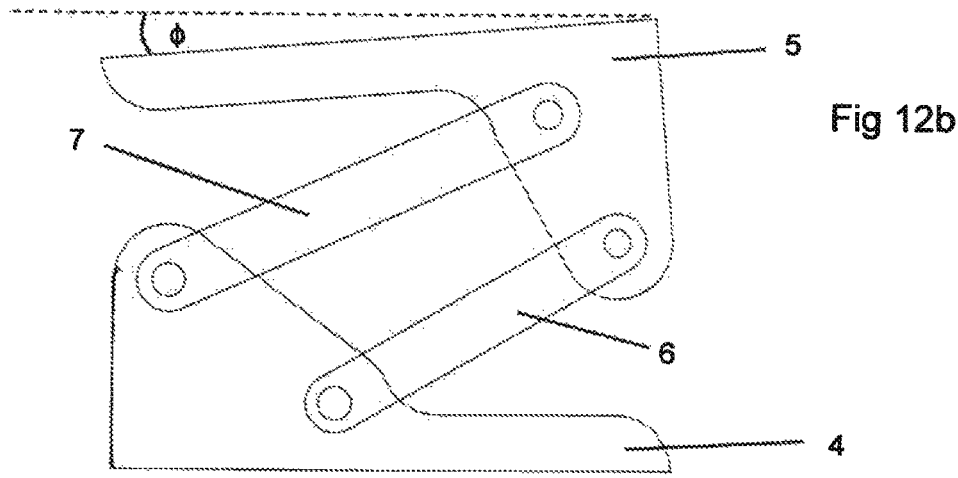
Figure 12C:
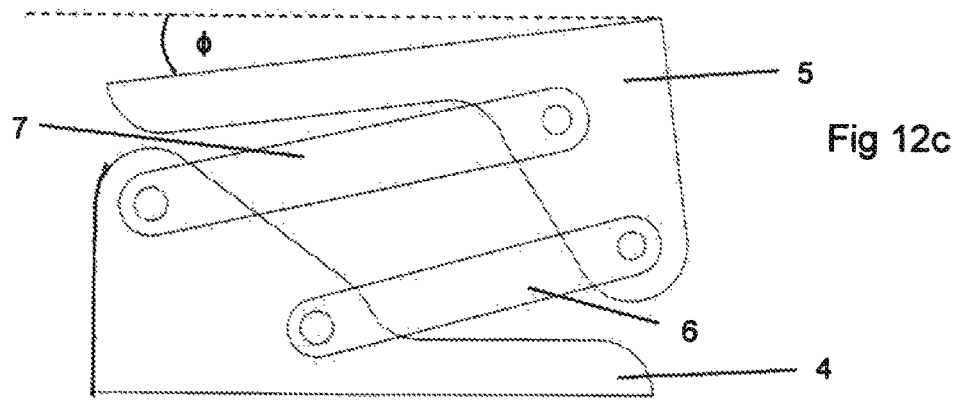
Figure 13A:
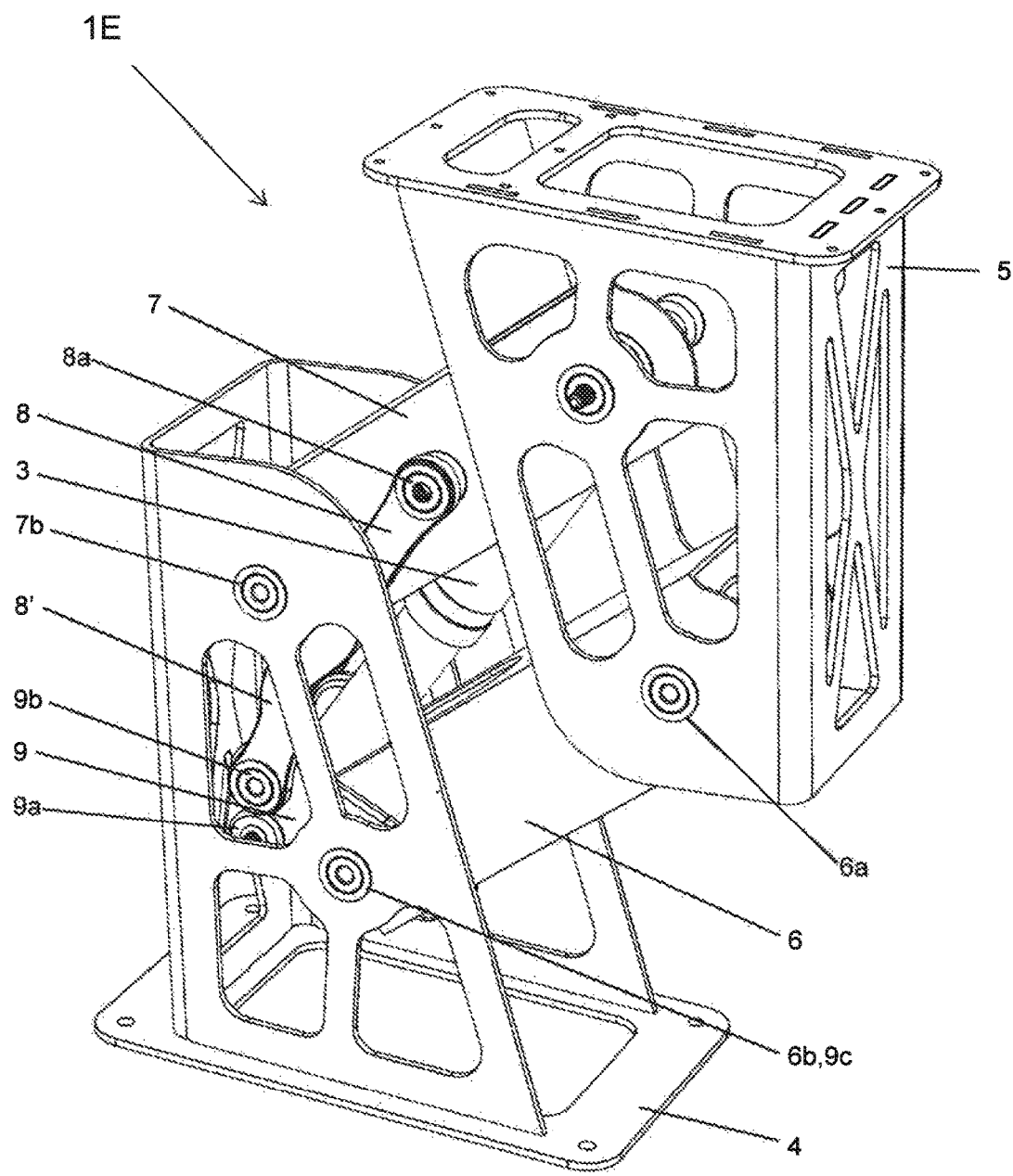
FIG. 13a is a perspective view of a seat suspension mechanism according to a fifth embodiment of the invention.
Figure 13B:
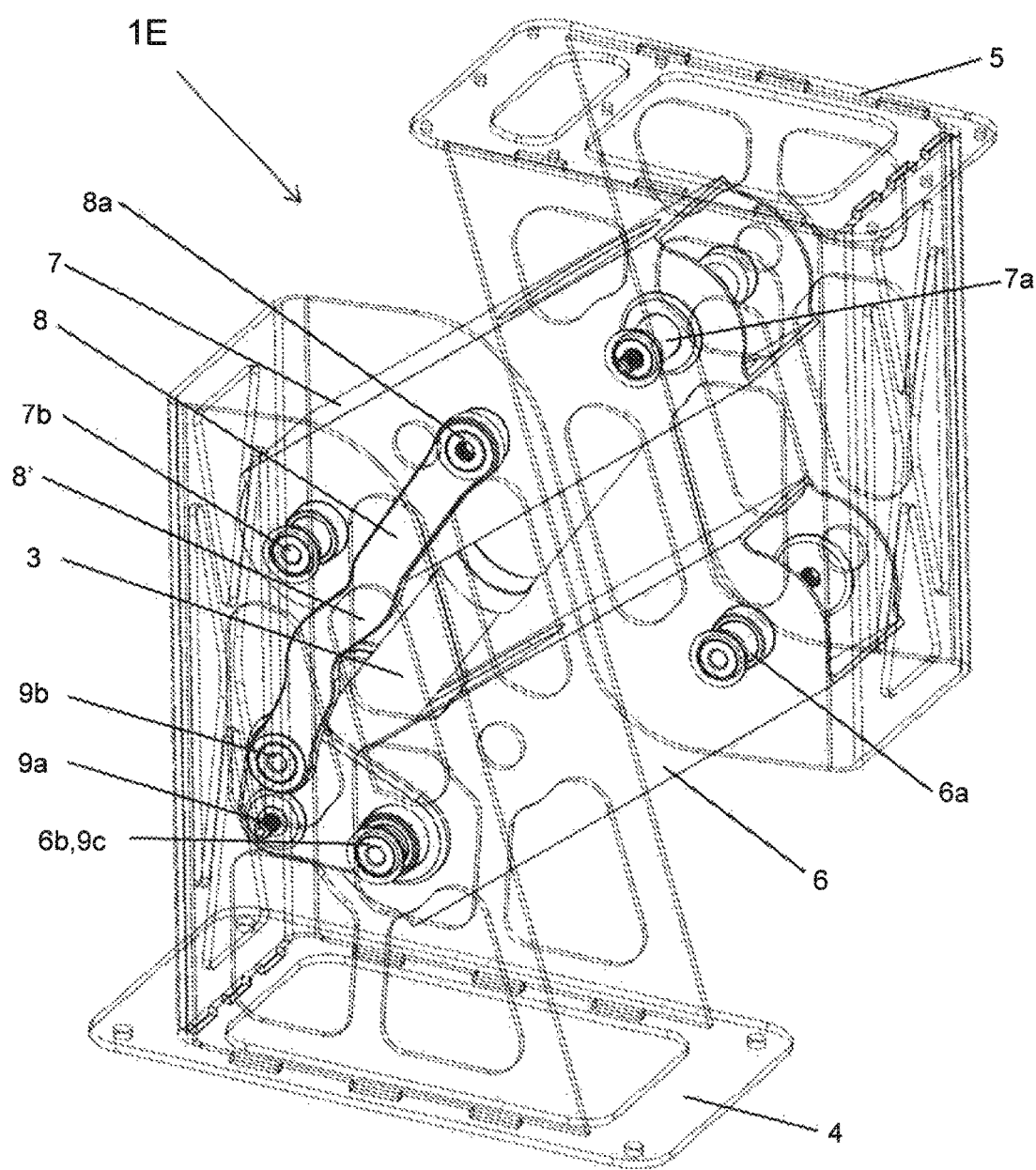
FIG. 13b is a further perspective view of the fifth embodiment in which some elements are shown as being transparent such that internal parts can be seen.
Figure 14A:
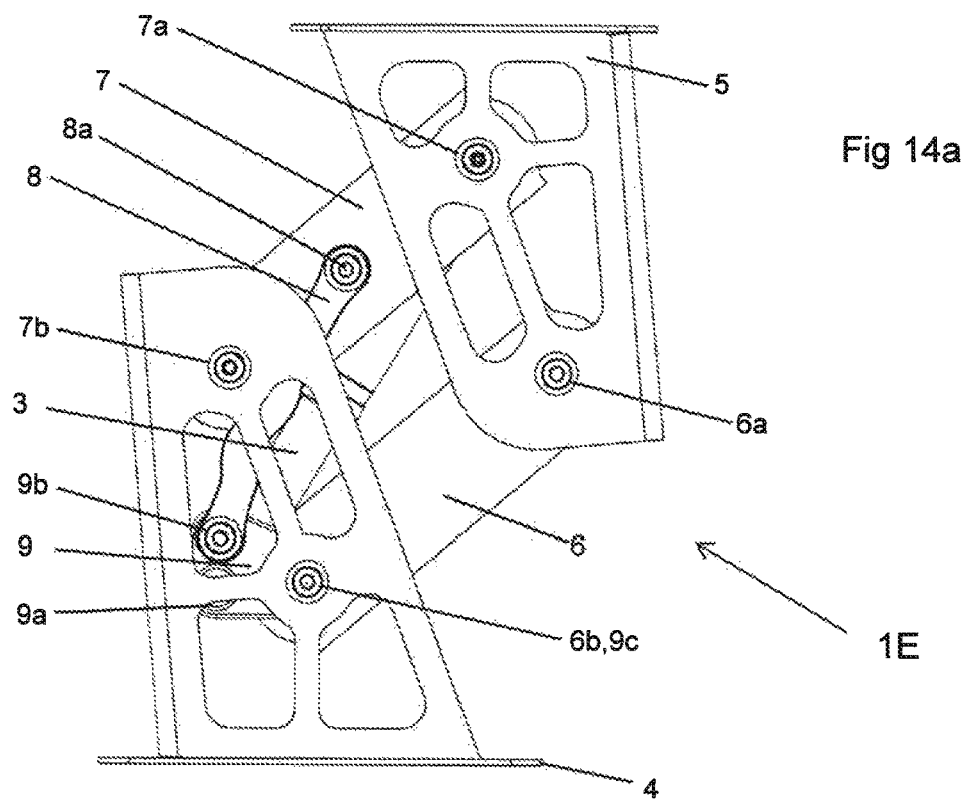
FIG. 14a is a side view of the fifth embodiment.
Figure 14B:
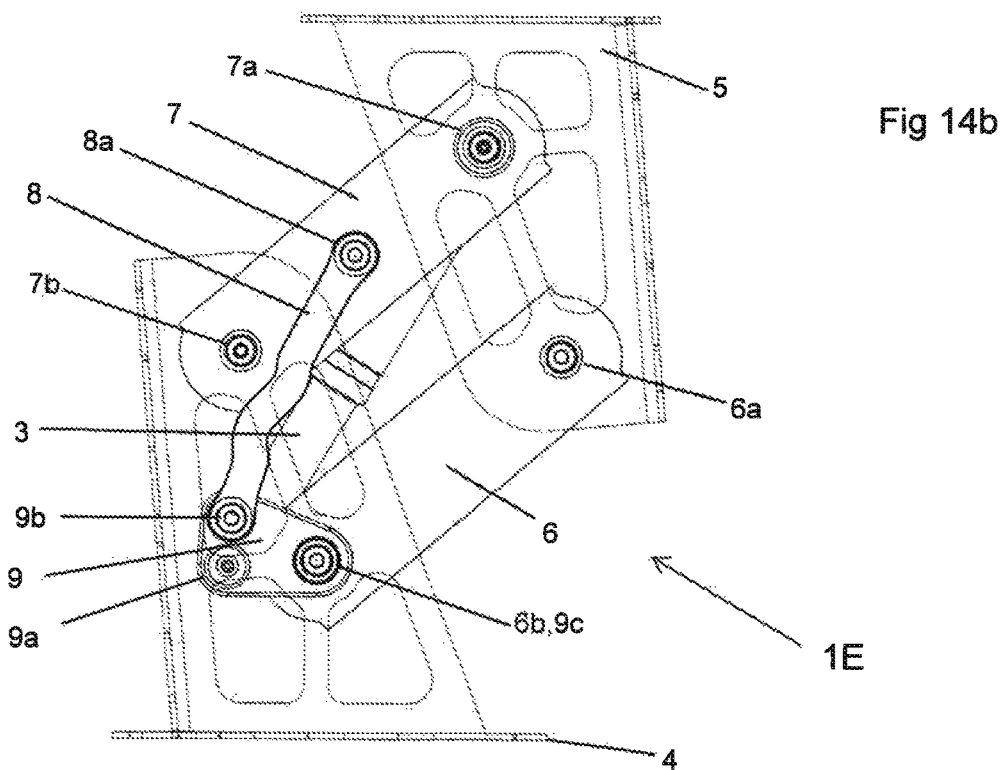
FIG. 14b is a further side view of the fifth embodiment in which some elements are shown as being transparent such that internal parts can be seen.

However, embodiments are envisaged where the link arms 6, 7 are different lengths or the pivots are not equally spaced, resulting in a motion which tilts the occupant forward or backwards. For example, FIGS. 12a to 12c schematically illustrate an embodiment in which a tilt is introduced to the seat during the stroke, i.e. a "varying tilt", by having link arms 6, 7 of differing length that are arranged to move through the stroke in a non-parallel fashion. As shown in FIG. 12a, at the start of the stroke the top of the seat support 5 is parallel to the bottom of the vehicle mount 4. However, as the stroke progresses, the top of the seat support 5 tilts by angle $\phi$ as shown in FIG. 12b, with angle $\phi$ increasing through the stroke as shown in FIG. 12c.

The suspension mechanism of each of the first, second and third embodiments are "low profile" or compact mechanisms that may be mounted on top of a structure e.g. a pedestal, or a centre console. This enables the space underneath the mechanism e.g. within the pedestal or console to be used for storage. This type of mechanism is referred to herein as an "inverted low profile mechanism", since the control link is in an inverted position to that of the freestanding embodiments described below. The seat utilised with the first, second and third embodiments may be either a "sit-on" seat (where the rider's feet contact the deck, essentially a "standing seat") or a "sit-in" seat (where the rider sits in a chair and the stabilising effect of the feet is not required).

A fifth embodiment 1E of the vehicle seat suspension mechanism is illustrated in FIGS. 13a, 13b, 14a and 14b. This is called a "free-standing" mechanism since it may be installed straight onto the deck of a boat without needing extra plinths or structures. The seat utilised with the fifth embodiment is preferably a "sit-on" seat, since if it was a "sit-in" seat then extra foot support structures would be required. This mechanism of the fifth embodiment includes broadly similar components and operates in essentially the same way to that of the first to fourth embodiments. However the control link 9 is arranged to guide the motion of the second end of the shock strut (i.e. the end adjacent the vehicle mount 4, comprising eyelet 3b') as opposed to the first end of the shock strut adjacent the seat support 5. This can be seen most clearly in FIGS. 13b and 14b in which some of the elements are shown as transparent such that the inner parts of the mechanism can be viewed.

More specifically, each control link 9 is pivotally connected to a second end 3b of the shock strut 3 at shock strut pivot 9a, via eyelet 3b' in the shock strut 3. Each control link 9 is pivotally connected to a corresponding drive link 8 at drive link pivot 9b. Each control link is furthermore pivotally connected to the first link 6 and vehicle mount 4 at control link pivot 9c (as opposed to being pivotally connected to the second link 7 and seat support 5 at control link pivot 9c as in the first to fourth embodiments). The first end 3a of the shock strut 3 is pivotally connected to the second link 7 and seat support 5 at pivot 7a.

The drive link 8 of the fifth embodiment is pivotally coupled at one end to the second link 7 at pivot 8a (as opposed to the first link 6 in the first to fourth embodiments), and at the other end of the control link 9 at control link pivot 9b as discussed above.

As can be seen, the vehicle mount 4 and seat support 5 are vertically larger structures than in the first to fourth embodiments, and due to this different shape and the positioning of the various pivots, various components are differently shaped in this embodiment including the drive link 8 that is longer and has a kinked portion 8' to enable it to fit around control link pivot 9c as the shock strut is compressed.

Figure 15A:
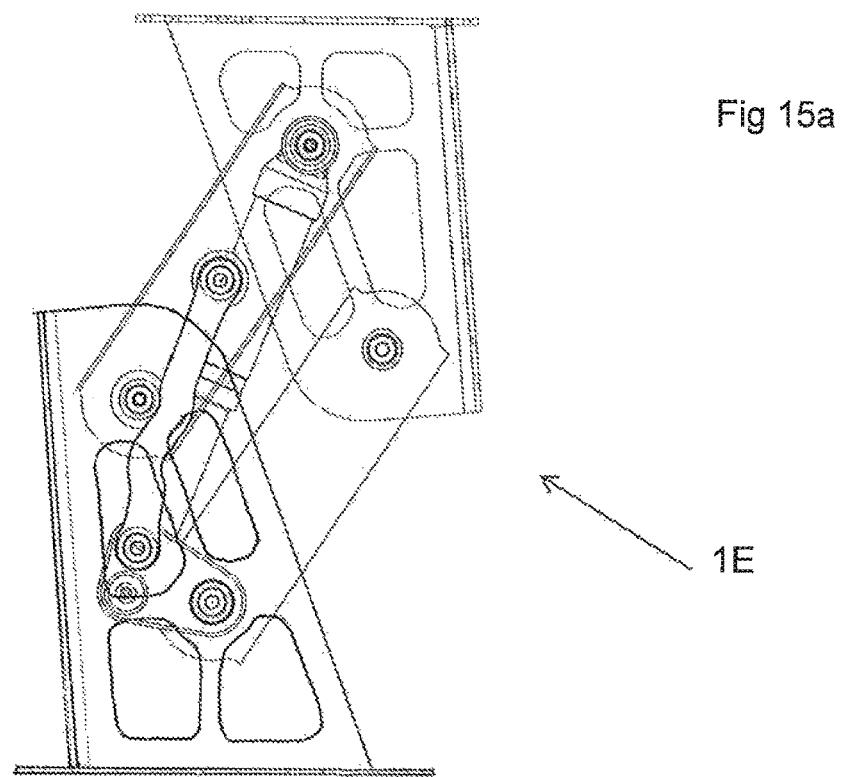
Figure 15B:
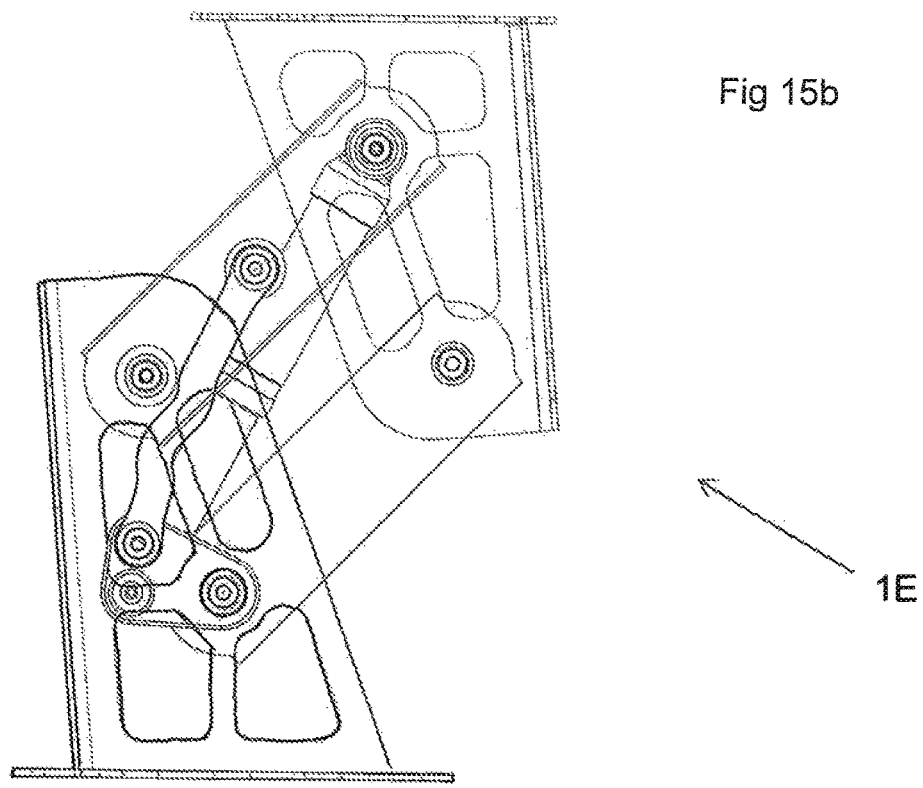
Figure 15C:
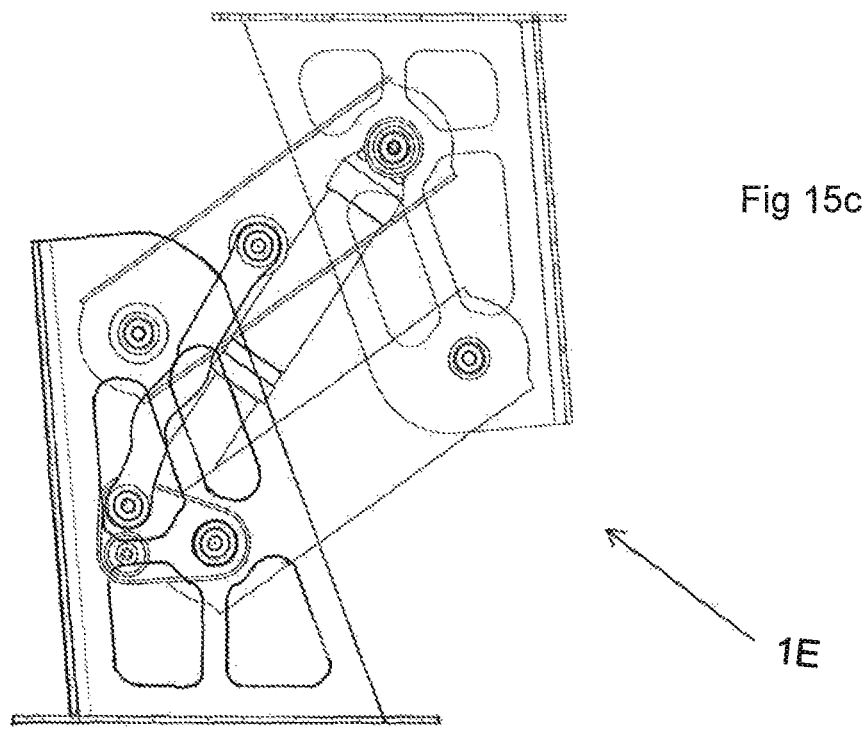
Figure 15D:
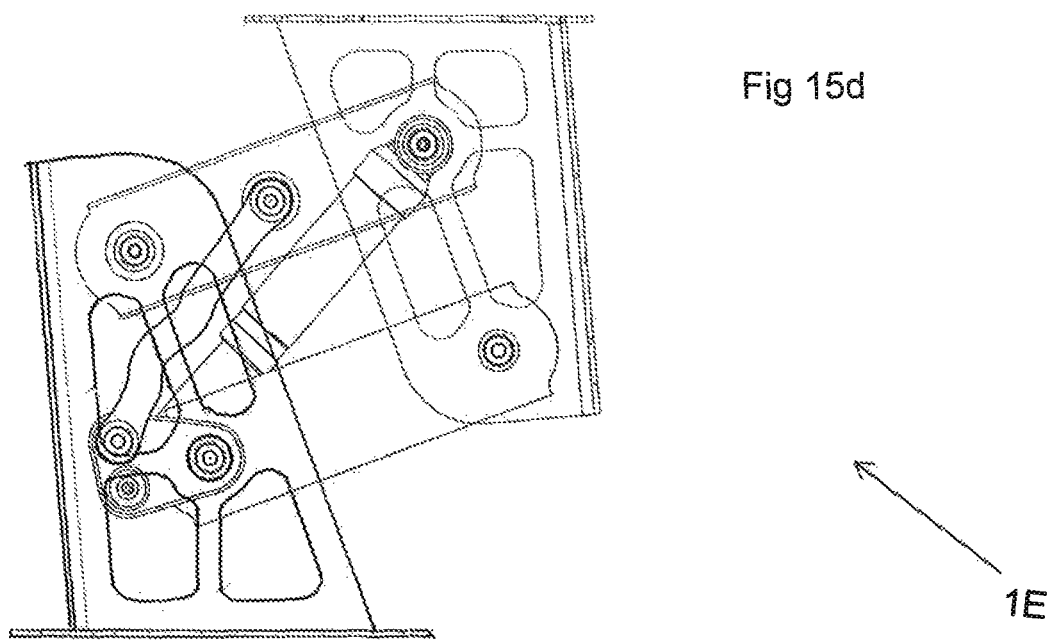
Figure 15E:
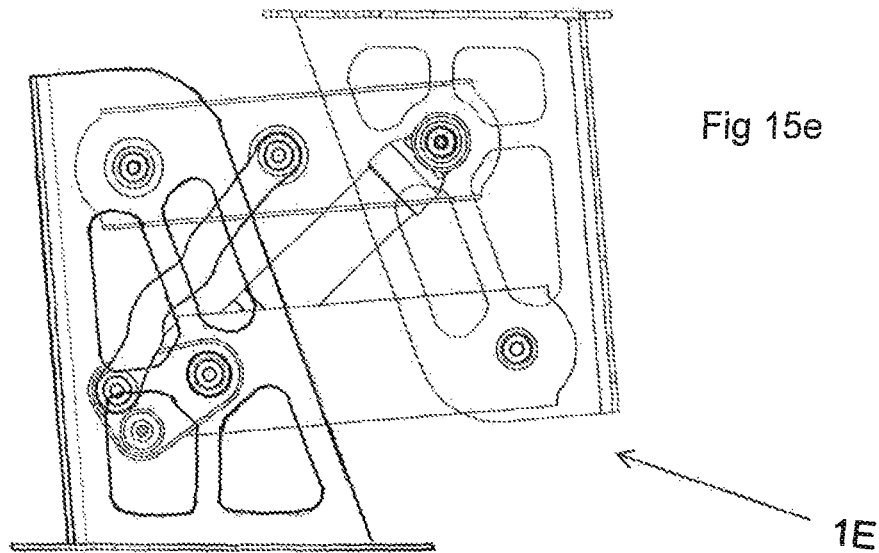

FIGS. 15a to 15f are similar to FIGS. 10a to 10f, but for the fifth "free standing" embodiment of the invention. They are side views of the fifth embodiment and are illustrative of how the mechanism operates during a compression stroke of the shock strut. FIG. 15a illustrates the vehicle seat suspension mechanism at full height; in other words the vertical distance between the bottom of the vehicle mount 4 and the top of the seat support 5 is at a maximum. The shock strut 3 is essentially fully extended in this position, being only slightly (negligibly) compressed from the effect of the weight of the mechanism and seat.

Figure 15F:
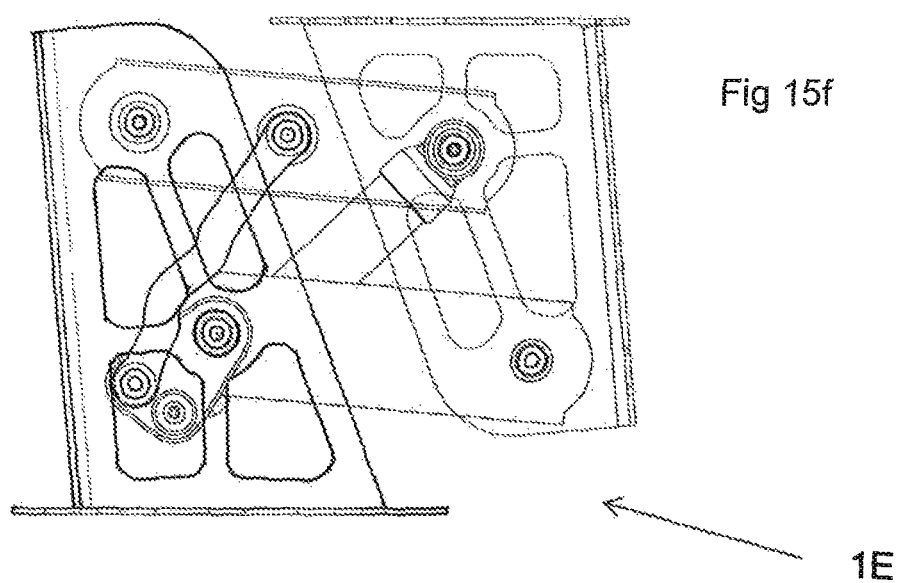

The subsequent figures show it in gradually compressed positions, with FIG. 15f illustrating maximum compression. The description above in relation to FIGS. 10a to 10f is equally applicable here, and so will not be repeated.

FIG. 25 illustrates the shock deflection v. seat height and motion ratio v. seat height for the mechanism of the fifth embodiment. As can be seen, there is a gentle increase in motion ratio over the "normal use" section of the curve, with the motion ratio then increasing dramatically at the end of the stroke. This means that a large amount of shock deflection at the bottom of the stroke is in reserve for large shocks, e.g. big wave impacts. The rise in ratio is far more extreme for this free standing embodiment than for the low profile embodiments described previously due to the selected geometry of the control link. The particular control link used is configured to provide a highly progressive motion ratio curve to accommodate extremely high shock loads. The normal operation of the seat would be in the middle of the compression stroke, leaving the steeply rising section of the curve as "contingency" for extreme (i.e. atypical) impacts, guaranteeing that the seat would never bottom out.

Figure 16A:
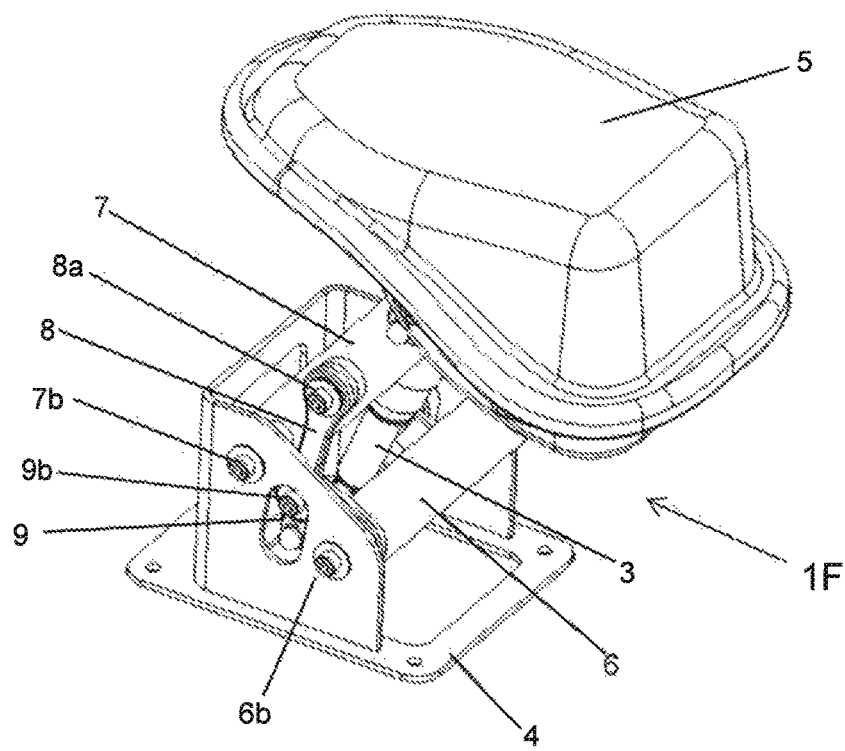
FIG. 16a is a perspective view of a seat suspension mechanism according to a sixth embodiment of the invention.
Figure 16B:
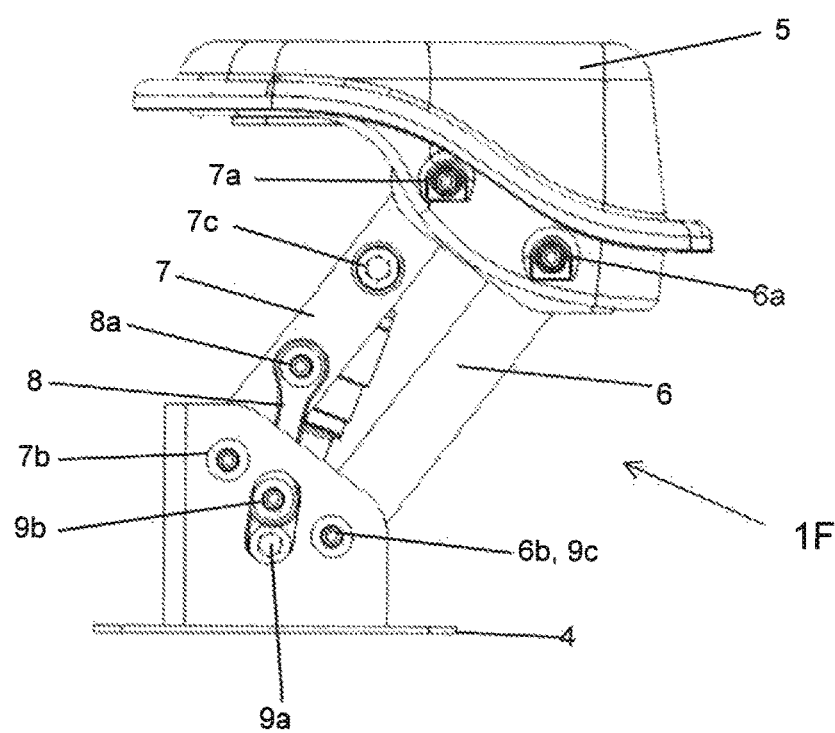
FIG. 16b is a side view of the sixth embodiment.
Figure 17A:
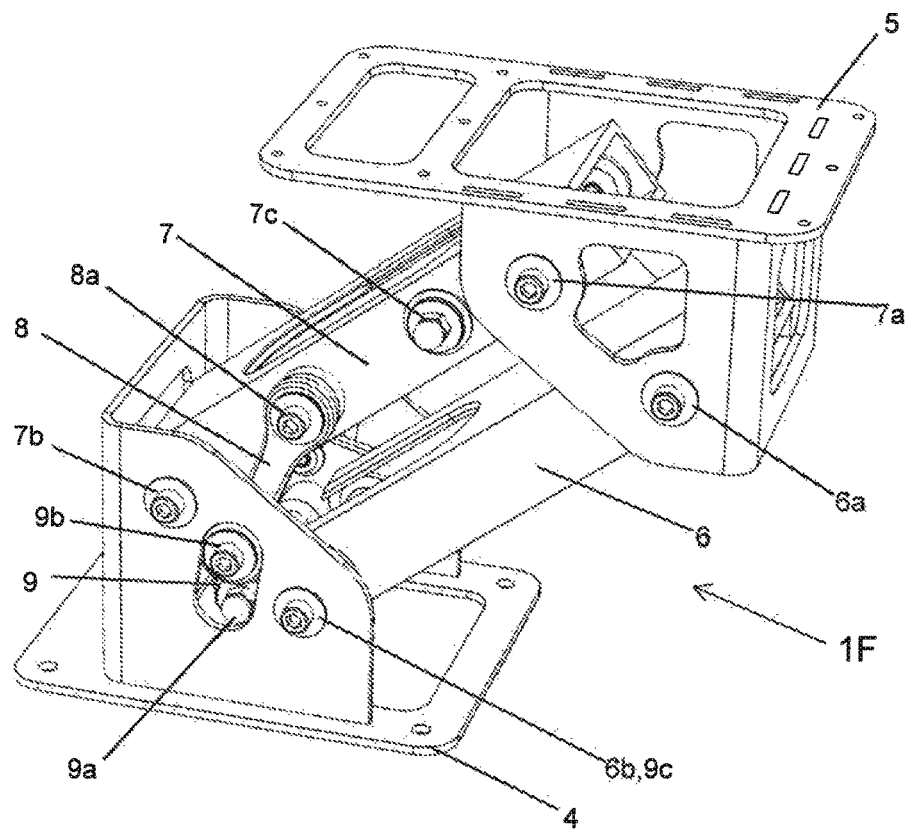
FIG. 17a is a perspective view of the sixth embodiment in which part of the seat support and the shock strut are not shown for reasons of clarity.
Figure 17B:
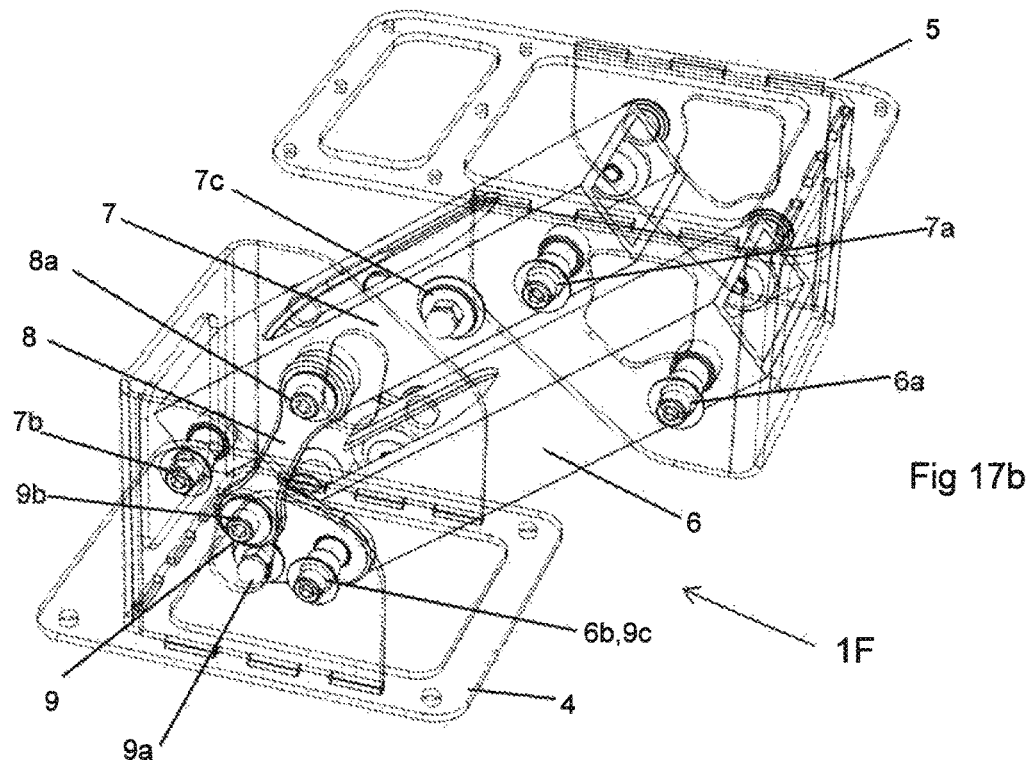
FIG. 17b is a further perspective view of the sixth embodiment in which part of the seat support and the shock strut are not shown for reasons of clarity, and in which some elements are shown as being transparent such that internal parts can be seen.
Figure 18A:
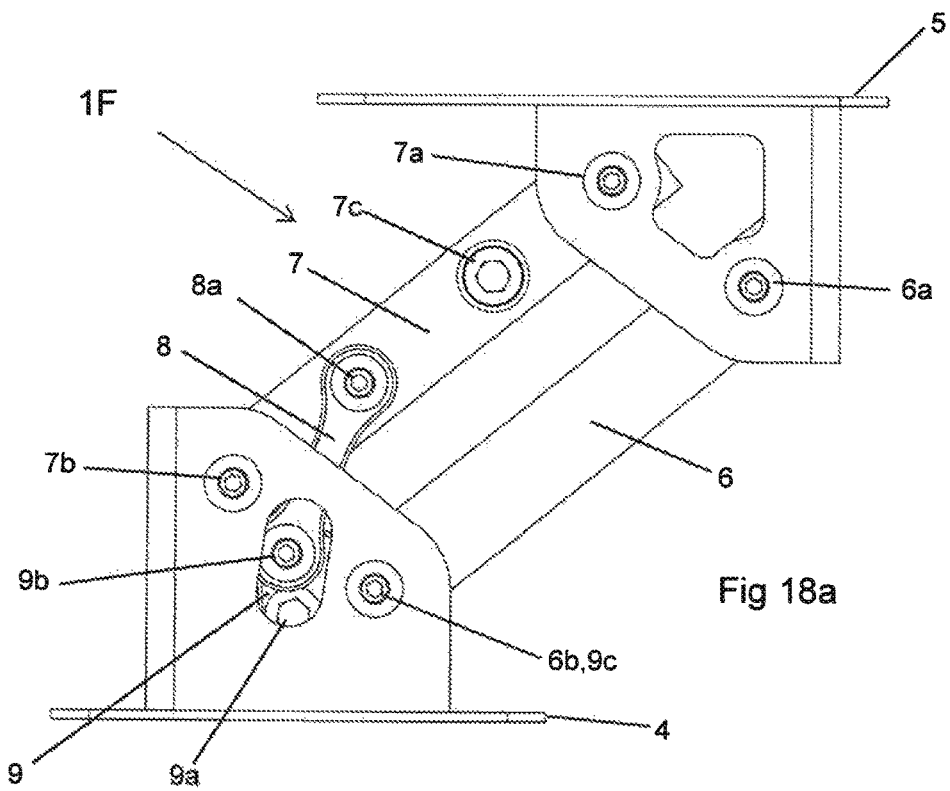
FIG. 18a is a side view of the sixth embodiment, in which part of the seat support and the shock strut are not shown for reasons of clarity.
Figure 18B:
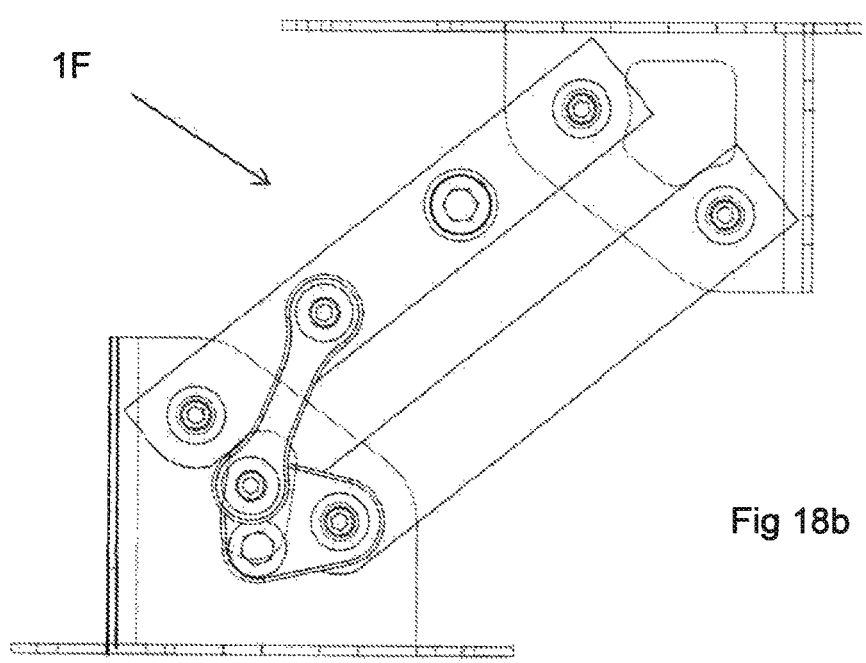
FIG. 18b is a further side view of the sixth embodiment in which part of the seat support and the shock strut are not shown for reasons of clarity, and in which some elements are shown as being transparent such that internal parts can be seen.

A sixth embodiment 1F of the vehicle seat suspension mechanism is illustrated in FIGS. 16a, 16b, 17a, 17b, 18a and 18b. As with the fifth embodiment, this is also a "free-standing" mechanism since it may be installed straight onto the deck of a boat without needing extra plinths or structures; however it is more compact. This mechanism includes broadly similar components and operates in essentially the same way to that of the first to fifth embodiments, in particular the fifth embodiment. FIGS. 16a and 16b illustrate the mechanism with a complete fibreglass seat support, whilst FIGS. 17a-18b show the mechanism with the fibreglass portion omitted so that the internal mechanism can be more clearly seen. Also omitted from FIGS. 17a-18b is the shock strut, again, so that the mechanism can be more clearly viewed.

As with the fifth embodiment, in the sixth embodiment the control link 9 is arranged to guide the motion of the second end 3b of the shock strut 3 (i.e. the end adjacent the vehicle mount 4, comprising eyelet 3b') as opposed to the first end of the shock strut adjacent the seat support 5.

More specifically, as with the fifth embodiment each control link 9 is pivotally connected to a second end 3b of the shock strut 3 at shock strut pivot 9a, via eyelet 3b' in the shock strut 3. Each control link 9 is pivotally connected to a corresponding drive link 8 at drive link pivot 9b. Each control link is furthermore pivotally connected to the first link 6 and vehicle mount 4 at control link pivot 9c (as opposed to being pivotally connected to the second link 7 and seat support 5 at control link pivot 9c as in the first to fourth embodiments).

As with the fifth embodiment, the drive link 8 of the sixth embodiment is pivotally coupled at one end to the second link 7 at pivot 8a (as opposed to the first link 6 in the first to fourth embodiments), and at the other end of the control link 9 at control link pivot 9b as discussed above.

A difference between the fifth embodiment and the sixth embodiment is that in the fifth embodiment the first end 3a of the shock strut 3 (at eyelet 3a') is pivotally connected to the second link 7 and seat support 5 at pivot 7a. Whereas, in the sixth embodiment the first end of the shock strut 3 (at eyelet 3a) is pivotally connected to the second link 7 at pivot 7c located on the second link 7, away from the pivot 7a between the second link 7 and the seat support 5.

Figure 19A:
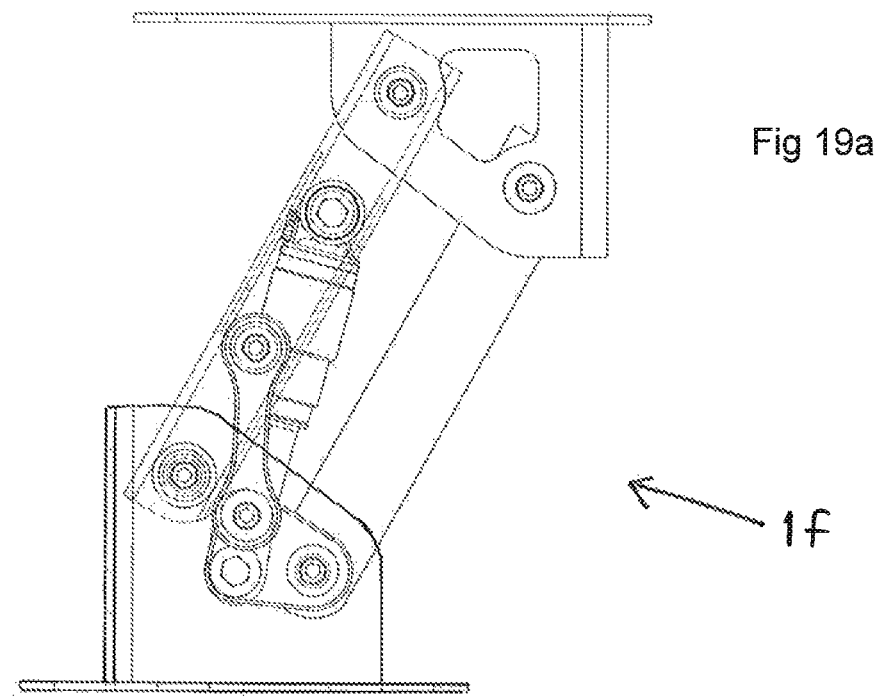
Figure 19B:
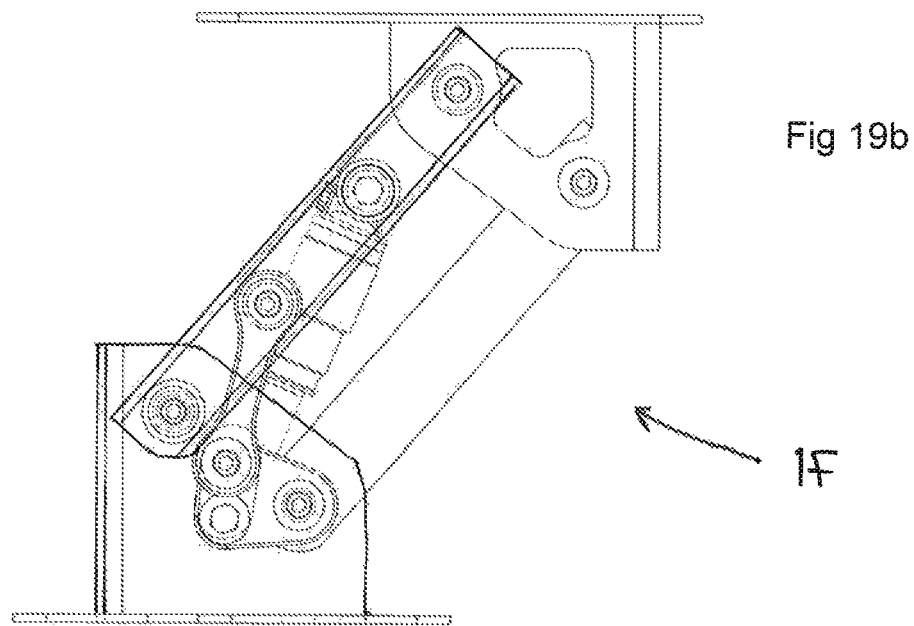
Figure 19C:
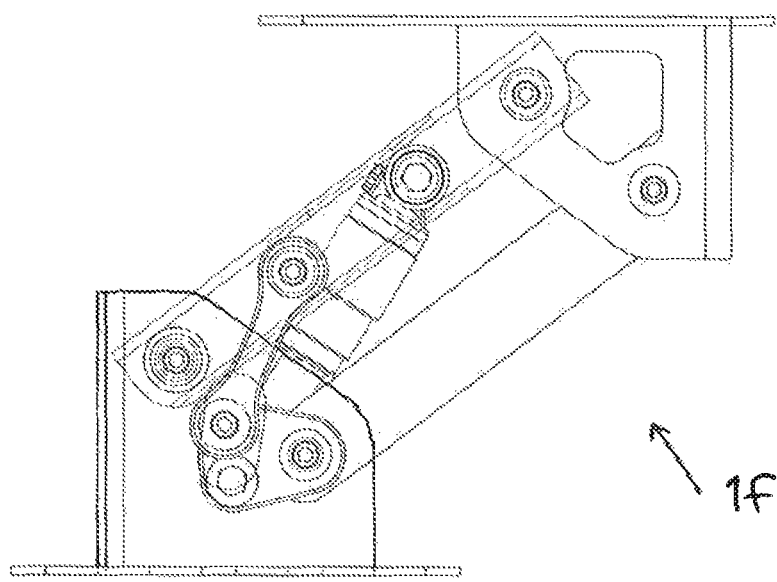
Figure 19D:
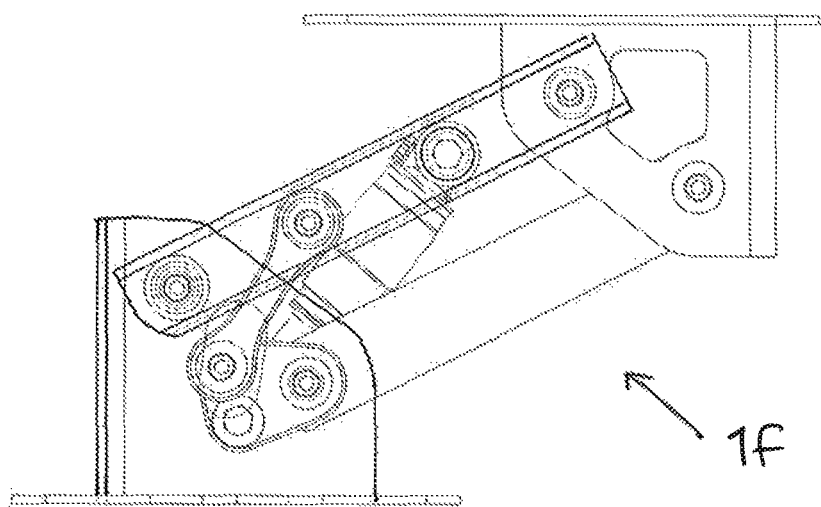
Figure 19E:
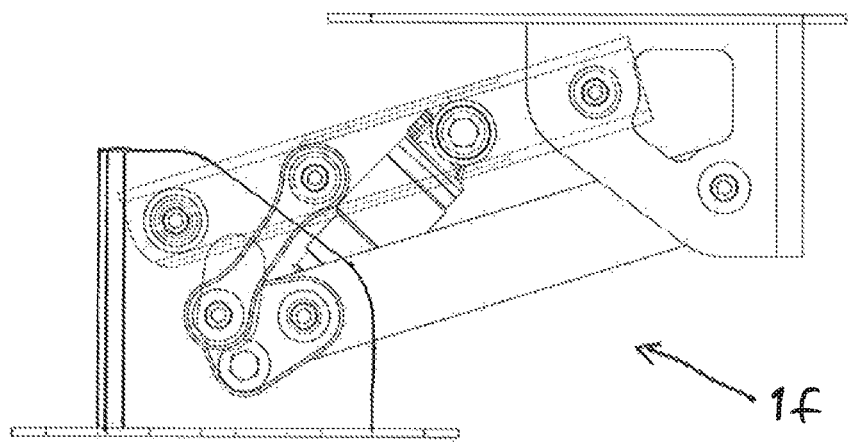
Figure 19F:
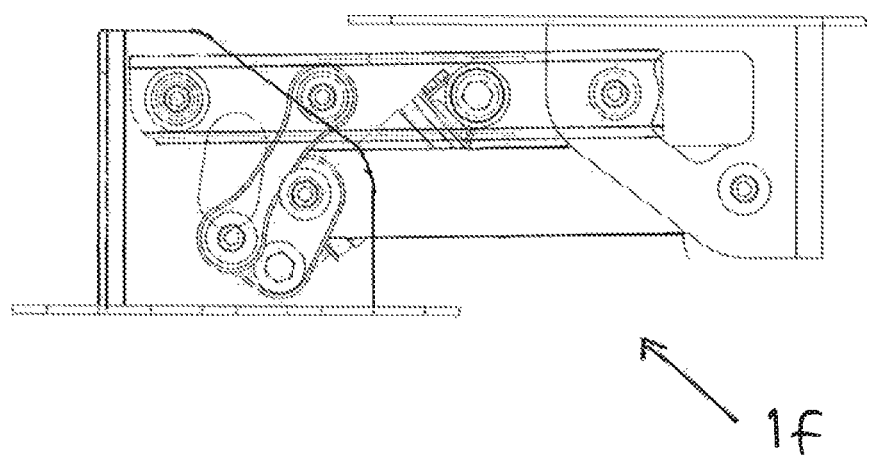

FIGS. 19a to 19f are similar to FIGS. 10a to 10f, but for this sixth embodiment of the invention. They are side views of the sixth embodiment and are illustrative of how the mechanism operates during a compression stroke of the shock strut. FIG. 19a illustrates the vehicle seat suspension mechanism at full height, in other words the vertical distance between the bottom of the vehicle mount 4 and the top of the seat support 5 is at a maximum. The shock strut 3 is essentially fully extended in this position, being only slightly compressed from the effect of the weight of the mechanism and seat. The subsequent figures show it in gradually compressed positions, with FIG. 19f illustrating maximum compression. The description above in relation to FIGS. 10a to 10f is equally applicable here, and so will not be repeated.

Figure 23:
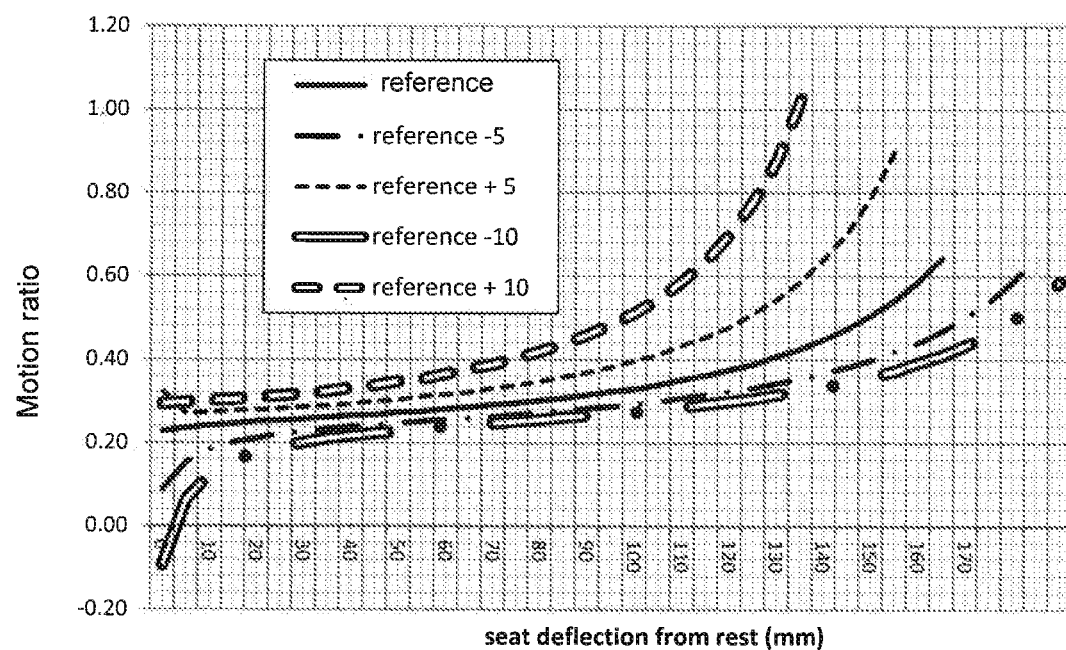
FIG. 23 is a graph showing motion ratio v. seat deflection during a compression stroke of the seat suspension mechanism of the first embodiment for five different lengths of drive link and the control link of embodiment D in FIG. 6.

FIG. 23 illustrates how the motion ratio v. seat deflection during a compression stroke of the seat suspension mechanism of the first embodiment changes as the length of the drive link is increased and decreased. The control link geometry is that of embodiment D of FIG. 6. The solid line shows the motion ratio with a "reference" drive link. It can be seen that as the drive link length increases ("reference+5" and "reference+10") the total possible seat deflection reduces. Consequently the sharp increase in motion ratio towards the end of the stroke begins at a smaller seat deflection, and increases more sharply. As the drive link length reduces ("reference−5" and "reference−10") the opposite happens, i.e. the total possible seat deflection increases and the sharp increase in motion ratio begins at a larger seat deflection and is less sharp.

In some embodiments, it may be desirable to provide components where the geometry can be customised to an extent for expected conditions, riding style/comfort and/or rider weight. For example, the drive link may be of adjustable length and/or the control link may be provided with a range of pivot positions and/or multiple connection positions for the components to attach to. Alternatively, the seat suspension mechanism could be supplied with a set of different drive links and/or control links that can be assembled to provide a geometry according to the rider's preference.

FIG. 24 is a graph showing how shock compression v. seat height during a compression stroke of the seat suspension mechanism of the first embodiment changes as the length of the drive link is increased and decreased from a reference. The control link geometry is that of embodiment D of FIG. 6. It can be seen that for an increased drive link length (reference+5 and reference+10), the starting height of the seat at the beginning of the stroke is reduced and the maximum seat deflection is reduced. In other words, the seat has a smaller range of deflection. The rate of increase of shock deflection for a given change in seat height towards the end of the stroke ramps up quicker for a longer drive link. The converse is the case for a reduced drive link length.

Figure 26:
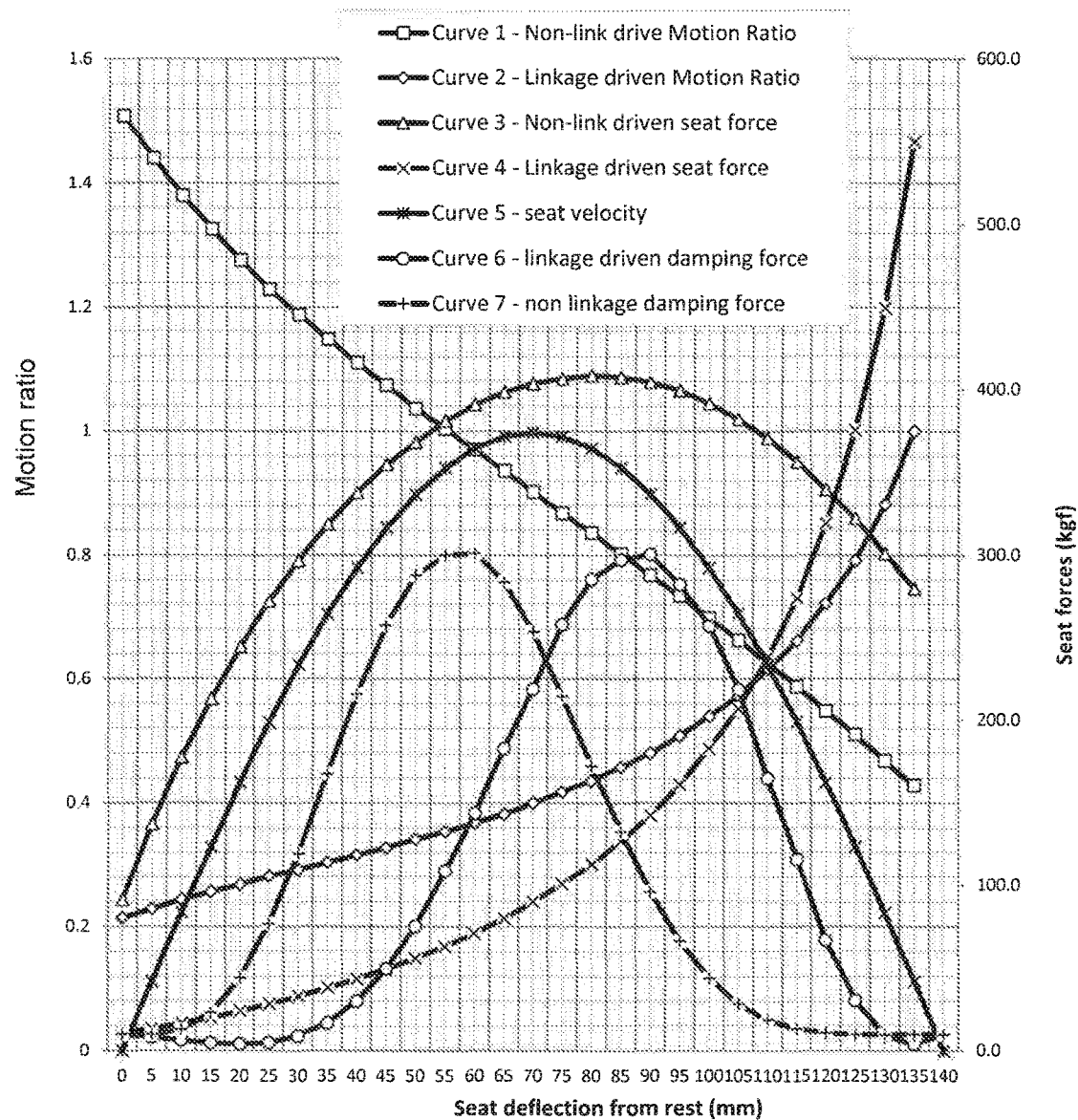
FIG. 26 is a graph showing the seat force, motion ratio and damping response during a compression stroke for a conventional suspension mechanism and for a seat suspension mechanism according to an embodiment of the invention.

FIG. 26 provides an illustration of how the spring force exerted on the seat (seat force) and the damping response is improved through using the new control link 9 and shock strut 3 geometry.

The seat suspension mechanism of the present invention, as described above, provides a rising motion ratio. By changing the rate at which the shock compresses during the stroke, this also has an effect on the timing of the seat force and the damping provided by the shock strut 3. This is because the seat force will be dependent on when the shock deflection occurs and by how much, and the damping will be dependent on the velocity of the piston within the shock strut 3 and the ease with which fluid can move from one side of a restriction to the other.

In a conventional parallelogram seat suspension mechanism, the shock strut usually extends in a direction which is generally tangential to the arcuate fall (e.g. it may extend across the first and second parallel links when viewed from the side). The shock strut is fixed at each end to the seat support and vehicle mount respectively, so as to be compressed during the falling movement. The motion ratio resulting from such an arrangement starts at a relatively high value and gradually declines to a lower value during the compression stroke; it has a falling motion ratio. Such a mechanism is used for comparison in FIG. 26.

The seat force, as well as being dependent on the motion ratio, will also vary depending on the type of shock strut. For a coilover shock absorber, the coil provides a linear spring force response to the shock compression. Modifications are required in order to generate a rising motion ratio, which can then adjust the spring force applied to the seat to provide greater seat force during the later stages of the compression stroke. A gas spring has the advantage that the spring rate will increase with shock compression since the chamber containing the gas becomes smaller; however, the rise in spring force comes with reduced movement of the shock piston, leading to a loss of damping at these higher levels of spring force. The result is that the occupant can be subjected to large shock forces or even might be ejected from his/her seat if a big impact is received by the vehicle.

Curve 3 of FIG. 26 shows an illustration of seat force for a conventional seat suspension mechanism as described above and curve 4 shows the seat force for an inverted mechanism having a control link in accordance with an embodiment of the present invention. Both of these are for a coilover shock absorber. As shown, curve 3 defines a peak which resides within a region lying between 25% to 75% of the maximum seat deflection, with the seat force gradually decreasing from the peak to the end of the compression stroke. By contrast, in the preferred seat suspension mechanism, the curve of the seat force with respect to seat deflection (curve 4) follows the progressive (i.e., gradually increasing) curve of the motion ratio. The seat force reaches a maximum at the end of the stroke.

Damping is provided by a fluid in the shock strut 3, typically oil, moving from one chamber to another through a restriction. The restriction may be in the form of an orifice in a piston, shims around a piston, or other passage that the fluid is forced to flow through in order to create drag and dissipate some of the kinetic energy of the impact as heat. The faster the fluid is moving past the restriction, the more viscous drag it creates and the more damping it provides, this varying with a complex function of the fluid velocity in both compression and rebound damping (the damping forces shown in FIG. 26 are based on a theoretical approximation of empirically derived damping curves for a typical oil damper).

As a generalisation for suspension systems, the seat velocity during impacts can be assumed to be sinusoidal, e.g., as indicated by curve 5 in FIG. 26. The magnitude of the seat velocity and the extension of the seat velocity along the seat deflection axis will be dependent on the nature of the impacts (in the example of FIG. 26, the change in seat velocity is shown for a full seat deflection at an arbitrary amplitude). Smaller amplitude, higher frequency impacts, such as those experienced when riding over chop or small waves, produce quite different damping responses to larger amplitude, lower frequency impacts such as those experienced when riding over large waves, because of the differences in the seat deflection and velocity of the shock piston in these two scenarios.

To provide an indication of the damping response, curves 6 and 7 of FIG. 26 show plots of the velocity-dependent damping force with respect to seat displacement for the embodiment with the control link and for the conventional seat suspension mechanism respectively. The curves are based on the damping that might be observed when an impact causes the maximum seat deflection. The shape of the curves will vary depending on circumstances, but the important point that can be derived from these plots is how the addition of the control link has moved the point at which the maximum damping occurs further down the compression stroke (i.e. when the spring forces are increasingly significantly), better matching the spring forces to the damping force across a far wider range of shock travel.

With a conventional suspension seat having a falling motion ratio, the peak of the curve for the damping response is pulled from a central position towards the left-hand side of the graph in FIG. 26 (i.e. towards the minimum seat deflection end). By contrast, in the seat suspension system of the present invention which has a rising motion ratio, the peak of the curve for the damping response is shifted towards the right-hand side of the graph in FIG. 26 (i.e. towards the maximum seat deflection end). This displacement of the peak in the damping responses is due to differences in the relative shock velocity; for a falling motion ratio the relative shock velocity is decreasing and in a rising motion ratio the relative shock velocity is increasing towards the end of the stroke.

The effect of this is that the rising motion ratio system will provide less damping over the smaller, higher frequency impacts than the falling motion ratio system, and so the suspension response felt by the rider will be more dependent on the spring force exerted by the shock strut than the damping. Too much damping for the smaller, higher frequency impacts, will both make the suspension system feel overly firm and uncomfortable and offer less protection from the cumulative effect of low amplitude full body vibration. By contrast, a seat suspension system having a rising motion ratio can provide a softer ride over such impacts, making the ride feel more plush and improving the comfort and vibration protection for the rider, allowing the rider to endure the smaller, higher frequency impacts for longer periods of time.

By shifting the peak of the damping response towards the right-hand side of the graph, the seat suspension system provides more damping later on in the stroke, which becomes a significant factor to the comfort of the rider when he/she is subjected to larger impacts. As can be seen from FIG. 26, at this stage in the seat deflection, the shock strut is also delivering greater levels of seat force. Thus the increase in damping tends to match the increase seen in the seat force for the larger impacts, giving the impression that the seat suspension mechanism will never bottom out. During the compression stroke, by better balancing the spring forces and damping forces, the deceleration of the rider will be more progressive, improving comfort and safety. During the rebound stroke, the inclusion of extra damping at the bottom of the stroke improves control and reduces the potential for a highly sprung, under-damped rebound.

The shock strut in the seat suspension mechanism is a finite size, and by using a rising motion ratio, where the motion ratio starts at a low value and finishes at a high value, it is possible to save some of the shock deflection until the end of the compression stroke. It is this that allows the mechanism to accommodate the smaller impacts comfortably while saving some of the shock deflection for the bigger impacts. A further advantage of having a low motion ratio initially in the stroke, is that there will be higher mechanical gearing between the seat movement and the shock displacement during that stage of the movement. When the loads on the shock strut are small, the friction coefficients of the seal(s) and piston shaft can cause "sticktion", particularly with gas springs when they are under high pressure, which can make the suspension system less smooth and responsive. With the higher gearing during this initial stage of the compression stroke, it can help to overcome this problem.

The progression of the motion ratio, the amount of seat force and the amount of damping can all be tailored to suit the occupant, e.g., a lighter or heavier occupant, and to suit the occupant's environment and riding style, e.g., to accommodate the smaller, higher frequency impacts like chop on an expanse of flat water, or the larger, lower frequency impacts like large waves on a sea crossing. For example, the motion ratio can be made more progressive by adjusting the dimensions of the control link and/or the drive link and its attachment to the first link in order to provide more gearing and/or adjust where the progression comes in. The seat force will be dependent on the resulting motion ratio, the size of the spring and its inclination to the vertical, all of which can be adjusted too. The damping will be dependent on the motion ratio and the relative size of the restriction(s) provided for the damping fluid to flow through, which may also be adjustable and be different for the compression and expansion strokes. Further, the amount of seat travel, which will have an effect on how smooth the ride feels, can be adjusted through altering the length of the first and second links.

Figure 27:
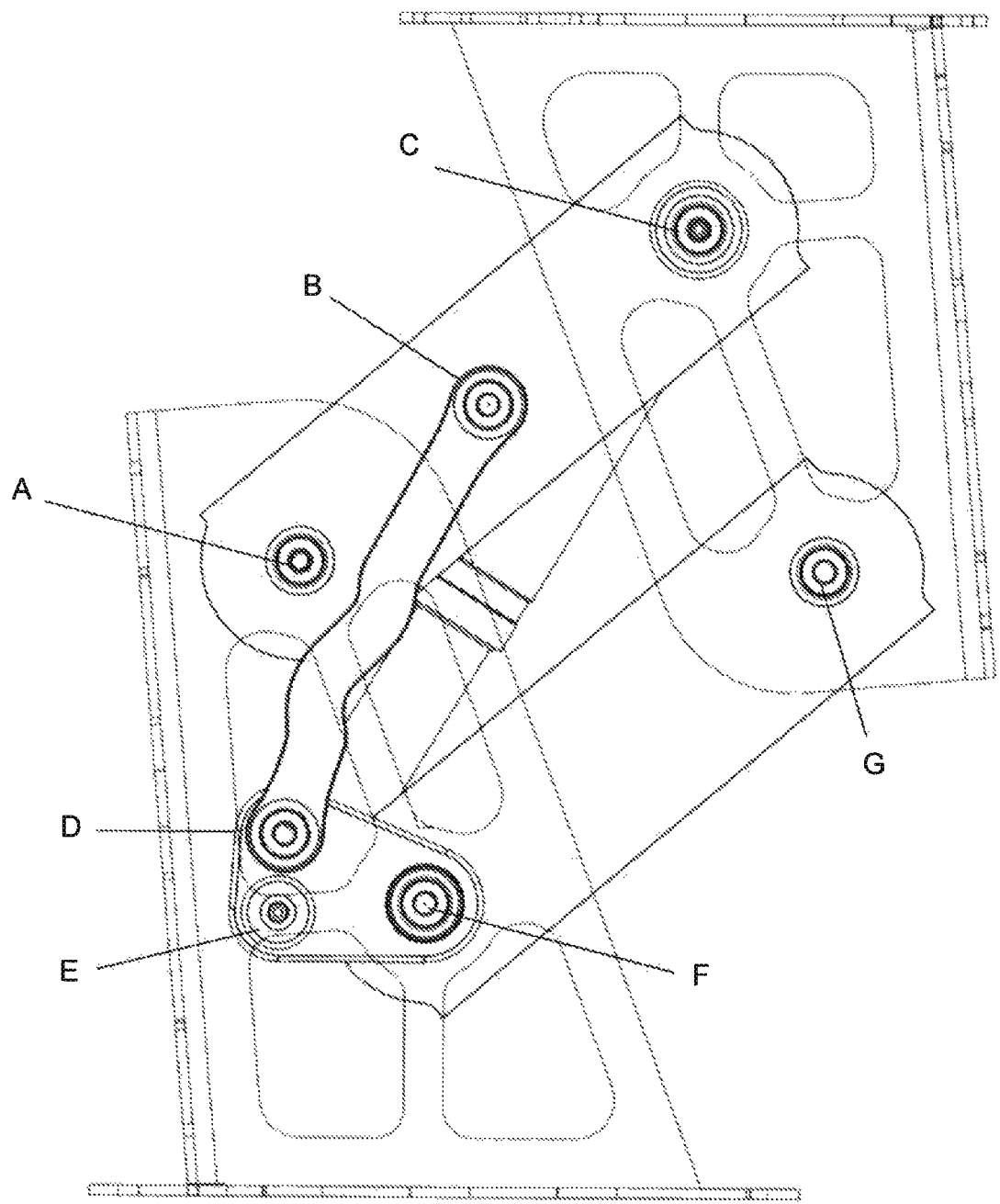
FIG. 27 is a side view of the fifth embodiment in which some elements are shown as being transparent such that internal parts can be seen and in which the seven pivots of the mechanism are labelled as A to G.

It is possible to tune the motion ratio through adjusting the relative positions of the pivots. FIG. 27 shows a side view of a preferred embodiment with the seven pivots labelled from A to G. Table 1 below describes how the distances between these pivots can be varied in order to customise the ride.

TABLE 1

| Length/Angle | Effect |
| --- | --- |
| A to B | The longer this dimension, the more that pivot 8a connecting the drive link 8 to the first link 6 will travel, increasing the movement of D and thus the rotation of D and E about F |
| D to F | The longer the dimension D to F, the less the movement of B is translated into rotation of D and E about F |
| E to F | The longer the dimension E to F, the greater the ability to have either very low motion ratios at the start of the compression stroke or very high ratios at the end. This is also dependent of the dimension A to B. |
| A to C and F to G | To maintain a parallelogram action, these dimensions need to be the same. However, in some instances, it may be preferred to tilt the mechanism slightly forwards or backwards, in which case these dimensions might be different. The longer the dimension A to C (and F to G), the greater the seat travel and the smoother the ride will feel (in general, riders are more sensitive to angular acceleration than linear acceleration). |

TABLE 1-continued

| Length/Angle | Effect |
| --- | --- |
| B to D | If the length of the drive link 8 is increased (dimension B to D), the start for the stroke is pushed closer to the 9 o'clock position in the figure, which means that D has more vertical motion than horizontal, accelerating the angular motion of the at earlier stages of the stroke (and thus reducing the length E to C early on). |
| Angle DF to EF | The closer to 6 o'clock that EF starts in the arrangement shown in the figure, the quicker the "ramp" comes in during the progression of the motion ratio; conversely, starting with EF closer to DF means that during the initial phase of the stroke, as the seat falls, E also falls, minimising the decrease in dimension EC and thus the damping. |

By way of example, if at the start of the compression stroke, the bottom end 3b (i.e. the second end) of the shock strut 3 in FIG. 27 is guided to fall just slightly less than the seat support 5 is falling, then this can provide a very low motion ratio, for example, up to 1:25, meaning that each 25 mm of seat movement, there is 1 millimetre of shock movement. At the bottom of the compression stroke, the control link 9 can be arranged to rapidly increase the rate of shock compression by rotating towards the opposite end of the shock strut about control link pivot 9c, creating a high motion ratio. In the "free standing" embodiment of FIG. 27, the final ratio might rise from, say, 0.13 to 1.83 over the compression stroke.

Thus, the seat suspension system can be fine-tuned according to the occupant's preference and expected conditions. It can deliver an expensive-feeling, idealised, progressive, air spring ride using conventional shock absorbers, for example, off-the-shelf coilover shock absorbers; it further enables the provision of a smaller, higher spring load mechanism with improved damping/spring force balancing over the whole stroke of the shock.

The use of coilover shock absorbers provides additional advantages in terms of reliability. If a seal failure occurs in an air spring, the failure can be catastrophic and final, since with no air spring, there is no suspension. On the other hand, coilover shock absorbers typically fail in a more benign way, with the damping degrading over time rather than coil springs failing catastrophically. While this is still not optimal, it is better than no suspension at all if immediate servicing is not an option. A coilover shock absorber will also maintain its spring rate over time during use. In small, compact air springs, the heat remains in the shock absorber, increasing the gas pressure and thus raising the spring rate. Duty cycles of a marine suspension seat can be exceedingly large and this can result in the ride becoming much stiffer during a long journey. In addition, mechanical, coilover springs are much cheaper than corresponding gas springs, because of their simplicity. Moreover, the parts of gas springs, because of the nature of the materials, may be more prone to corrosion, particularly in marine environments.

While many of the examples above are referenced with respect to water-based vehicles and marine environments, the seat suspension mechanism can also be used on land-based vehicles, particularly off-road vehicles. It can be used in rally vehicles, trucks, lorries, tractors, military vehicles, snowmobiles, etc., indeed anywhere where it is able to reduce the shock transmitted to the rider. Accordingly, the seat suspension mechanism described above should be seen as being applicable to all types of vehicle.

In the above described embodiments of the invention, the mechanism is preferably configured for an occupant weight of 100 kg that is subject to accelerations typically of 10 g, and thus a force of up to 10 kN. For a seat weighing 5 kg, the static load will be 50N and results in very small, essentially negligible, levels of shock compression.

Preferably, in marine applications, all of the pivots described herein are based around polymer bushes to provide galvanic isolation between components and thus avoid corrosion. All of the axle pivots are preferably sleeved with appropriate polymeric bushes.

Figure 28:
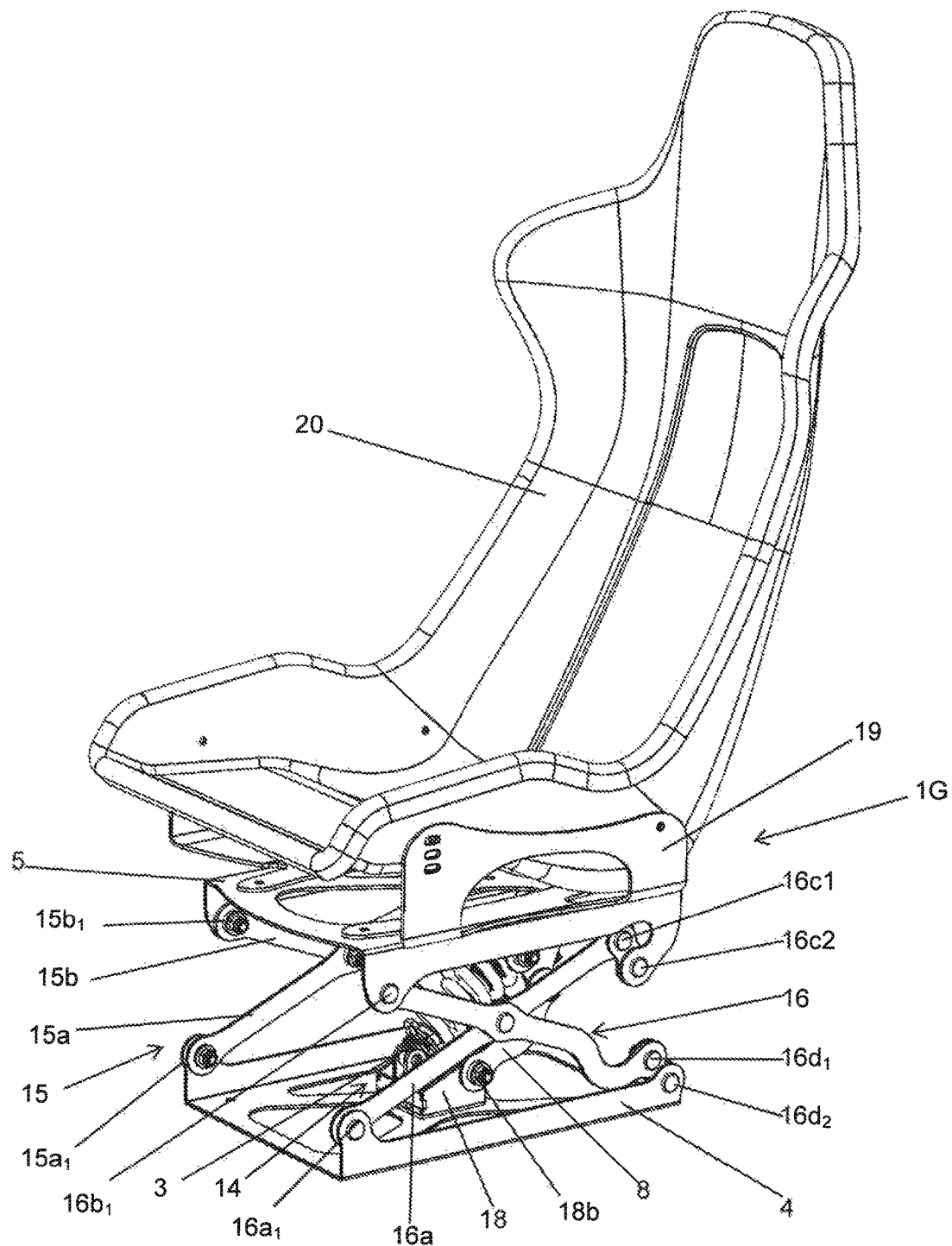
FIG. 28 is a perspective view of a seat suspension mechanism according to a seventh embodiment of the invention, with a vehicle seat attached thereto, viewed from the front.

FIG. 28 illustrates a seat suspension mechanism 1G according to a seventh embodiment of the invention, to which a seat 20 is mounted. This embodiment is based on the same principle as the first to sixth embodiments, i.e. modifying the motion ratio to increase through the stroke by utilising the fall of the seat support with respect to the vehicle mount to drive a control link to guide the first end of the shock strut relative to its opposite, second end during the stroke. However, whereas in the first to sixth embodiments the drive for the control link is provided by rotation of one of the first and second links of the parallelogram linkage connecting the seat support to the vehicle mount (this angular movement being coupled to the mechanism via the drive link 8 to drive and rotate the control link 9 about the control link pivot), in the seventh embodiment the drive for the control link is independent of the suspension arrangement that links the seat support 5 with the vehicle mount 4 and guides the angle and position of the seat support 5 with respect to the vehicle mount 4.

In the seventh embodiment, a scissor linkage 15, 16 of a type known in the art is used instead of a parallelogram linkage as the suspension arrangement that links the seat support 5 to the vehicle mount 4 and guides the angle and position of the seat support 5 with respect to the vehicle mount 4. Thus, the seat support 5 falls vertically with substantially no forwards/rearwards movement, unlike the first to sixth embodiments. A self-contained rising ratio link assembly 14, which is completely independent of the scissor mechanism 15, 16 is positioned within the scissor linkage suspension arrangement and delivers the rising motion ratio shock absorbing function. As will be described further below, the rising ratio link assembly 14 is driven by the fall of the seat support 5 relative to the vehicle mount 4. Such a scissor linkage is particularly useful for seats in vehicles such as trucks or buses, where the rider will be subject to a less bumpy ride than for example in marine environments such as a speedboat.

Figure 29:
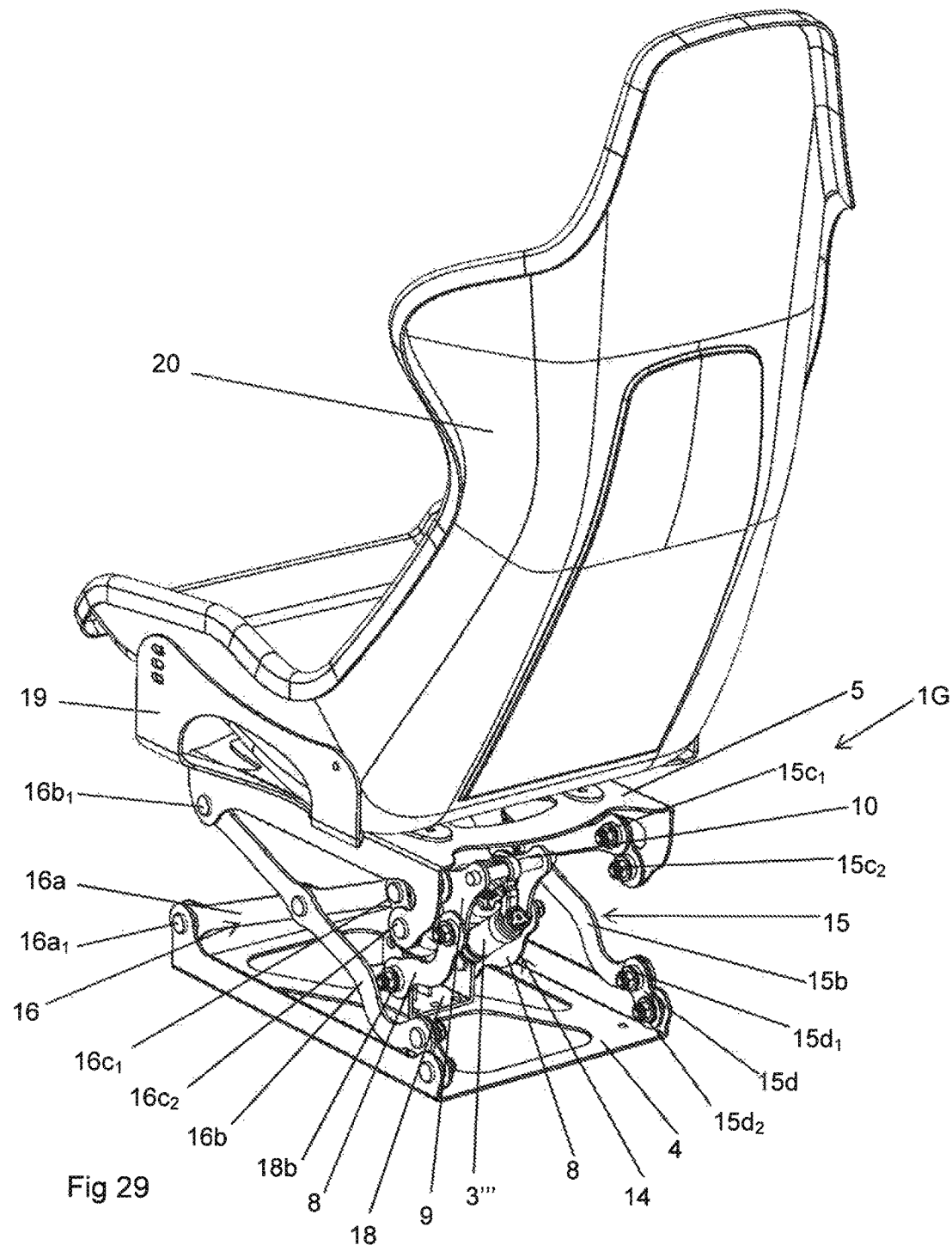
FIG. 29 is another perspective view of the seventh embodiment viewed from the rear.
Figure 30A:
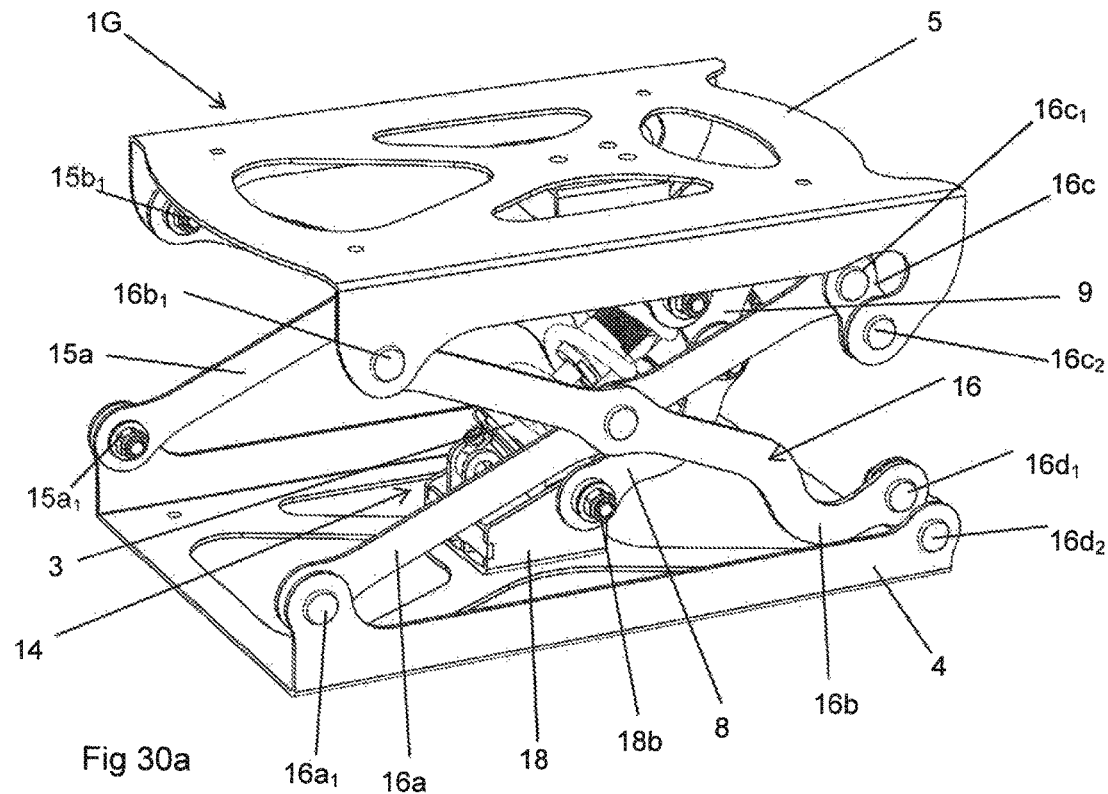
FIG. 30a is a perspective view of the seventh embodiment without the seat attached and with the mechanism at full height.
Figure 30B:
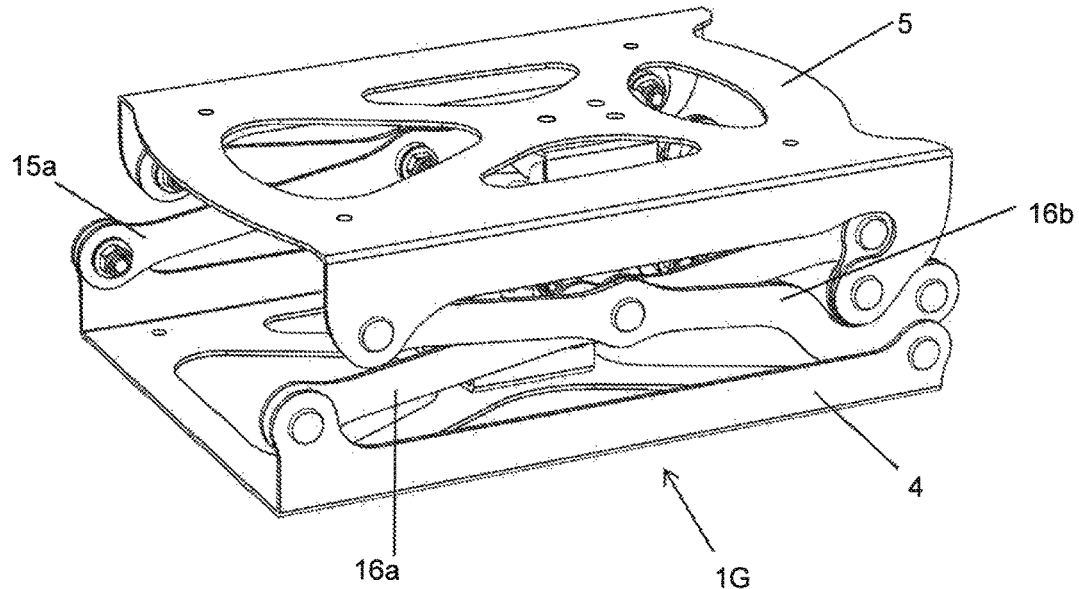
FIG. 30b illustrates the seventh embodiment without the seat attached and with the mechanism at maximum compression.

Considering the seventh embodiment in detail, the vehicle seat suspension mechanism 1G comprises a vehicle mount 4 having a tray-like form for attachment to a vehicle and a seat support 5 also having a tray-like form to which a seat can be mounted via seat brackets 19 (a seat 20 is shown in FIGS. 28 and 29 connected to these brackets, though any suitable seat could be used, as discussed for example in relation to the earlier embodiments). The vehicle mount 4 and seat support 5 may be regarded as platforms. The vehicle mount 4, seat support 5 and seat brackets 19 have various holes for receiving bolts and/or other types of fasteners to fix the vehicle mount 4 to a vehicle fix a seat 20 to the seat support 5.

A scissor linkage having left-hand scissor 15 and right-hand scissor 16 is connected between the vehicle mount 4 and seat support 5 to link the seat support 5 to the vehicle mount 4 and guide the angle and position of the seat support 5 with respect to the vehicle mount 4. It will be appreciated that the terms "left hand" and "right hand" in relation to the scissors are used merely for convenience in describing the particular arrangement illustrated. In other embodiments, the two scissors 15, 16 may be oriented differently, e.g. turned 90° with one at the front and one at the back of the mechanism.

Left-hand scissor 15 comprises scissor arms 15a, 15b and links 15c, 15d; right-hand scissor 16 comprises scissor arms 16a, 16b and links 16c, 16d. Arms 15a and 16a are pivotally attached to vehicle mount 4 at pivots $15a_1$ and $16a_1$ respectively. At the opposite end, they are pivotally attached to links 15c and 16c respectively at pivots $15c_1$ and $16c_1$, the links 15c and 16c being pivotally attached to the seat support 5 at pivots $15c_2$ and $16c_2$. Arms 15b and 16b are pivotally attached to the seat support 5 at pivots $15b_1$ and $16b_1$ respectively. At the opposite end, they are pivotally attached to links 15d and 16d respectively at pivots $15d_1$ and $16d_1$, the links 15d and 16d being pivotally attached to the vehicle mount 4 at pivots $15d_2$ and $16d_2$. The purpose of the links 15c, 15d, 16c, 16d is to allow sideways displacement of the scissor arms such that the scissors 15, 16 can compress and extend.

The rising ratio link assembly 14 can be seen more clearly in FIG. 29 and subsequent Figures. It comprises a shock strut 3 arranged between a vehicle-side mounting bracket 18 and a seat-side mounting bracket 17, two drive links 8 and two control links 9. Just as in the first to sixth embodiments, one drive link 8 and one control link 9 is located on one side of the shock strut 3, and the other drive link 8 and control link 9 on the opposite side of the shock strut 3 (other embodiments may include only one drive link 8 and one control link 9).

The shock strut 3 illustrated in this embodiment is a coilover shock absorber as used e.g. in the second and third embodiments and discussed previously above. An additional cylinder 3''' is included which is an optional additional part of the coilover shock absorber for adjusting the damping and for the avoidance of cavitation in the damping fluid, as discussed above in relation to earlier embodiments. As an alternative to a coilover shock absorber, an air sprung shock absorber may instead be used as discussed above in relation to earlier embodiments.

Figure 31:
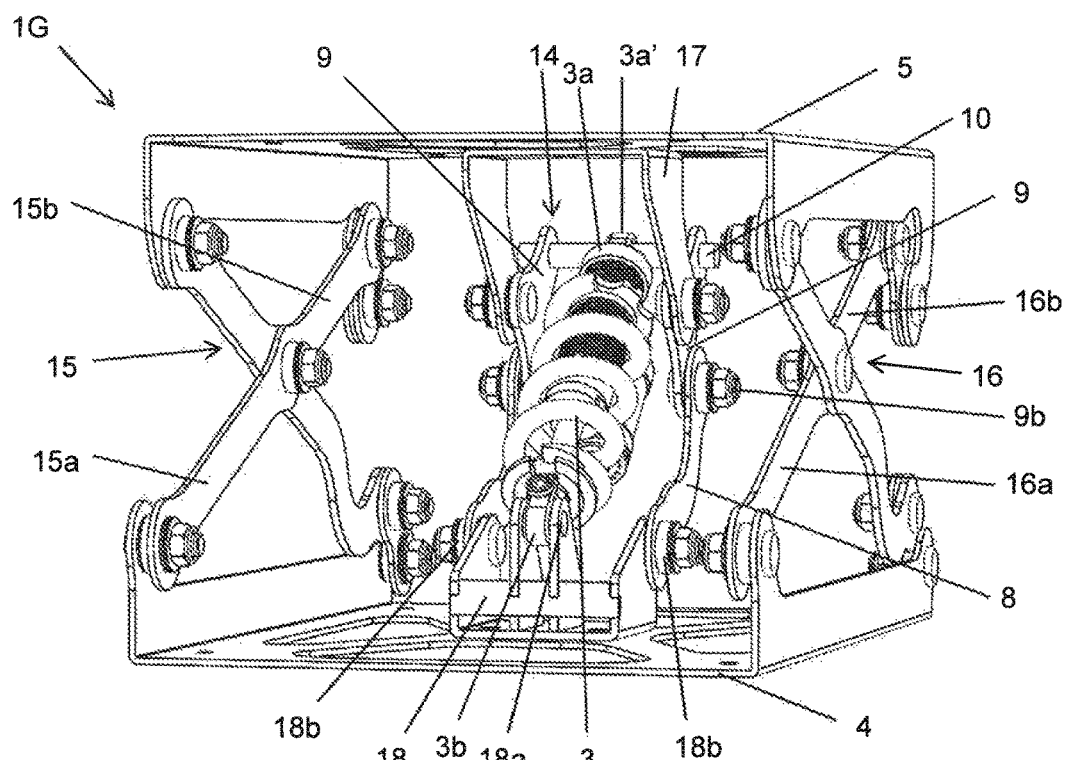
Figure 32:
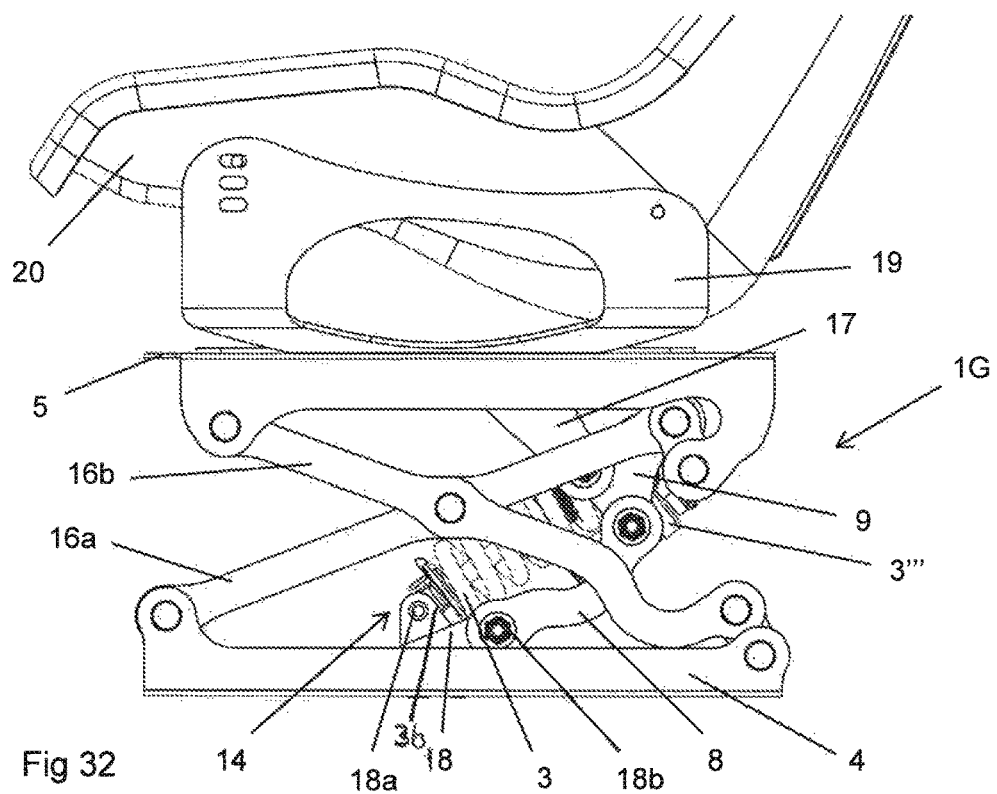
FIG. 32 is a side view of the seventh embodiment without the seat attached and with the mechanism as full height.

The vehicle-side mounting bracket 18 is attached to the vehicle mount 4, and the seat-side mounting bracket 17 is attached to the seat support 5. At its lower end (second end 3b), the shock strut 3 is pivotally attached to the bracket 18 at pivot 18a as can be seen for example in FIGS. 31 and 32. At its upper end (first end 3a), the shock strut 3 is pivotally attached to the control link 9 at control link pivot 9c, which is in turn pivotally attached to the bracket 17 as discussed below. Thus, the shock strut 3 is arranged so that it is compressed during a compression stroke of the scissor mechanism 15, 16.

The control link 9 used in this embodiment of the invention is a similar, generally triangular shaped part to that of the first to sixth embodiments. It has three attachment points for forming pivots: shock strut pivot 9a, drive link pivot 9b and control link pivot 9c. Each shock strut pivot 9a comprises a hole $9a_1$ in the control link, an eyelet 3a' in the shock strut 3 at its upper end 3a and an axle 10. The axle 10 extends through the hole $9a_1$ in one of the control links 9, the eyelet 3a' in the shock strut 3 and through the hole $9a_1$ in the other control link, so that the control links 9 and shock strut 3 can pivot about the axle 10.

Figure 33I:
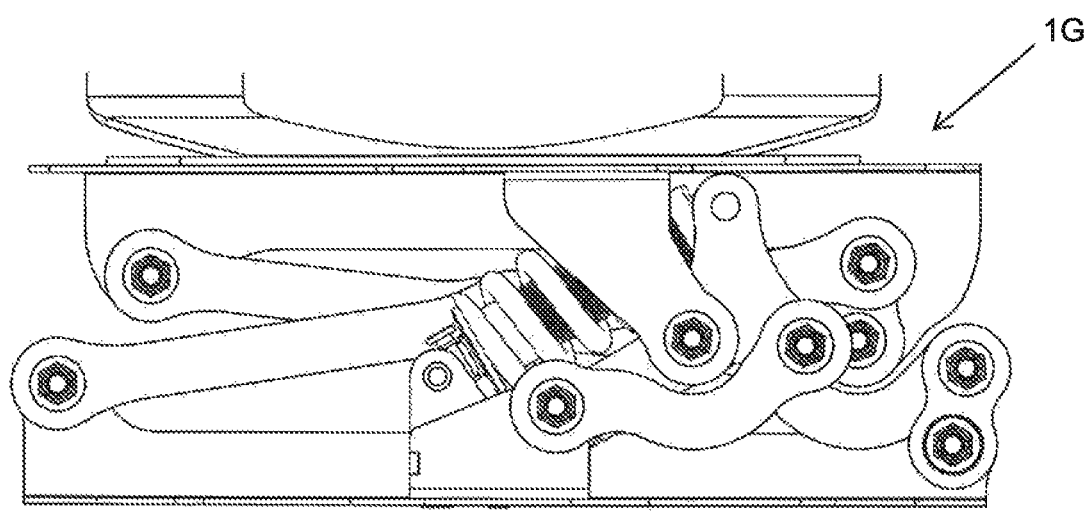
Figure 34A:
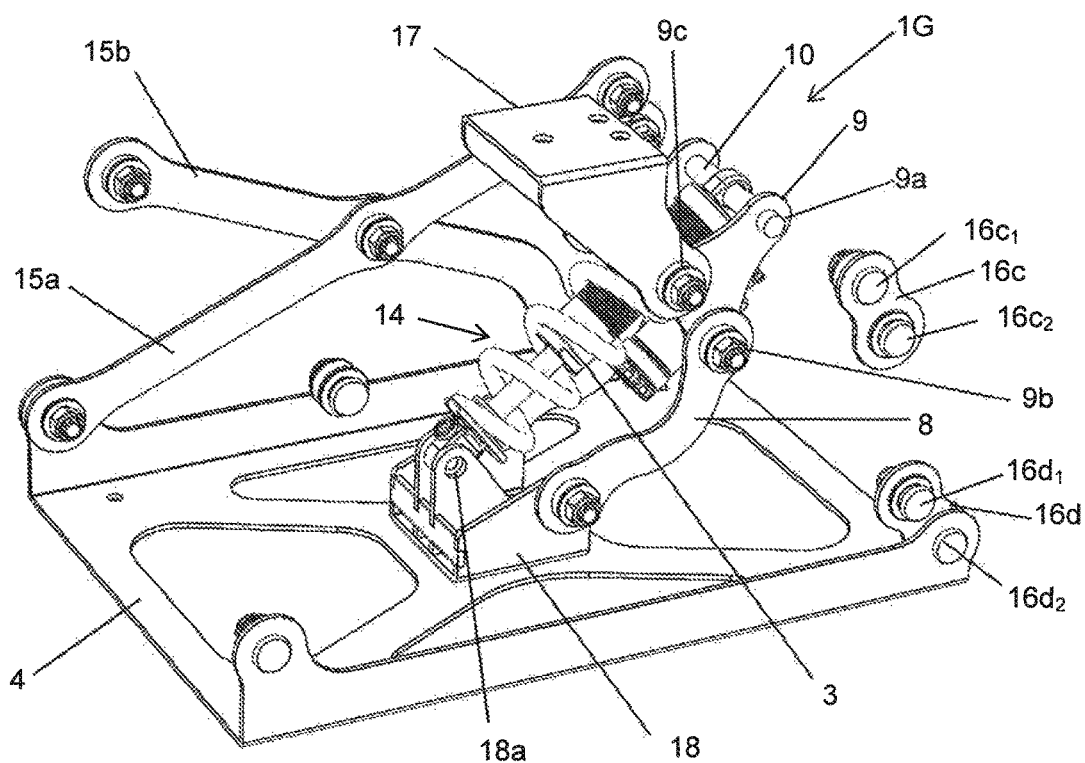
Figure 34B:
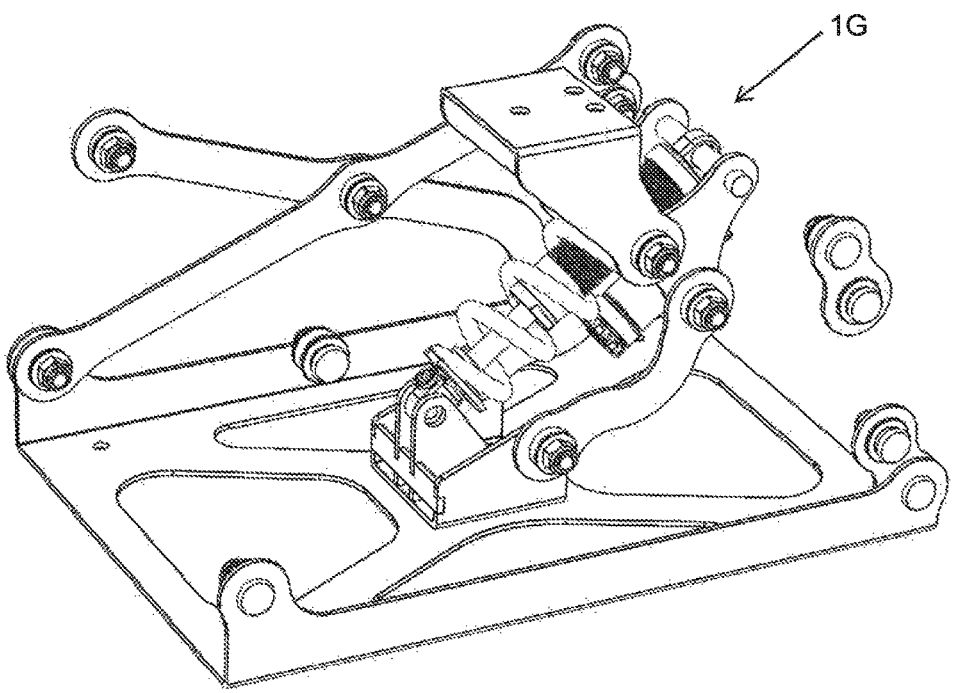
Figure 34C:
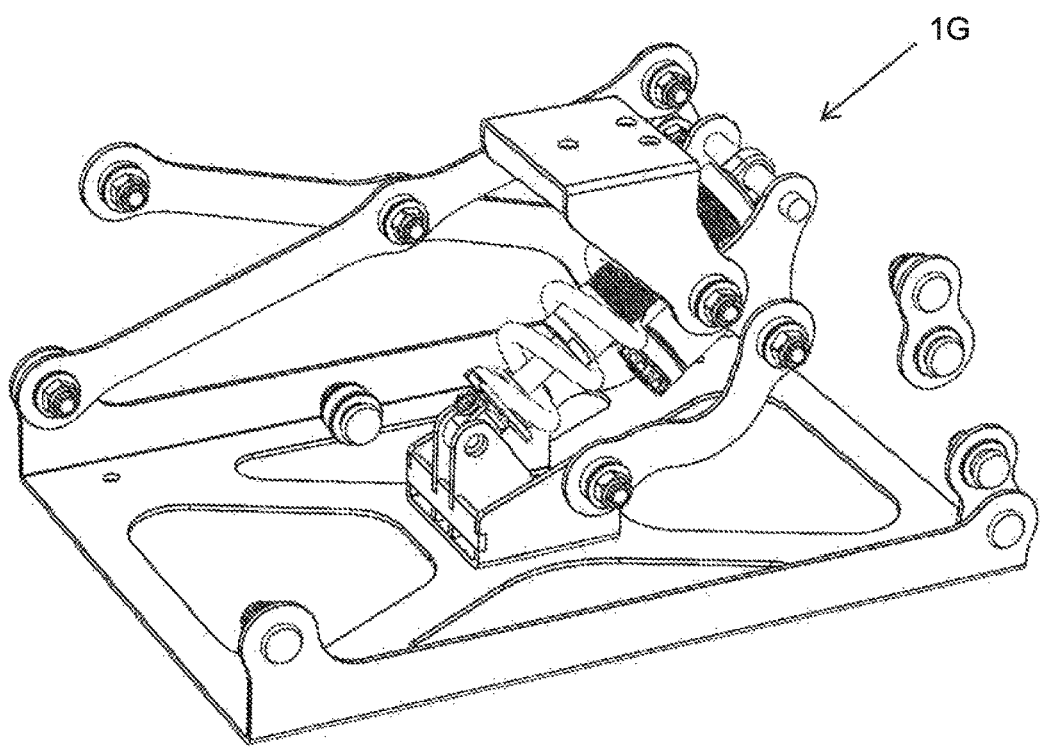
Figure 34D:
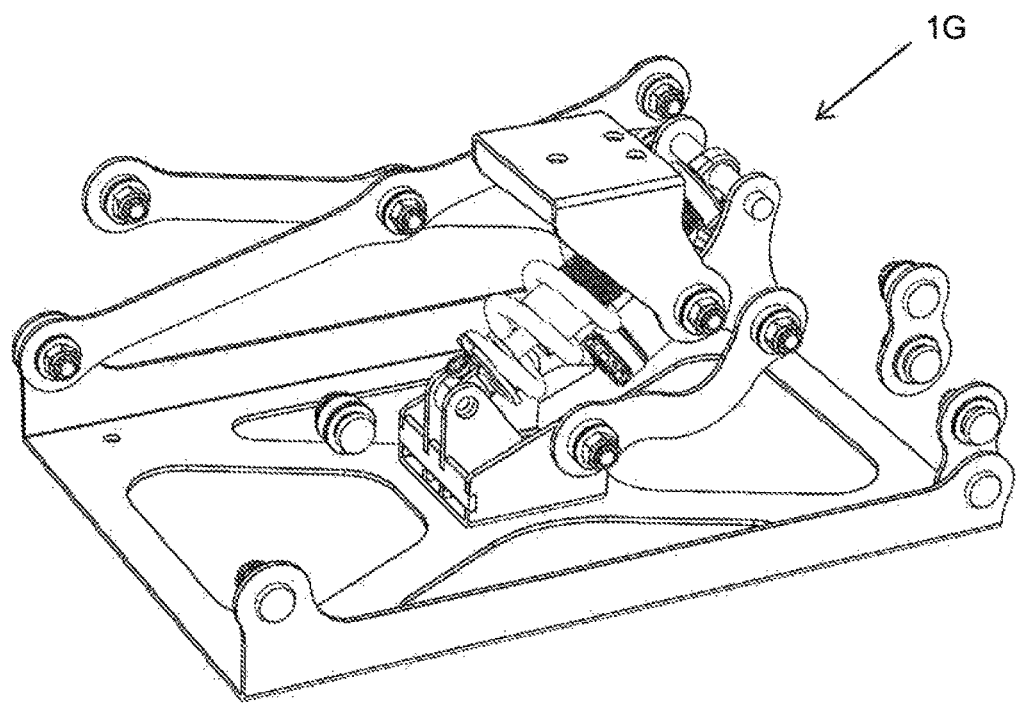
Figure 34E:
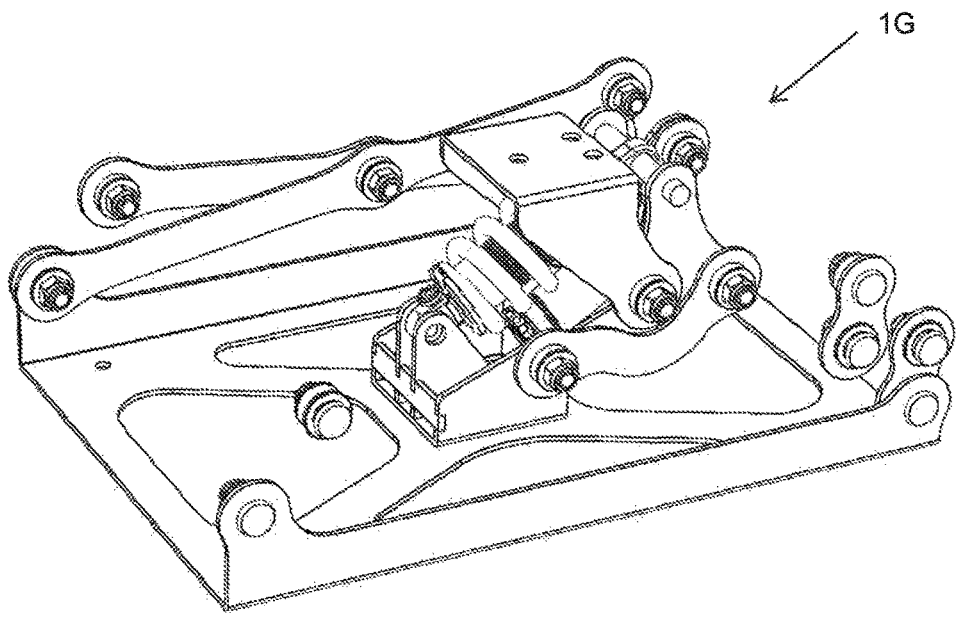

Each control link 9 is pivotally connected to a corresponding drive link 8 at drive link pivot 9b. Each drive link 8 is an elongate component having a curved portion in the middle which enables the mechanism to neatly compress down (as can be seen in FIGS. 33i and 34e discussed later, at maximum compression a side arm of mounting bracket 17 fits within the curved portion). At one end it is pivotally attached to mounting bracket 18 at vehicle-side mounting bracket pivot 18b, and at its other end as mentioned above to the control link 9 at drive link pivot 9b. Thus, the drive link 8 can drive the control link 9 in rotational motion via drive link pivot 9b, based on the fall of the seat support 5 with respect to the vehicle mount 4.

At control link pivot 9c, the control link is pivotally connected to the seat-side mounting bracket 17 and can rotate with respect thereto. This is similar to the control link 9 being pivotally connected to the seat mount 5 in e.g. the second and third embodiments of the invention.

The component parts of the suspension mechanism 1G are made from metal, e.g. steel, aluminium or other suitable metal. They may be made from sheet metal, or e.g. by stamping or machining. However, other materials may also be used, for example as discussed later in relation to the eighth embodiment. The operation of the vehicle seat suspension mechanism of the seventh embodiment will now be described with reference to FIGS. 33a to 33i. These Figures are side views of the seventh embodiment in which the right-side scissor is omitted so that the rising ratio link assembly 14 can be more easily seen.

Figure 33A:
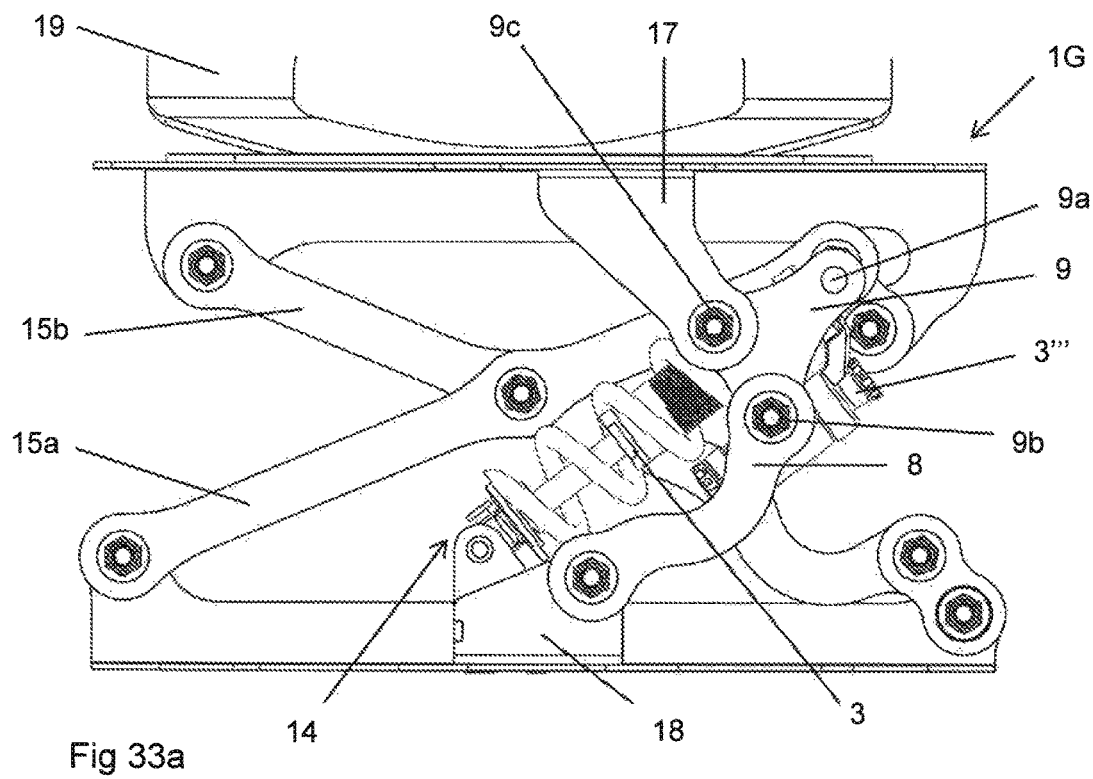
Figure 33B:
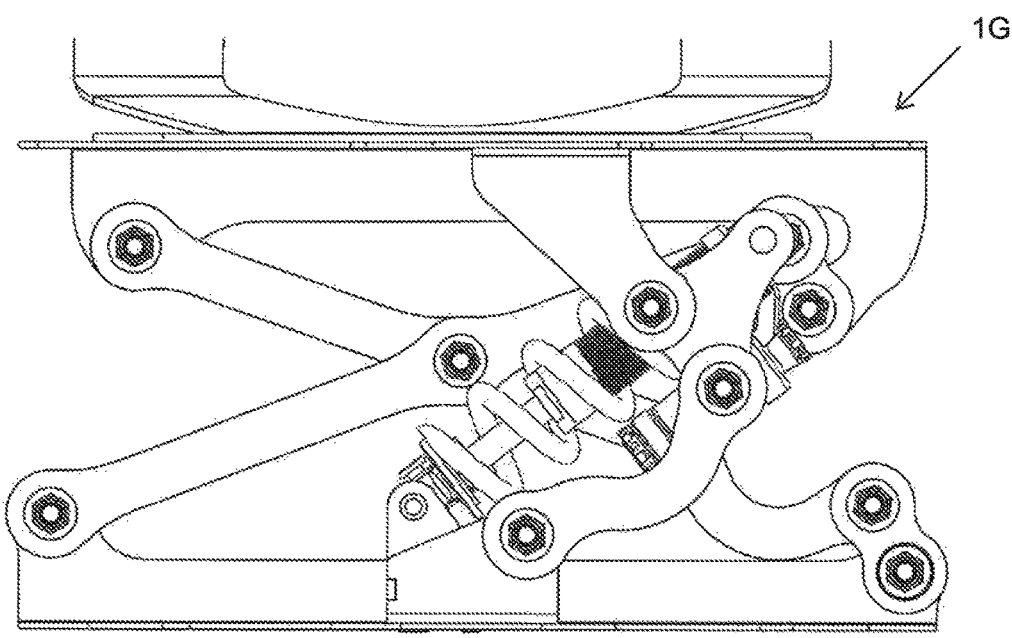
Figure 33C:
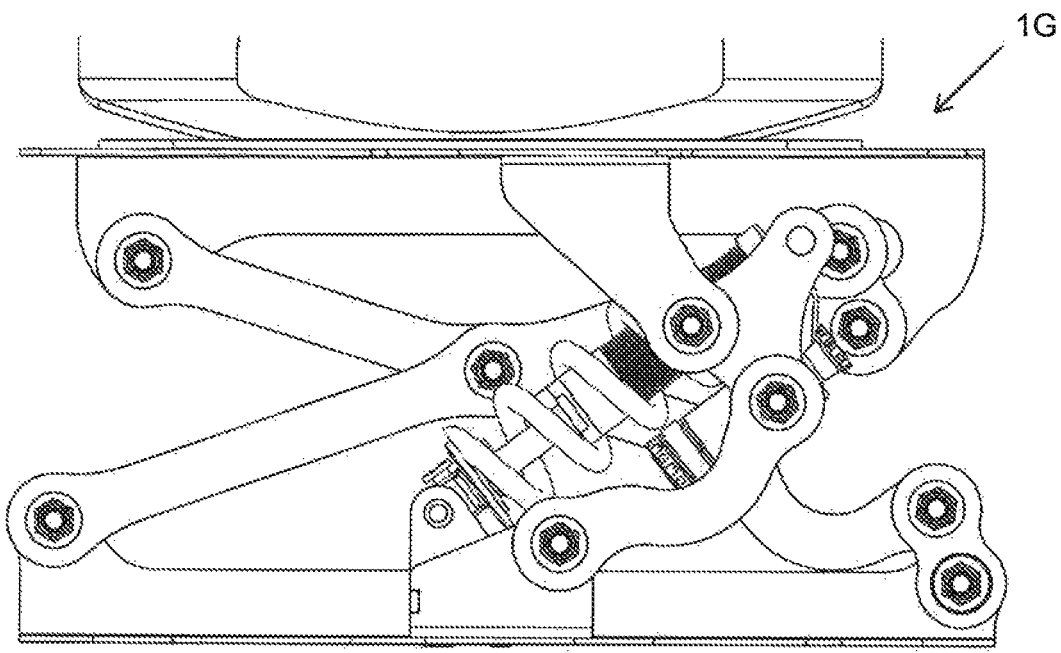
Figure 33D:
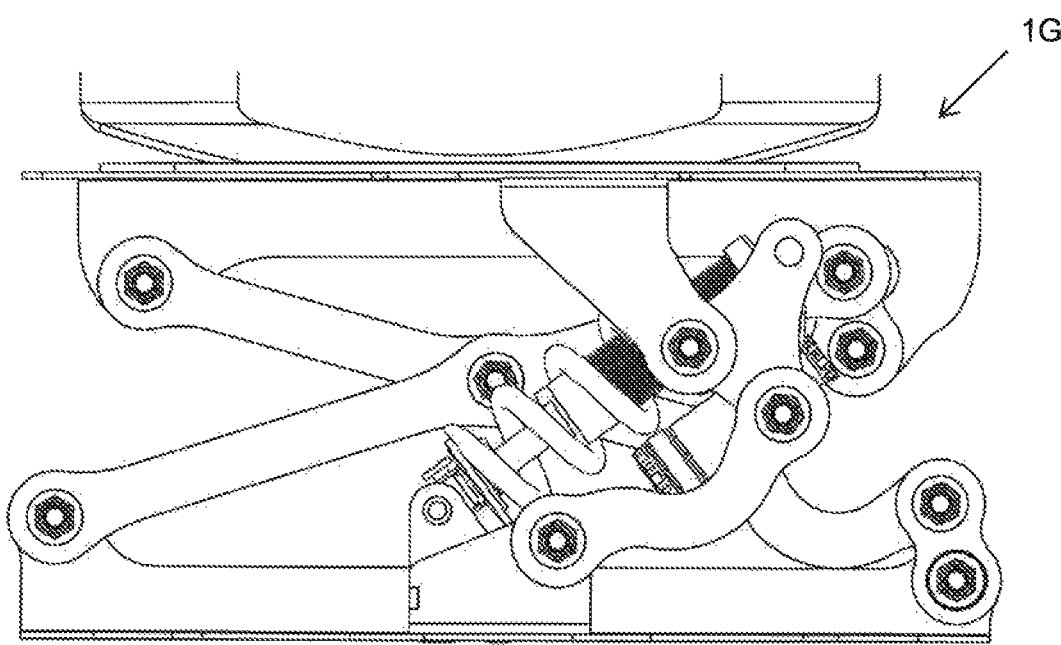
Figure 33E:
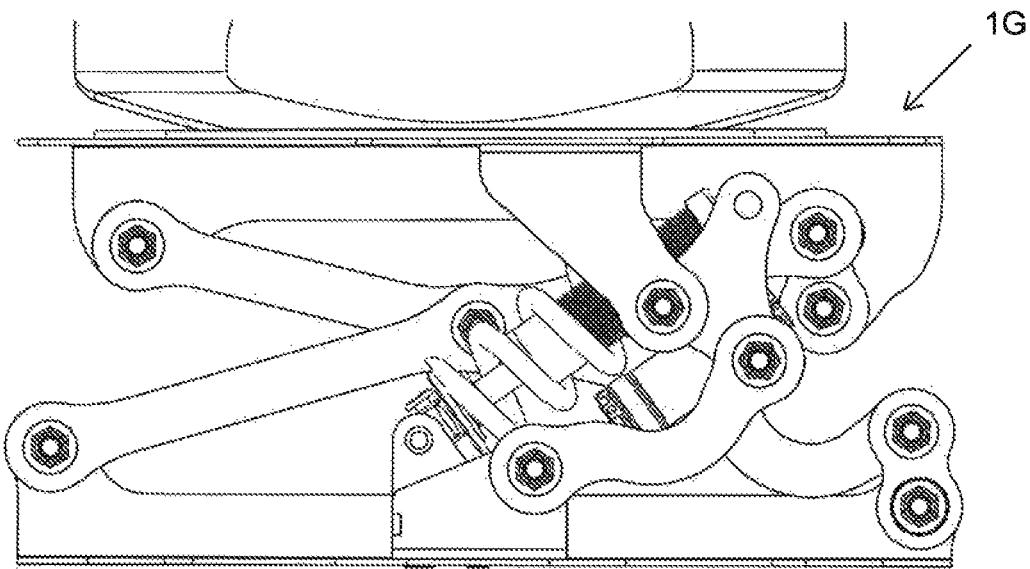
Figure 33F:
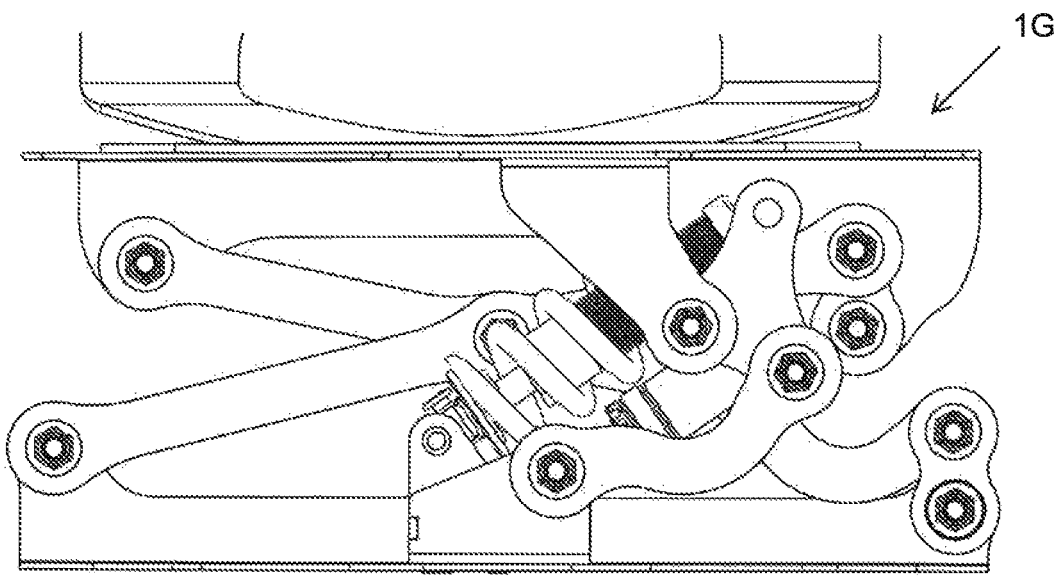
Figure 33G:
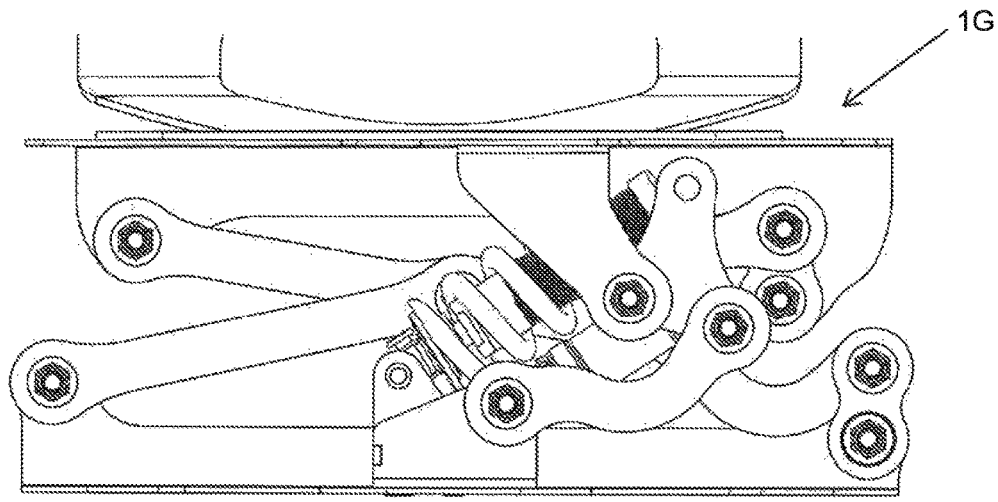
Figure 33H:
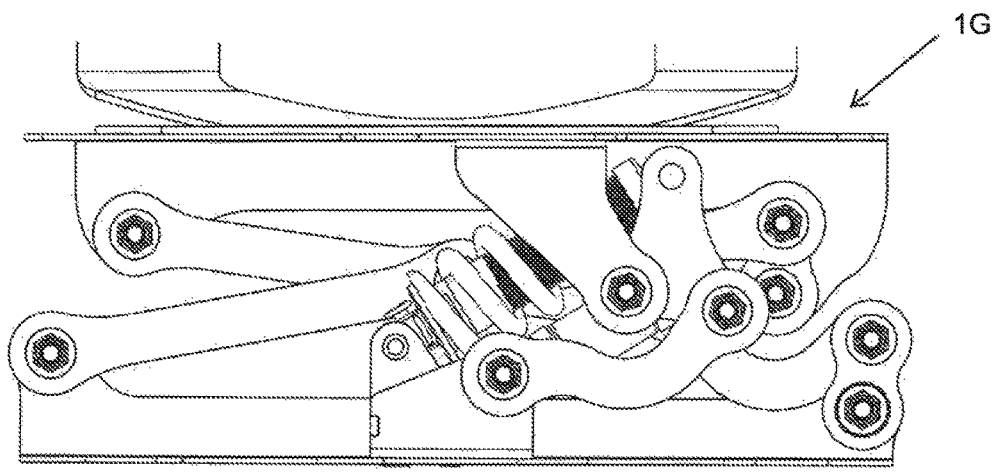

FIG. 33a illustrates the mechanism 1G at full height, in other words the vertical distance between the bottom of the vehicle mount 4 and the top of the seat support 5 is at maximum. The shock strut 3 is essentially fully extended in this position, being only slightly (negligibly) compressed from the effect of the weight of the mechanism and seat. The subsequent Figures show it in gradually compressed positions, with FIG. 33i illustrating maximum compression. FIGS. 34a to 34e also illustrate the mechanism 1G during compression, with various parts omitted such that internal parts can be seen.

When a vehicle on which the mechanism is mounted is subjected to vertical force, e.g. from waves or bumps in the road, the seat will move down relative to the vehicle and the shock strut 3 will compress to a greater or lesser extent. During this motion the seat support 5 moves downwards, maintained in parallel (or substantially parallel, e.g. ±15°) relationship to the vehicle mount 4 and guided by the scissor mechanism 15, 16.

The compression of the shock strut 3 during this motion is guided by the control link 9, which is driven by the drive link 8. As discussed above, the drive link 8 is pivotally coupled at one end to the vehicle side mounting bracket 18 and at the other end to the control link 9 at drive link pivot 9b, the control link being pivotally coupled to the seat side mounting bracket 17 at control link pivot 9c. In this way, as the seat support 5 falls with respect to the vehicle mount 4 during a compression stroke, the vertical distance between the seat-side mounting bracket 17 and vehicle-side mounting bracket 18 decreases, thereby decreasing the distance between the pivot point 18b connecting the bracket 18 with the drive link 8, and the pivot point 9c connecting the bracket 17 with the control link 9. This relative motion thus drives the drive link 8 to drive the rotational motion of the control link 9 about the control link pivot 9c. The rotational motion of the control link 9 guides the motion of the first end 3a of the shock strut 3 via shock strut pivot 9a through the compression stroke, thereby influencing the motion ratio (as hereinbefore previously described) of the suspension mechanism.

As can be seen from FIGS. 33a to 33i and 34a to 34e, during a compression stroke, the control link 9 guides the first end of the shock strut 3a gradually towards the second end of the shock strut 3b along a path following an arc about the control link pivot 9c, the control link pivot 9c moving vertically towards the vehicle mount 4 during this rotation. In this way the control link 9 guides the movement of the first end 3a of the shock strut 3 relative to the second end 3b, so as to control the amount of shock deflection at a given seat height. Depending on the geometry, the control link 9 may guide the first end of the shock strut 3a away from the control link pivot 9c initially while the shock deflection is taken up through the fall of the seat support 5 at the start of the compression stroke.

Just as in the first to sixth embodiments, whilst the shock strut deflection is always guided so as to increase through the stroke, the rate of change of shock deflection is different to that of a conventional suspension mechanism where the ends of the shock strut 3 are fixed relative to the movements of the mechanism. This is because the path of movement of the first end of the shock strut 3a lessens compression in the shock strut with respect to seat fall during an initial stage of the compression stroke, whilst enhancing a rate of compression during a final stage, when compared with conventional mechanisms.

This was discussed previously in detail in relation to the first to sixth embodiments, and the same comments still apply. I.e., in the invention the motion ratio is initially reduced as compared to prior art mechanisms, and then gradually increases through the stroke, whereas in the prior art the motion ratio normally gradually decreases through the stroke or remains constant. The invention thereby provides an improved ride characteristic as compared to the prior art.

Figure 35:
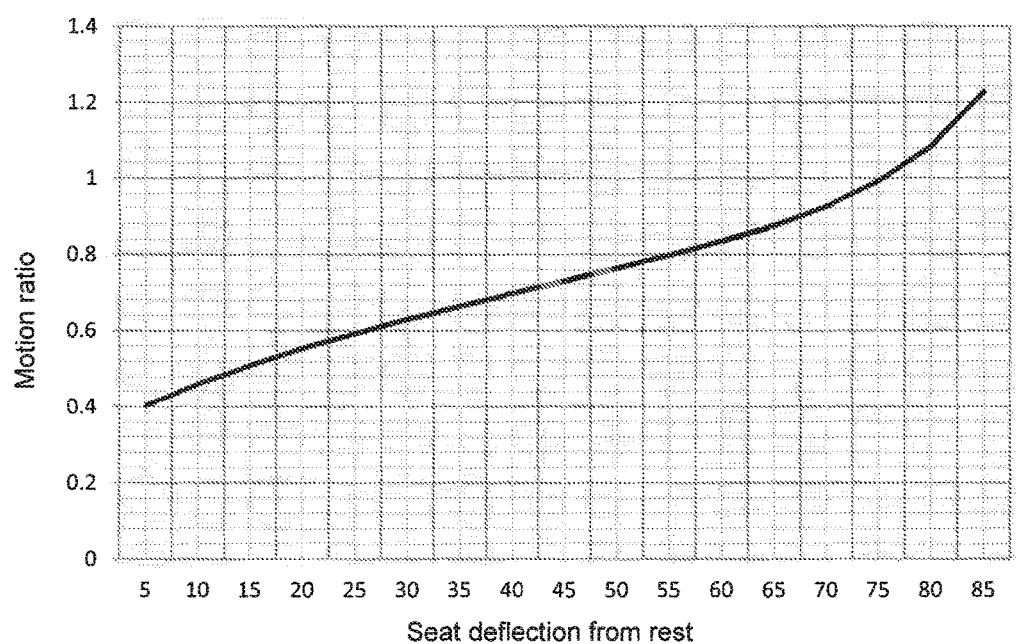
FIG. 35 is a graph showing motion ratio v. seat deflection during a compression stroke of the seat suspension mechanism of the seventh embodiment.
Figure 36:
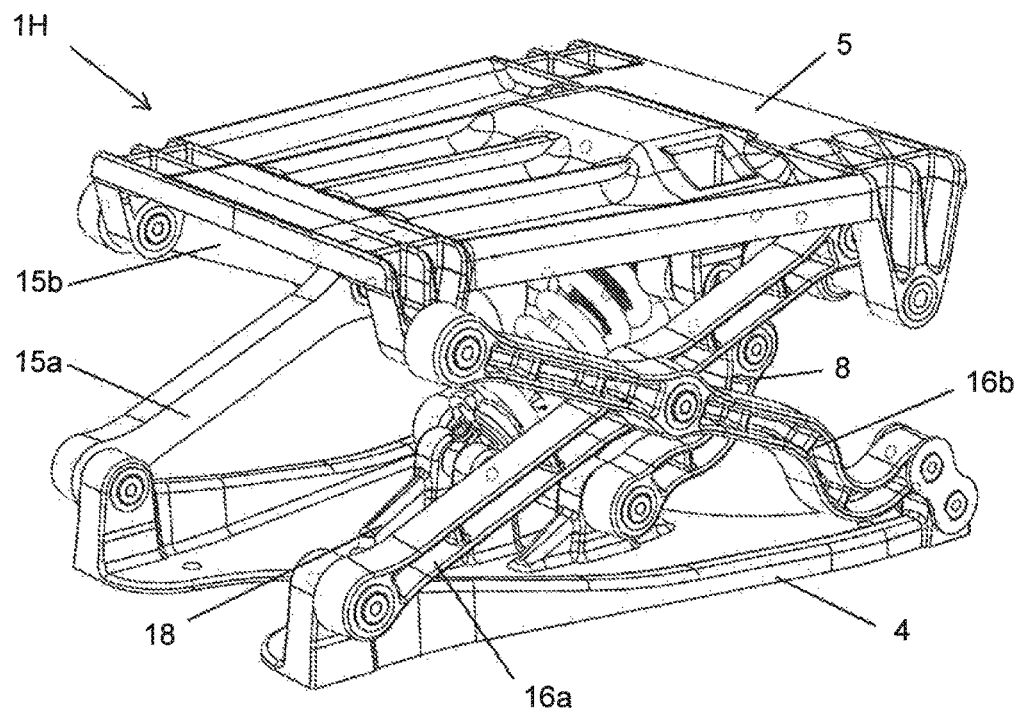
FIG. 36 is a perspective view of a seat suspension mechanism according to an eighth embodiment of the invention viewed from the front.
Figure 37:
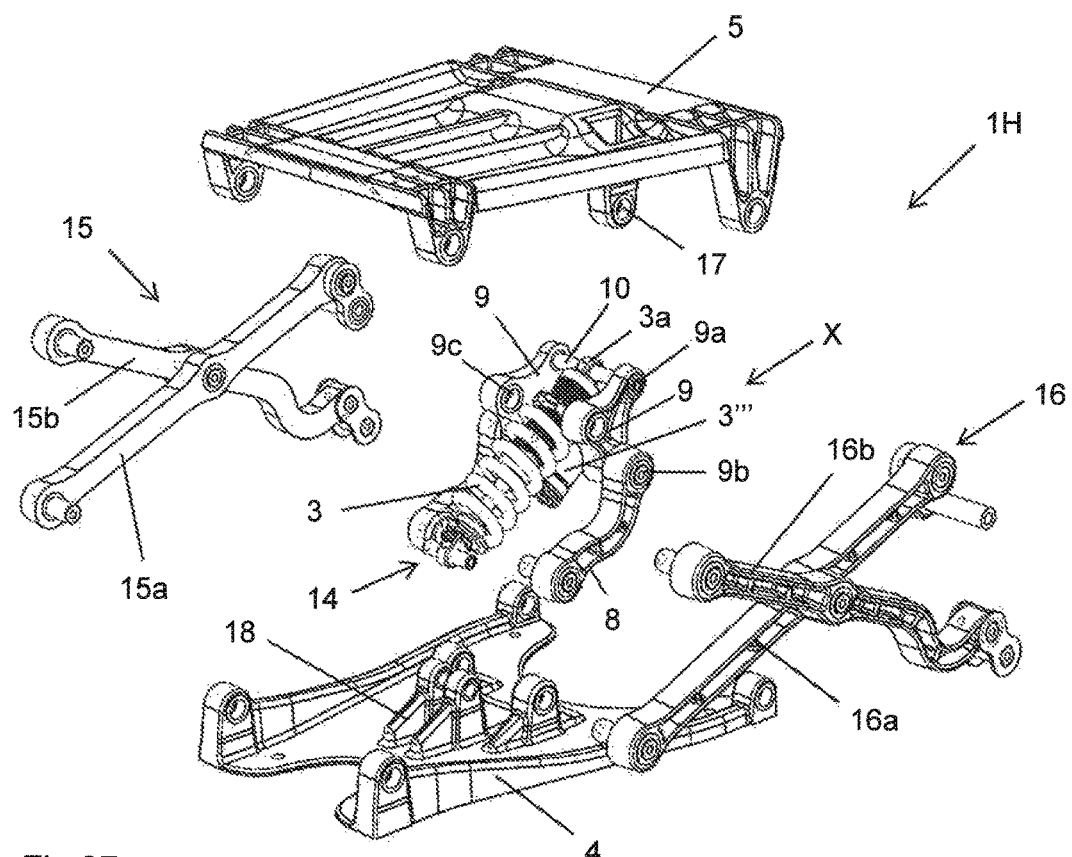
FIG. 37 is an exploded view of FIG. 36.
Figure 38:
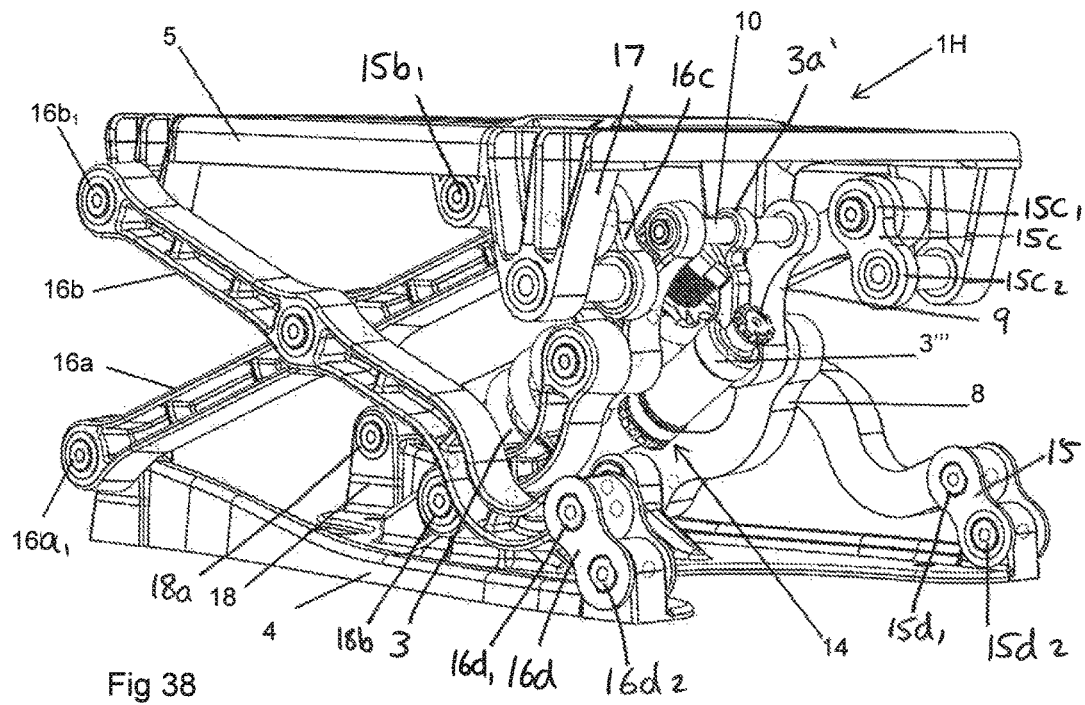
FIG. 38 is a perspective view of the eighth embodiment of the invention viewed from the rear.
Figure 39:
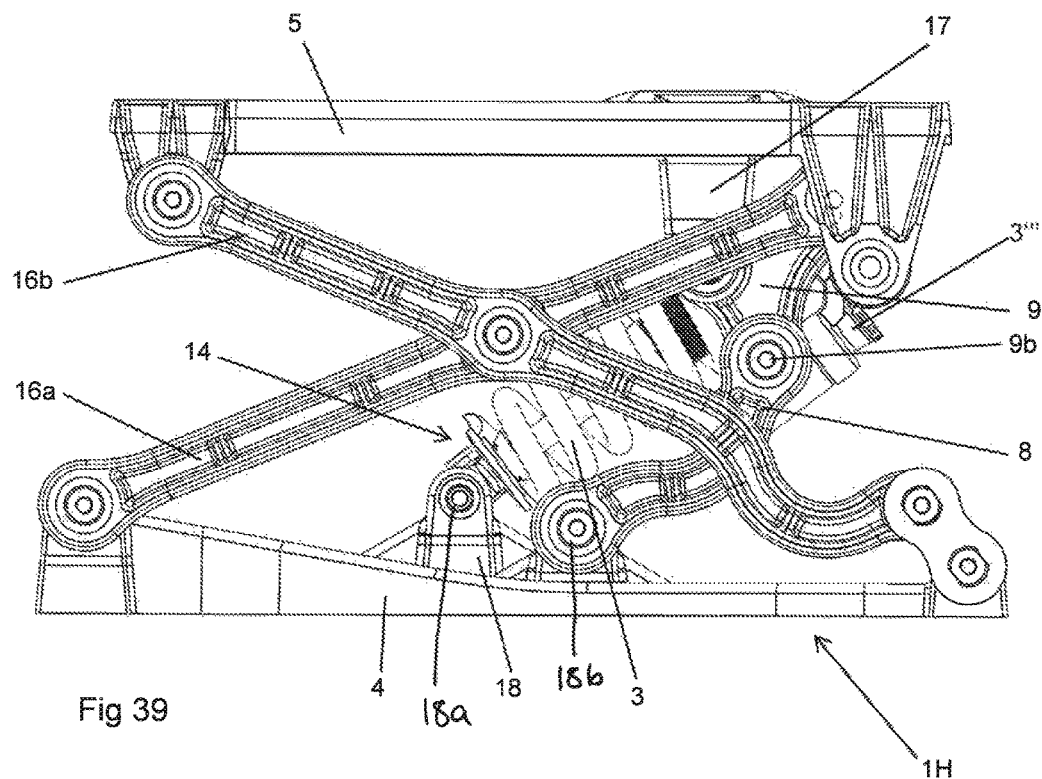
FIG. 39 is a side view of the eighth embodiment.
Figure 40:
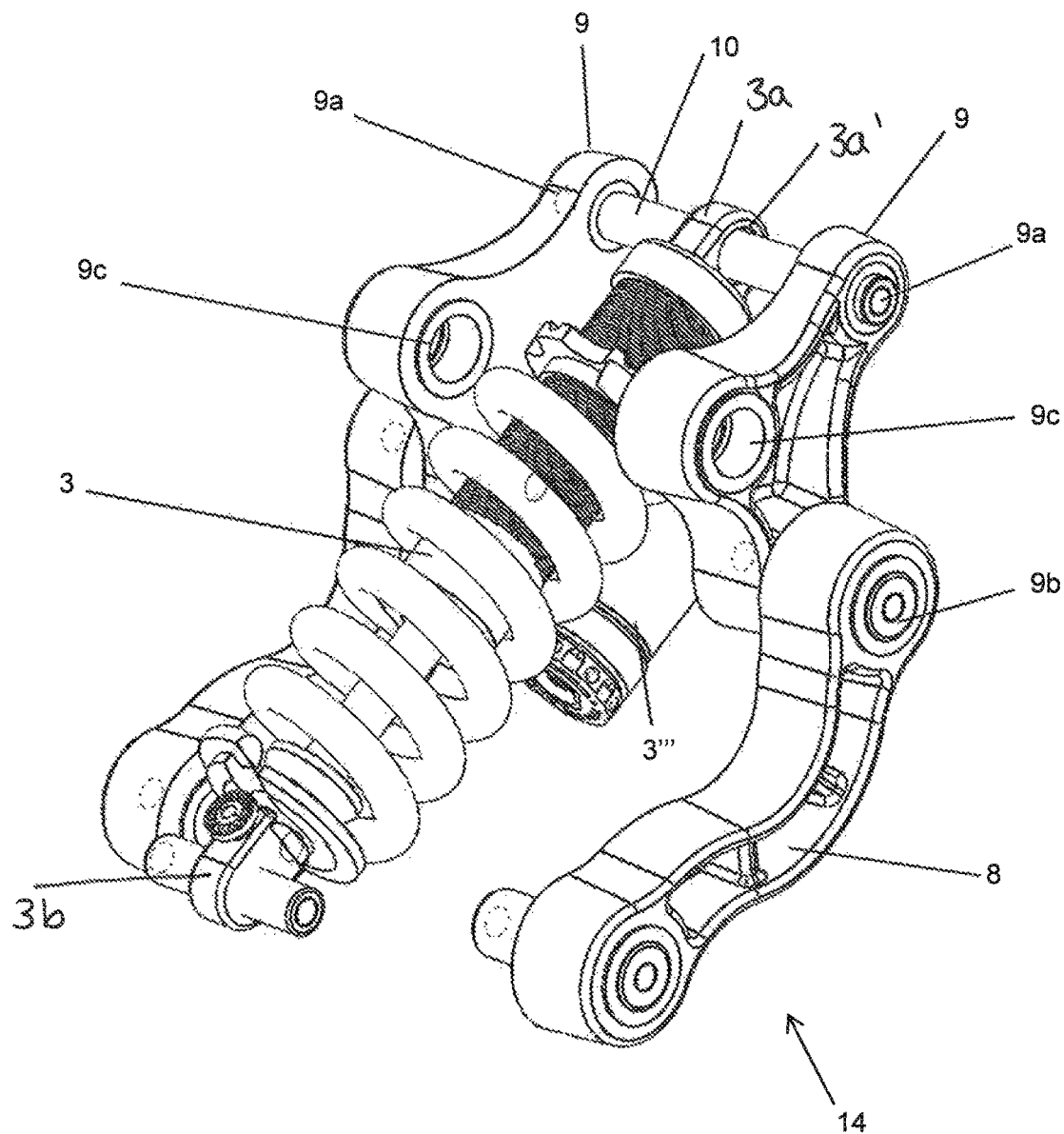
FIG. 40 is a close-up view of the part labelled X in FIG. 37.

Motion ratio v. seat deflection during a compression stroke for the mechanism of the seventh embodiment is shown in the graph of FIG. 35, from which it can be seen that the motion ratio gradually increases almost linearly for the first three-quarters of the stroke, with a sharper increase in the last quarter of the stroke. This may be contrasted with the motion ratio curves for some of the other embodiments e.g. the first embodiment for which the curve is in FIG. 21, and the fifth embodiment for which the curve can be seen in FIG. 25. In both of these earlier embodiments (in particular the fifth), the motion ratio has a more gradual increase initially (i.e. the gradient of the graph is less for the seventh than the first and fifth embodiments), and then has a steeper increase towards the end of the stroke. This steeper increase also begins earlier in the stroke than in the seventh embodiment. The result of this is that less of the shock deflection is saved for later on in the stroke compared to the first to fifth embodiments. A less progressive motion ratio is therefore provided by the seventh embodiment which might be more appropriate for certain slower and/or land-based vehicles compared to the motion ratio characteristics of the earlier embodiments which will be more appropriate for faster vehicles riding over bumpier surfaces. A different motion ratio response may be provided by e.g. varying the geometry of the rising ratio link assembly 14 just as with the earlier embodiments, such as the shape of the control link 9, the length of the drive link 8 and the position of the various pivots.

If desired, it would also be possible to provide a more progressive motion ratio characteristic (e.g. the characteristics seen in relation to the first to sixth embodiments) with a scissor linkage by altering the control link/drive link geometry in accordance with the discussion above. Similarly, a less progressive motion ratio geometry (e.g. the characteristic seen in the seventh embodiment) could be provided with the parallelogram linkages of the first to sixth embodiments by adjusting the geometry.

It can be seen from the graph of FIG. 35 that in this embodiment more than 30%, indeed more than 50%, of the total increase in motion ratio over the stroke occurs during the final half of the stroke.

It will be appreciated that the rising ratio link assembly 14 as described above in relation to the seventh (and below in relation to the eighth) embodiments may be applied in any vehicle seat suspension mechanism having substantially parallel motion between a seat support and a vehicle mount.

The motion ratio response of the seventh embodiment offers improved protection from low amplitude vibration, while offering better protection from "big hits" as well. It may be particularly suited to off-road/pick-up truck vehicle seat applications where extra suspension for unpaved roads or off-road is beneficial, together with internal marine usage (e.g. crew transfer vessels).

An eighth embodiment of the invention is illustrated in FIGS. 36 to 40. This mechanism 1H is substantially similar to the seventh embodiment 1G, except that instead of being made from metal it is made from moulded glass reinforced plastic (GRP). It could also be made from carbon reinforced plastic (CRP) or other fibre reinforced product. This offers various benefits for certain applications. Composites are inherently corrosion resistant, so in a marine environment in particular this can be an advantage. Although more material is required to make the mechanism (it can be seen that the various component parts are necessarily more chunky), GRP and CRP are considerably lighter than steel and thus offer significant weight savings. For example, steel has a density of 7.8 g/cc, whereas carbon fibre has a density of 1.4 g/cc. Titanium inserts may be used with fibre-reinforced products, but the density of titanium is still lower than steel (4.4 g/cc) thus the overall product will still have considerably lower weight. Production costs can be reduced: once tooling is paid for, the piece part costs will be lower, especially in a marine context where finishing costs can be high to survive the corrosive environment.

As can be seen from FIGS. 36 to 40, the main component parts and their arrangement are the same as for the seventh embodiment, and like parts are given like reference numbers. However, with a suitable moulding, it can be possible to replace an assembly of small parts with one moulding thus simplifying assembly. For example, in the seventh embodiment the vehicle-side mount 18 is necessarily made of a number of small parts assembled together. However, in the eighth embodiment, some of these parts are moulded together as one element.

Whilst in the eighth embodiment much of the geometry is similar to the seventh embodiment (e.g. distances between pivot points), the bearings at the pivot points are necessarily wider thus the mechanism is laterally stiffer. This enables the axles at the pivots to remain better aligned, maintaining the desired mechanism response.

It will be appreciated that various features and advantages described in relation to the first to sixth embodiments are equally applicable to the seventh and eighth embodiments.

The invention claimed is:

1. A vehicle seat suspension mechanism, comprising:
   a vehicle mount;
   a seat support;
   a suspension arrangement linking the seat support to the vehicle mount, wherein the suspension arrangement is in the form of a parallelogram linkage arrangement that allows the seat support to fall with respect to the vehicle mount under load, the suspension arrangement comprising a first link connecting the seat support to the vehicle mount by pivots at each end thereof and a second link connecting the seat support to the vehicle mount by pivots at each end thereof;
   a shock strut arranged to resist falling of the seat support relative to the vehicle mount during a compression stroke; and
   a control link arranged to be driven about a control link pivot by fall of the seat support relative to the vehicle mount, the control link being pivotally coupled by a shock strut pivot to a first end of the shock strut to guide the first end with respect to a second end of the shock strut in a manner which causes a motion ratio of the suspension mechanism to increase during progression of the compression stroke.

2. A vehicle seat suspension mechanism as claimed in claim 1, wherein the control link and shock strut are part of a rising ratio link assembly which is positioned within or at least partially within the suspension arrangement linking the seat support to the vehicle mount.

3. A vehicle seat suspension mechanism as claimed in claim 2, wherein the suspension arrangement is configured to guide the seat support in a vertical direction with respect to the vehicle mount while controlling or maintaining an angle of the seat support.

4. A vehicle seat suspension mechanism as claimed in claim 1, wherein the seat support is configured for positioning underneath a seat for a rider and the vehicle mount is configured for mounting to an upper surface of a vehicle to link the seat to the vehicle.

5. A vehicle seat suspension mechanism as claimed in claim 1, wherein the first end of the shock strut is guided with respect to the second end of the shock strut in a manner which causes the motion ratio of the seat suspension mechanism to increase by more than 30%, during a final half of the compression stroke.

6. A vehicle seat suspension mechanism as claimed in claim 1, wherein the motion ratio is less than 0.6 for a first half of the compression stroke.

7. A vehicle seat suspension mechanism as claimed in claim 1, wherein the first end of the shock strut is guided by the control link along a path which lessens a rate of compression in the shock strut with respect to fall of the seat support relative to the vehicle mount during an initial stage of the compression stroke and enhances a rate of compression in the shock strut with respect to fall of the seat support relative to the vehicle mount during a final stage of the compression stroke.

8. A vehicle seat suspension mechanism as claimed in claim 1, wherein the first end of the shock strut is guided by the control link along a path which lessens a rate of increase of spring force exerted by the shock strut with respect to fall of the seat support relative to the vehicle mount during an initial stage of the compression stroke and enhances a rate of increase of spring force exerted by the shock strut with respect to fall of the seat support relative to the vehicle mount during a final stage of the compression stroke.

9. A vehicle seat suspension mechanism as claimed in claim 1, wherein the shock strut has a longitudinal axis extending in an inclined manner between the vehicle mount and the seat support such that the first end of the shock strut is vertically displaced with respect to the second end of the shock strut and arranged so that fall of the seat support relative to the vehicle mount compresses the shock strut.

10. A vehicle seat suspension mechanism as claimed in claim 1, wherein the suspension arrangement comprises two parallelogram linkages arranged on either side of the shock strut.

11. A vehicle seat suspension mechanism as claimed in claim 1, wherein drive for the control link is provided by rotation of a link connecting the seat support to the vehicle mount, the drive causing angular movement in the control link about the control link pivot in an opposite direction to the link.

12. A vehicle seat suspension mechanism as claimed in claim 1, wherein the first and second links of the suspension arrangement are arranged one above the other and the first link remains substantially parallel (±5°) to the second link during the compression stroke.

13. A vehicle seat suspension mechanism as claimed in claim 12, wherein a drive link is provided which is pivotally coupled to the first link to receive drive therefrom and pivotally coupled to the control link by a drive link pivot to drive the control link about the control link pivot.

14. A vehicle seat suspension mechanism as claimed in claim 1, wherein the shock strut comprises an air spring shock absorber or a mechanical spring in combination with a fluid shock absorber.

15. A vehicle seat suspension mechanism as claimed in claim 1, wherein the control link and shock strut are part of a rising ratio link assembly which comprises at least a further control link and at least two drive links, wherein a first control link and a first drive link are arranged on one side of the shock strut and wherein a second control link and a second drive link are arranged on an opposite side of the shock strut, each control link being arranged to be driven simultaneously about its control link pivot by the first and second drive links respectively, the control links being coupled together by an axle which also provides a pivot connection with the first end of the shock strut to guide the first end of the shock strut during the compression stroke.

16. A vehicle seat including a vehicle seat suspension mechanism as claimed in claim 1.

17. A vehicle comprising a vehicle seat suspension mechanism as claimed in claim 1, wherein the vehicle mount is mounted to a surface of the vehicle and the seat support supports a seat for a rider.

18. A vehicle seat as claimed in claim 16, wherein the control link and shock strut are part of a rising ratio link assembly which is positioned within or at least partially within the suspension arrangement linking the seat support to the vehicle mount.

19. A vehicle seat as claimed in claim 16, wherein the control link and shock strut are part of a rising ratio link assembly which comprises at least a further control link and at least two drive links, wherein a first control link and a first drive link are arranged on one side of the shock strut and wherein a second control link and a second drive link are arranged on an opposite side of the shock strut, each control link being arranged to be driven simultaneously about its control link pivot by the first and second drive links respectively, the control links being coupled together by an axle which also provides a pivot connection with the first end of the shock strut to guide the first end of the shock strut during the compression stroke.

20. A vehicle as claimed in claim 17, wherein the control link and shock strut are part of a rising ratio link assembly which comprises at least a further control link and at least two drive links, wherein a first control link and a first drive link are arranged on one side of the shock strut and wherein a second control link and a second drive link are arranged on an opposite side of the shock strut, each control link being arranged to be driven simultaneously about its control link pivot by the first and second drive links respectively, the control links being coupled together by an axle which also provides a pivot connection with the first end of the shock strut to guide the first end of the shock strut during the compression stroke.

* * * * *